(12) United States Patent
Huet et al.

(10) Patent No.: US 11,557,096 B2
(45) Date of Patent: Jan. 17, 2023

(54) COGNITIVE STIMULATION IN VEHICLES

(71) Applicant: AT&T Intellectual Property I, L.P., Atlanta, GA (US)

(72) Inventors: Miranda Huet, Austin, TX (US); James Pratt, Round Rock, TX (US); Eric Zavesky, Austin, TX (US); Donald Perciful, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 58 days.

(21) Appl. No.: 16/707,400

(22) Filed: Dec. 9, 2019

(65) Prior Publication Data

US 2021/0174590 A1 Jun. 10, 2021

(51) Int. Cl.
*G06T 19/00* (2011.01)
*B60R 16/023* (2006.01)
*G06F 3/14* (2006.01)
*G06F 3/01* (2006.01)

(52) U.S. Cl.
CPC ........ *G06T 19/006* (2013.01); *B60R 16/0231* (2013.01); *G06F 3/011* (2013.01); *G06F 3/1423* (2013.01)

(58) Field of Classification Search
CPC ...... G06T 19/006; G06F 3/011; G06F 3/1423; B60R 16/0231
See application file for complete search history.

(56) References Cited

U.S. PATENT DOCUMENTS

| 10,123,078 B1* | 11/2018 | McCarty | H04N 21/4668 |
| 2015/0025731 A1* | 1/2015 | Uehara | B60W 50/10 |
| | | | 701/23 |
| 2017/0080942 A1* | 3/2017 | Nakada | B60W 50/0097 |

(Continued)

OTHER PUBLICATIONS

Uros Kalabic, "Learning autonomous vehicle passengers' preferred driving styles using g-g plots and haptic feedback", Nov. 28, 2019, IEEE, all pages (Year: 2019).*

(Continued)

*Primary Examiner* — Roberto Borja
(74) *Attorney, Agent, or Firm* — Amin, Turocy & Watson, LLP

(57) ABSTRACT

Interactive content can be managed and provided to occupants of an automated vehicle to enhance their experience while in the vehicle. Orchestrator component can determine interactive content based on conditions associated with the vehicle, user preferences, video content, or other information. Interactive content can comprise video content, audio content, and control content. Video content can comprise augmented reality or virtual reality content. Control content can be used to control vehicle operation in relation to or synchronization with presentation of video content. Orchestrator component can correlate between certain roads on which the vehicle can travel and entertainment presentations presented to a vehicle occupant. Orchestrator component can control vehicle operation to have the vehicle recreate a vehicle action sequence (VAS) in a video program being presented to the occupant in the vehicle. Orchestrator component can notify nearby vehicles when VAS is be recreated, or another vehicle also can participate in VAS.

20 Claims, 19 Drawing Sheets

(56) References Cited

U.S. PATENT DOCUMENTS

| | | | |
|---|---|---|---|
| 2017/0129372 A1* | 5/2017 | Hein | B60N 2/10 |
| 2018/0211414 A1* | 7/2018 | Cronin | B60W 40/02 |
| 2018/0231975 A1* | 8/2018 | Sachdev | B60Q 9/00 |
| 2018/0278920 A1* | 9/2018 | Stefan | G06F 3/147 |
| 2018/0308360 A1* | 10/2018 | Regmi | G08G 1/0965 |
| 2019/0019329 A1* | 1/2019 | Eyler | G01C 21/00 |
| 2019/0199993 A1* | 6/2019 | Babu J D | G06F 3/00 |
| 2020/0010085 A1* | 1/2020 | Ohmura | B60W 30/143 |
| 2020/0057453 A1* | 2/2020 | Laws | B60W 10/20 |
| 2020/0139967 A1* | 5/2020 | Beller | B60W 30/18159 |
| 2020/0209858 A1* | 7/2020 | Trofymov | G05D 1/0246 |
| 2021/0056854 A1* | 2/2021 | Ucar | H04W 4/80 |

OTHER PUBLICATIONS

Ochanji, "Using Virtual Reality to Kill Boredom in Autonomous Vehicles," https://virtualrealitytimes.com/2019/06/23/using-virtual-reality-to-kill-boredom-in-autonomous-vehicles/, Jun. 23, 2019, 6 pages.

"Carmakers looking to VR to keep people in self-driving cars engaged," https://www.straitstimes.com/business/carmakers-looking-to-vr-to-keep-people-in-self-driving-cars-engaged, Jun. 15, 2019, 2 pages.

Kuchera, "VR and self-driving cars are a fascinating, scary combo," https://www.polygon.com/virtual-reality/2018/1/5/16854034/ubisoft-vr-virtual-reality-renault-autonomous-cars-driving, Jan. 5, 2018, 3 pages.

Aouf, "Holoride creates carsickness-battling VR experience for self-driving-car passengers," https://www.dezeen.com/2019/01/22/holoride-vr-self-driving-cars-transport-design/, Jan. 22, 2019, 11 pages.

Bennington-Castro, "Driving autonomous cars in the future will be a real trip," https://www.nbcnews.com/mach/innovation/driving-roads-future-will-be-real-trip-n733076, Mar. 15, 2017, 9 pages.

* cited by examiner

COGNITIVE STIMULATION IN VEHICLES

TECHNICAL FIELD

This disclosure relates generally to electronic communications in vehicles, e.g., to cognitive stimulation in vehicles.

BACKGROUND

Vehicles can comprise communication features (e.g., communication and/or content presentation devices) that can be utilized to provide information, entertainment, and other services to occupants of a vehicle and/or allow communications between the occupant of a vehicle and other users outside of the vehicle. Autonomous and semi-autonomous vehicles are expected to become more prevalent in the years to come. Occupants of an autonomous or semi-autonomous vehicle will have to interact significantly less with such vehicle with regard to driving the vehicle or managing the travel of the vehicle as it travels to the desired destination of the occupants.

The above-described description is merely intended to provide a contextual overview regarding electronic communications and vehicles, and is not intended to be exhaustive.

DETAILED DESCRIPTION

Figure 1:
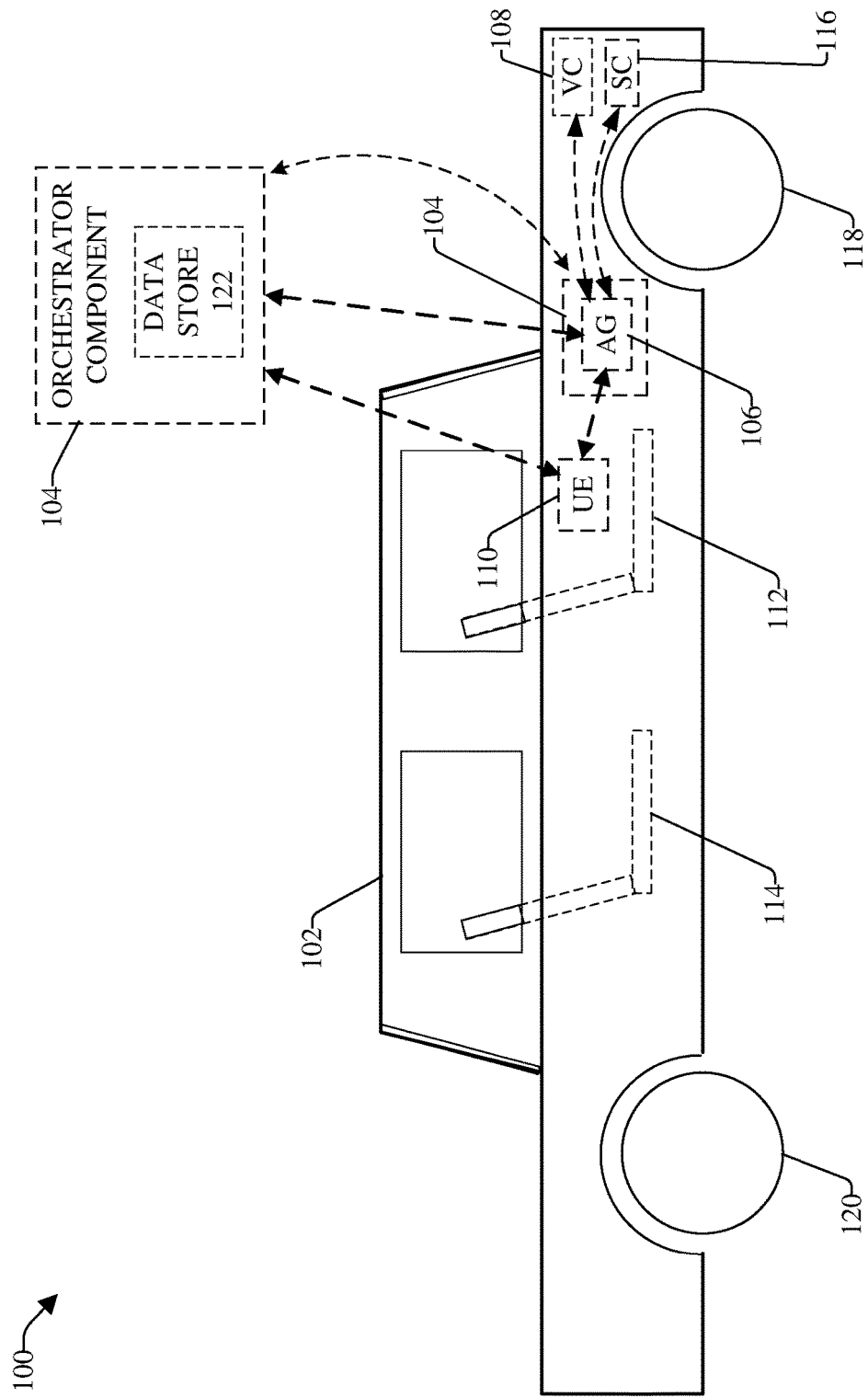
FIG. 1 illustrates a block diagram of an example system that can control presentation of interactive content, which can include augmented reality (AR) content and/or virtual reality (VR) content, in a vehicle and/or correspondingly control operation of the vehicle, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Vehicles can comprise communication features (e.g., communication and/or content presentation devices) that can be utilized to provide information, entertainment, and other services to occupants of a vehicle and/or allow communications between the occupant of a vehicle and other users outside of the vehicle. Autonomous and semi-autonomous vehicles are expected to become more prevalent in the years to come. Occupants of an autonomous or semi-autonomous vehicle will have to interact significantly less with such vehicle with regard to driving the vehicle or managing the travel of the vehicle as it travels to the desired destination of the occupants. For instance, a "driver" of an autonomous vehicle will no longer have to focus on driving the vehicle on the road, and, as such, the "driver" can have space (e.g., time space) available where such person may desire to be entertained. This can be particularly true for longer drives where the passengers of the vehicle do not have to interact with the vehicle to get from origin to destination. If the passengers are left alone for too long without stimulation, the passengers may fall asleep. There can be a space for keeping passengers awake, as well as opportunities to create entertainment and other stimulative experiences associated with the travel route to keep passengers desirably stimulated while traveling in an autonomous or semi-autonomous vehicle.

To that end, techniques for managing interactive content and providing interactive content to occupants of an automated vehicle (e.g., autonomous or semi-autonomous vehicle) to enhance their experience while in the vehicle are presented. The disclosed subject matter can provide vehicle occupants with a fully immersive entertainment or otherwise stimulative experience while the occupants are in the vehicle.

The disclosed subject matter can comprise an orchestrator component that can determine interactive content based at least in part on conditions associated with the vehicle (e.g., environmental conditions associated with the vehicle, conditions of the vehicle, including conditions relating to vehicle capabilities or functions), user preferences (e.g., preferences of a vehicle occupant(s)), user context (e.g., mood or level of stimulation of the user), video content, or other desired (e.g., pertinent) information. Interactive content can comprise video content, audio content, and/or control content. The video content can comprise augmented reality (AR) and/or virtual reality (VR) content. The orchestrator component or an agent component of or associated with the orchestrator component can present a portion of the interactive content (e.g., video content, AR content, VR content, and/or audio content), via a presentation component (e.g., one or more display screens and/or an audio system) of the vehicle or user equipment (UE) (e.g., a communication device, such as a mobile or smart phone, an AR/VR headwear or eyeglasses, an electronic pad or tablet, or a computer, . . . ), to the occupant of the vehicle. The orchestrator component or associated agent component can utilize the control content of the interactive content to control vehicle operation in relation to or in synchronization with the presentation of the portion of the interactive content, via the presentation component or UE, to the occupant in the vehicle. In accordance with various embodiments, the presented content and/or control content can comprise haptic content that can provide haptic stimulation or feedback to the occupant. In some embodiments, the one or more display screens can be integrated with or associated with one or more windows (e.g., front windshield, door or side windows, and/or back window) of the vehicle, and/or can be located in one or more regions of the vehicle (e.g., display screen that can raise up from the dashboard or can drop down from the vehicle ceiling in proximity to the front windshield, display screen that can raise up from a vehicle door or can drop down from the vehicle ceiling, and/or display screen that can raise up from panel behind the back seats or can drop down from the vehicle ceiling in proximity to the rear window).

In certain embodiments, the orchestrator component can detect or determine the context (e.g., cognitive load, mood, level of stimulation, . . . ) of an occupant of a vehicle based at least in part on sensor data received from a sensor component in the vehicle. The orchestrator component can match the context of the vehicle occupant to the activity level of the occupant to stimulate the occupant and/or keep the occupant awake without exhausting the occupant (e.g., without overstimulating the occupant to the point of exhaustion).

In some embodiments, the orchestrator component can correlate between certain roads on which the vehicle can travel and entertainment presentations (e.g., interactive content) presented to a vehicle occupant. The orchestrator component also can correlate (or inversely correlate) entertainment presentations based at least in part on the weather or other environmental conditions being experienced by the vehicle occupant while traveling in the vehicle. In accordance with various other embodiments, the orchestrator component can provide interactive content that can provide education or health benefits to the vehicle occupant, or interactive content that can comprise advertising (e.g., contextual advertising or other advertising) or be associated with advertising along or in proximity to the route of travel of the vehicle. The orchestrator component can design entertainment or educational experiences around geographic locations, sports, historical sites, nostalgia, local activities, or even road materials, etc. As desired, such entertainment or education experiences can be sold to a vehicle occupant. For example, an entertainment experience can be associated with a particular roadway, which can have unique characteristics, wherein the orchestrator component can determine and generate interactive content based at least in part on the unique characteristics of that roadway. Such entertainment experience can be sold to a vehicle occupant, wherein the vehicle occupant can purchase the entertainment experience and enjoy the entertainment experience as the vehicle travels on the roadway.

In certain embodiments, the orchestrator component (e.g., employing the associated agent component) can control vehicle operation to have the vehicle recreate a vehicle action sequence (e.g., car stunts or car action scenes in a movie) in a video program (e.g., movie, television program, or other video program) being presented to the occupant in the vehicle (e.g., the vehicle can perform the vehicle action sequence) in synchronization with the presentation of the portion of interactive content (e.g., movie video content, or AR or VR content generated based at least in part on the movie video content) that contains the vehicle action sequence. The orchestrator component (e.g., employing the associated agent component) also can notify nearby vehicles when the vehicle is going to be recreating the vehicle action sequence, so that those nearby vehicles are aware that the vehicle is going to be recreating the vehicle action sequence and can thereby operate accordingly (e.g., operate to avoid colliding with the vehicle). In some embodiments, if desired (e.g., by the occupant of the vehicle), the orchestrator component (e.g., employing the associated agent component) can invite an occupant of another vehicle to have that other vehicle participate with the vehicle in the vehicle action sequence.

These and other aspects and embodiments of the disclosed subject matter will now be described with respect to the drawings.

Referring now to the drawings, FIG. 1 illustrates a block diagram of an example system 100 that can control presentation of interactive content, which can include AR content and/or VR content, in a vehicle and/or correspondingly control operation of the vehicle, in accordance with various aspects and embodiments of the disclosed subject matter. The system 100 can provide vehicle occupants with a fully immersive entertainment or otherwise stimulative experience while the occupants are in the vehicle.

The system 100 can comprise a vehicle 102 that can be employed to transport people (e.g., users, occupants) from one location to another location (e.g., destination). The vehicle 102 can be an autonomous or semi-autonomous vehicle, for example. An autonomous vehicle can be a vehicle that can employ sensors and automated functions (e.g., operational and/or control functions) to enable the vehicle to operate, navigate, and drive with no or minimal action by a user (e.g., vehicle occupant or "driver"). A semi-autonomous vehicle can have various automated functions that can reduce a user's (e.g., driver's) involvement in operating, navigating, or driving the semi-autonomous vehicle. It is to be appreciated and understood that various aspects and embodiments of the disclosed subject matter are described herein with regard to a vehicle that is a passenger vehicle (e.g., a car, a van, a pick-up truck, a truck, . . . ); however, the disclosed subject matter is not so limited, as a vehicle also can be, for example, a bus, a train, a subway train, a plane, or other mobile structure that can be utilized to transport people from one location to another location.

The system 100 can comprise an orchestrator component 104 that can control the presentation of content (e.g., visual content, audio content, or other content, such as haptic content) to occupants of the vehicle 102 and control operation of the vehicle 102 (e.g., control operation of the vehicle in connection with the presentation of content). In accordance with various embodiments, the orchestrator component 104 can comprise or be associated with an agent component 106 (AG) that can be utilized to facilitate presentation of the content in the vehicle 102 and/or control operation of the vehicle 102. In some embodiments, the orchestrator component 104 can be part of (e.g., integrated with or installed on) the vehicle 102, wherein the agent component 106 can be part of or associated with (e.g., communicatively connected to the orchestrator component 104). In other embodiments, the orchestrator component 104 can be external to the vehicle 102, and the orchestrator component 104 can be associated with (e.g., communicatively connected to) the agent component 106, wherein the orchestrator component 104 can communicate visual and/or audio content to the agent component 106 for presentation to the occupants of the vehicle 102 and/or control content to the agent component 106 for use in controlling operation of the vehicle 102. In accordance with various embodiments, the interactive content (e.g., the control content of the interactive content) can comprise haptic content that can provide haptic stimulation or feedback to the occupant (e.g., haptic stimulation or feedback to the occupant via the seat of the occupant).

Figure 2:
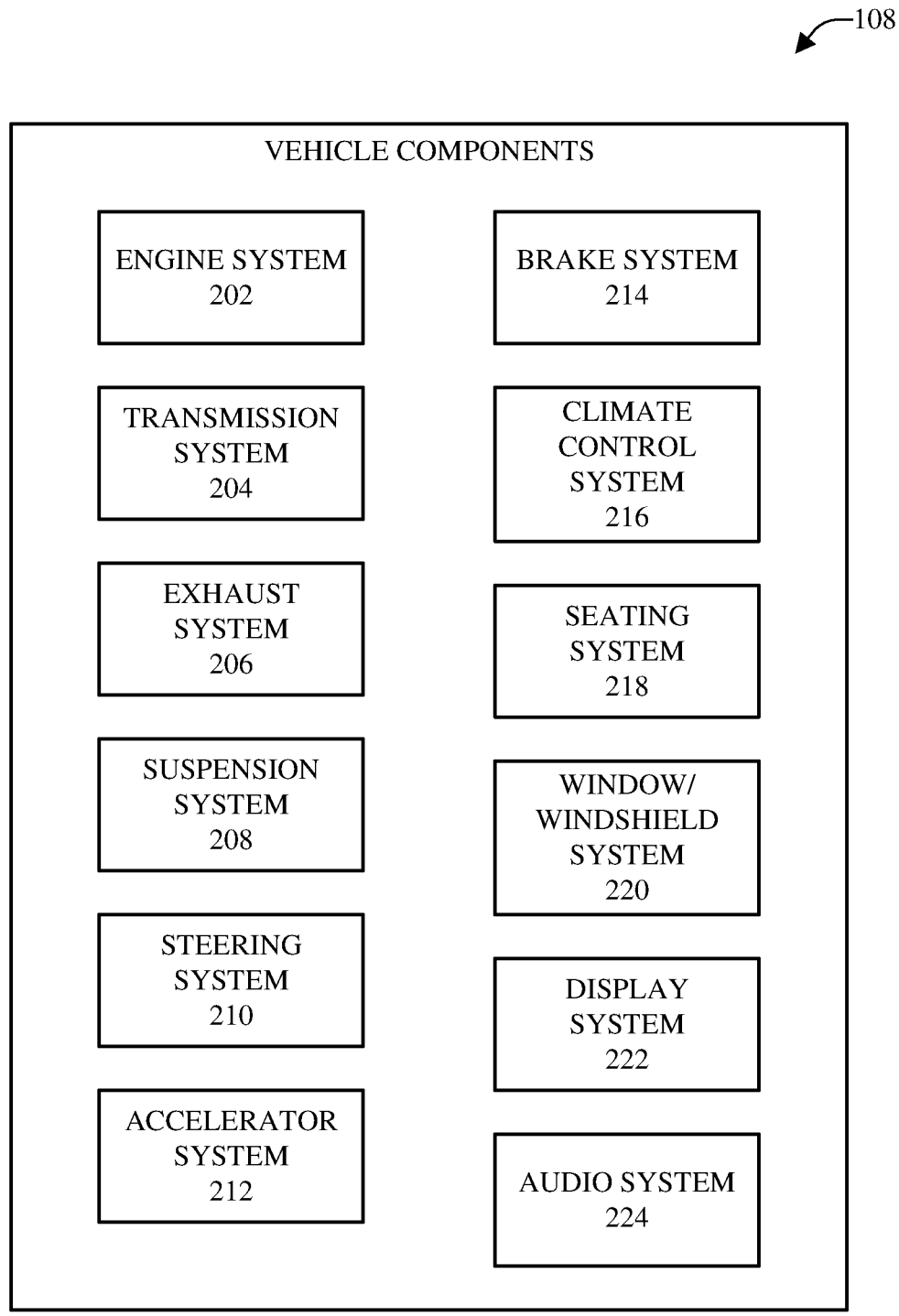
FIG. 2 depicts a block diagram of example vehicle components of a vehicle, in accordance with various aspects and embodiments of the disclosed subject matter.

The orchestrator component 104 and associated agent component 106 can utilize the control content to control operation of various vehicle components 108 (VC) of the vehicle 102. Referring briefly to FIG. 2 (along with FIG. 1), FIG. 2 depicts a block diagram of example vehicle components 108, in accordance with various aspects and embodiments of the disclosed subject matter. The vehicle components 108 can comprise, for example, engine system 202, transmission system 204, exhaust system 206, suspension system 208, steering system 210, accelerator system 212, brake system 214, climate control system 216, seating system 218, window/windshield system 220, display system 222, and/or audio system 224.

The engine system 208 can comprise various parts (e.g., components) of the engine of the vehicle 102. The parts (e.g., electric motor(s) including constituent electric motor parts, and/or gasoline or combustion engine including constituent gasoline or combustion engine components, . . . ) of the engine system 208 can comprise various electronic parts and mechanical parts. The vehicle 102 can be an electric vehicle, a gasoline powered vehicle, or a hybrid electric vehicle.

The transmission system 204 can include various transmission components that can enable controlled application of power to the vehicle 102 and/or shifting between gears of the transmission system 204. The transmission system 204 can be structured, as desired, for an electric vehicle, gasoline powered vehicle, or hybrid electric vehicle. In some embodiments, the vehicle components 108 can comprise an exhaust system 206 that can comprise various exhaust components (e.g., tailpipe, muffler, catalytic converter, or exhaust manifold, . . . ). The suspension system 208 can comprise desired suspension components (e.g., springs, shock absorbers, struts, control arms, joints, rods, and/or suspension control unit, . . . ), depending on the desired suspension structure of the vehicle 102.

The steering system 210 can comprise various steering components that can enable automatic or manual steering of the vehicle 102. The design structure and steering components of the steering system 210 can depend in part on whether the vehicle 102 is autonomous or semi-autonomous. The steering components can comprise a steering control unit, a tracking component, electronic and/or mechanical motors, a power steering pump, tie rod ends, rack and pinion components, a steering wheel, and/or other desired components.

The accelerator system 212 can comprise desired accelerator components that can enable controlling acceleration of, or maintaining a desired speed of, the vehicle 102. The design structure and accelerator components of the accelerator system 212 can depend in part on whether the vehicle 102 is autonomous or semi-autonomous. The accelerator components can comprise an accelerator control unit, a traction control component, a stability control component, an electric or mechanical motor(s), a throttle, an accelerator pedal, and/or other desired components.

The brake system 214 can include desired brake components that can enable controlling the stopping of, or reducing the speed of, the vehicle 102. The design structure and brake components of the brake system 214 can depend in part on whether the vehicle 102 is autonomous or semi-autonomous. The brake components can comprise a brake control unit, an electric or mechanical motor(s), brake pads or disks, rotors, brake drums, cylinders, calipers, a brake pedal, and/or other desired components.

The climate control system 216 can comprise various climate control components that can enable desired controlling of the climate of the vehicle 102, including the heating, cooling, humidity, or other air conditioning of the vehicle 102. The climate control components can comprise a climate control unit, climate controls or switches, a compressor, a condenser, an evaporator, an electric or mechanical motor(s), a heater core, fans, valves, an actuator, hoses, vents, and/or other desired components.

The window/windshield system 220 can include desired window and/or windshield related components that can enable control of the windows of the vehicle 102 (e.g., raise or close a window, or lower or open a window) and/or presentation of visual content on the windows or windshield. The desired window and/or windshield related components can comprise windows, a windshield, electric or mechanical motors (e.g., to raise or lower windows), electric or hydraulic pumps, controls (e.g., buttons or switches), and/or other desired components.

In some embodiments, the display system 222 can comprise one or more display screens. The one or more of the display screens can be associated or integrated with the windows or windshield of the window/windshield system 220 (e.g., a display screen can be associated or integrated with the front windshield, another display screen can be associated or integrated with a side or door window, another display screen can be associated or integrated with a rear window, . . . ). In certain embodiments, one or more display screens can be located in one or more regions of the vehicle (e.g., display screen that can raise up from the dashboard or can drop down from the vehicle ceiling in proximity to the front windshield, display screen that can raise up from a vehicle door or can drop down from the vehicle ceiling, and/or display screen that can raise up from panel behind the back seats or can drop down from the vehicle ceiling in proximity to the rear window). The display system 222 and audio system 224 also can be referred to individually or collectively as a presentation component or presentation system.

Additionally or alternatively, the vehicle occupant can have a UE 110 that can be associated with (e.g., communicatively connected to) the agent component 106 or orchestrator component (e.g., via a communication network). The UE 110 can be or comprise, for example, or a smart or mobile phone, electronic headwear, headset, or goggles (e.g., AR/VR headset), electronic bodywear (e.g., smartwatch), electronic pad or tablet, computer, or other type of communication device. Visual content (e.g., video content, AR content, or VR content) and audio content of the interactive content can be presented to the occupant via the presentation component and/or the UE 110.

Figure 3:
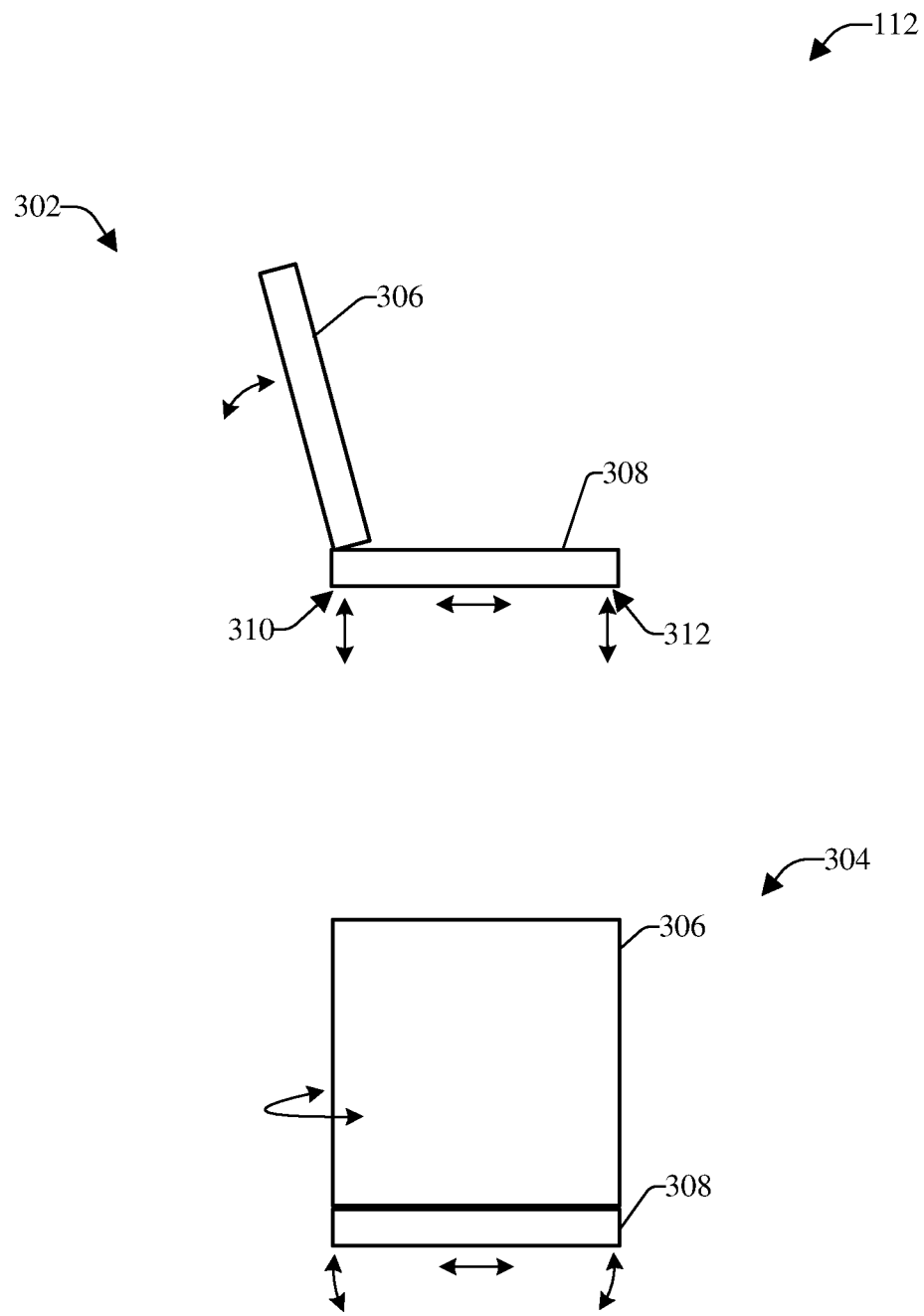
FIG. 3 presents a diagram of an example seat of the seating system of a vehicle, in accordance with various aspects and embodiments of the disclosed subject matter.

The vehicle 102 also can comprise seats, including seats 112 and 114 of the seating system 218, that occupants of the vehicle 102 can sit in when traveling in the vehicle 102 and/or when experiencing content (e.g., interactive content) being presented in the vehicle 102. Turning briefly to FIG. 3 (along with FIGS. 1 and 2), FIG. 3 presents a diagram of an example seat 112 of the seating system 218 of the vehicle, in accordance with various aspects and embodiments of the disclosed subject matter. The seat 112 can be located in a desired area (e.g., region) inside the vehicle 102. A side view 302 of the seat 112 and a back view 304 of the seat 112 are shown in FIG. 3 to illustrate various features of the disclosed subject matter.

The orchestrator component 104 and associated agent component 106 can control the seating system 218 to control movement and positioning of the seat 112. The seating system 218 can comprise various components, such as seat bases, seat backs, electric or mechanical motors, hydraulic or electric pumps or cylinders, controls (e.g., switches or buttons), and/or other desired components, that can provide desirable (e.g., comfortable and/or functional) seating for passengers and enable desired movement of the seats (e.g., 112 or 114) of the vehicle 102. In certain embodiments, the orchestrator component 104 and associated agent component 106 can control the seating system 218 to control movement and positioning of the seat 112 in connection with (e.g., in synchronization with) presentation of visual or audio content on the display screen(s) of the presentation component (e.g., the display system 222 or audio system 224) and/or operation of the vehicle 102. For example, as depicted in the side view 302 of the seat 112, the orchestrator component 104 and associated agent component 106 can control the seating system 218 to control the seat 112 to move the back portion 306 (e.g., seat back) of the seat 112 forward or backward by a desired amount to achieve a desired position of the back portion 306 of the seat 112 in relation to the bottom portion 308 (e.g., seat portion or seat base) of the seat 112. The orchestrator component 104 and associated agent component 106 also can control the seating system 218 to control the seat 112 to move the seat 112 forward or backward by a desired amount, move the rear portion 310 of the seat 112 up or down by a desired amount, and/or move the front portion 312 of the seat 112 up or down by a desired amount.

As depicted in the back view 304 of the seat 112, the orchestrator component 104 and associated agent component 106 can control the seating system 218 to control the seat 112 to move the seat 112 from side to side (e.g., move the seat to the left or to the right) by a desired amount, rotate the seat 112 (e.g., rotate the seat 112 to the left or right) by a desired amount, or tilt the seat 112 (e.g., tilt the left side of the seat upward or downward, or tilt the right side of the seat upward or downward) by a desired amount.

Other aspects of the vehicle components 108 will be described herein in connection with describing various embodiments, features, functions, etc., of the disclosed subject matter.

Figure 4:
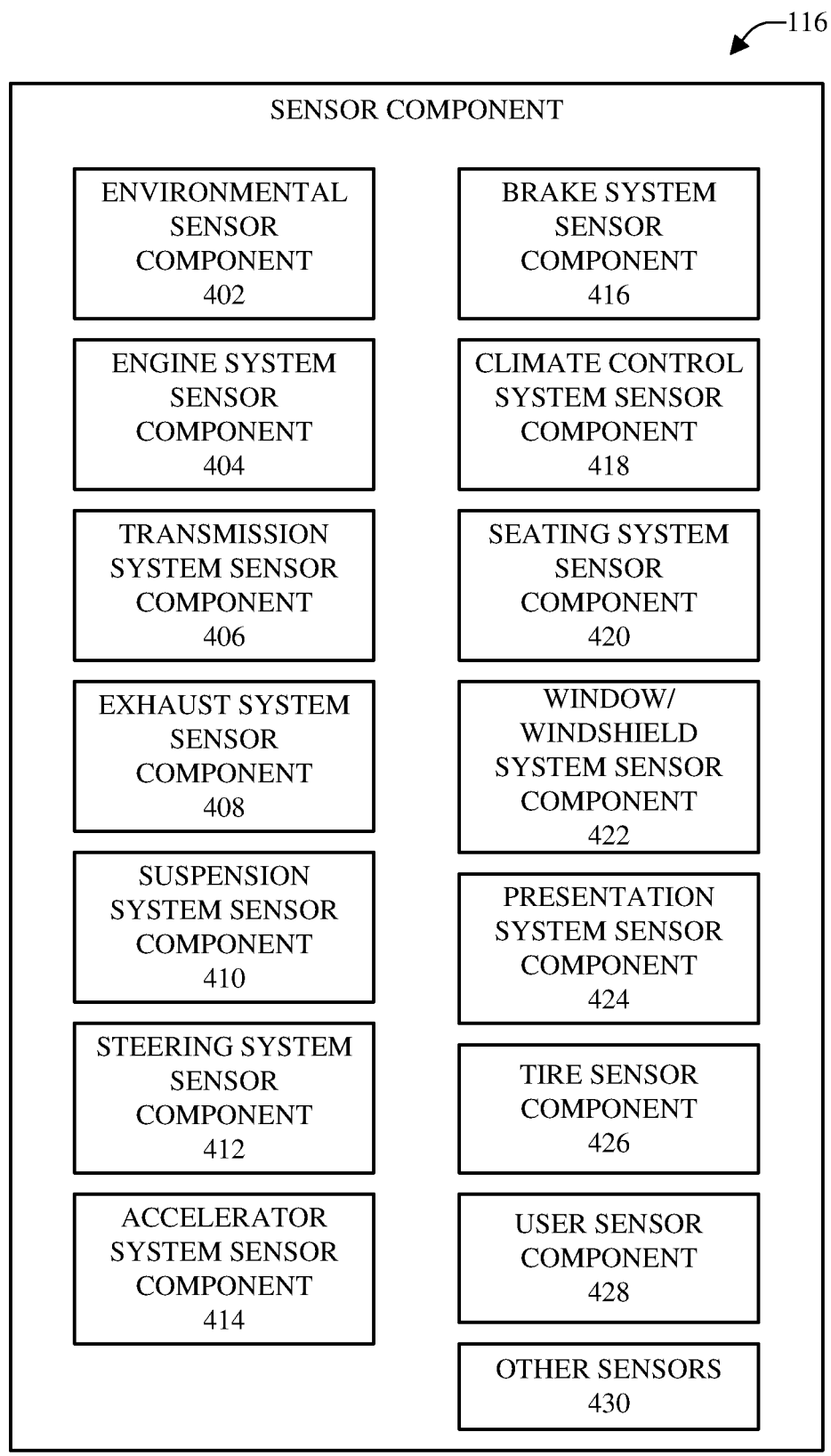
FIG. 4 depicts a block diagram of an example sensor component of or associated with a vehicle, in accordance with various aspects and embodiments of the disclosed subject matter.

In accordance with various embodiments, the vehicle 102 can comprise a sensor component 116 (SC) that can be associated with the orchestrator component 104, agent component 106, and/or vehicle components 108. Referring briefly to FIG. 4 (along with FIGS. 1-3), FIG. 4 depicts a block diagram of an example sensor component 116 of or associated with a vehicle, in accordance with various aspects and embodiments of the disclosed subject matter. The sensor component 116 can comprise a variety of sensors that can be utilized to sense conditions associated with the environment outside or inside of the vehicle 102, sense conditions associated with the vehicle 102 itself, and/or sense conditions associated with users (e.g., occupants of) associated with the vehicle 102. The orchestrator component 104 can utilize the sensor data received from the various sensors of the sensor component 116 to facilitate controlling operation of the vehicle 102 (e.g., controlling operation of the vehicle components 108) and/or determining content to present to the vehicle occupant via the presentation component, as more fully described herein. The sensors of the sensor component 116 can comprise, for example, environmental sensor component 402, engine system sensor component 404 (of or associated with the engine system 202), transmission system sensor component 406 (of or associated with the transmission system 204), exhaust system sensor component 408 (of or associated with the exhaust system 206), suspension system sensor component 410 (of or associated with the suspension system 208), steering system sensor component 412 (of or associated with the steering system 210), accelerator system sensor component 414 (of or associated with the accelerator system 212), brake system sensor component 416 (of or associated with the brake system 214), climate control system sensor component 418 (of or associated with the climate control system 216), seating system sensor component 420 (of or associated with the seating system 218), window/windshield system sensor component 422 (of or associated with the window/windshield system 220), presentation system sensor component 424 (of or associated with the display system 222 and/or audio system 224), tire sensor component 426, user sensor component 428, and/or other sensors 430.

The environmental sensor component 402 can include a variety of environmental sensors, such as, for example, temperature sensors, humidity sensors, sensors that can sense road or ground conditions, wind sensors, air pressure sensors, and/or other sensors that can sense various environmental conditions outside or inside of the vehicle 102. The following are some examples of sensors utilized by the sensor component 116 in relation to the conditions and/or operation of the vehicle 102. For instance, the engine system sensor component 404 can comprise various sensors that can sense conditions and/or operation of various parts (e.g., engine components) of the engine system 202. The suspension system sensor component 410 can comprise various sensors that can sense conditions and/or operation of various parts of the suspension system 208. The steering system sensor component 412 can comprise various sensors that can sense the steering, direction, or orientation of the vehicle 102, and/or various conditions or operations of various parts of the steering system 210, to facilitate desirable steering of the vehicle 102 (e.g., desirable automated steering of an autonomous or semi-autonomous vehicle, or desirable steering (e.g., manual or partially manual steering) of the vehicle). The accelerator system sensor component 414 can comprise various sensors that can sense conditions and/or operation of various parts of the accelerator system 212, for example, in connection with the acceleration or movement of the vehicle 102. The brake system sensor component 416 can comprise various sensors that can sense conditions and/or operation of various parts of the brake system 214. The tire sensor component 426 can comprise sensors that can sense tire air pressure and/or conditions (e.g., tread wear or tread depth, hole or slow air leak, flat or non-flat conditions) of the tires (e.g., tire 118, tire 120) of the vehicle 102.

The user sensor component 428 can comprise various sensors that can sense features (e.g., facial features, eye features, other biometric features, . . . ) of a user, movement of the user, reactions of the user, verbal expressions (e.g., verbal commands, verbal discussion, verbal reactions) of the user, non-verbal expressions of the user, and/or other conditions of the user. For example, the user sensor component 428 can employ sensors that can sense or detect the mood, interest, or level of stimulation of the user. That is, the user sensor component 428 can employ sensors that can sense, determine, or facilitate determining whether the user is smiling, happy, frowning, sad, mad, excited, stimulated, interested (e.g., interested in content being presented to the user, or interested in a content or entertainment experience recommendation), and/or disinterested (e.g., disinterested in such content or such content or entertainment experience recommendation), etc.

Other aspects of the sensors of the sensor component 116 will be described herein in connection with describing various embodiments, features, functions, etc., of the disclosed subject matter.

The orchestrator component 104 can determine interactive content based at least in part on conditions associated with the vehicle (e.g., environmental conditions associated with the vehicle, conditions of the vehicle, including conditions relating to vehicle capabilities or functions), user preferences (e.g., preferences of a vehicle occupant(s)), user context (e.g., mood or level of stimulation of the user), video content (e.g., video content requested by an occupant), or other desired (e.g., pertinent) information. Interactive content can comprise video or visual content, audio content, and control content. The video or visual content can comprise AR and/or VR content.

The orchestrator component 104 or the agent component 106 can present a portion of the interactive content (e.g., video or visual content, AR content, VR content, and/or audio content), via the presentation component (e.g., one or more display screens of the display system 222 and/or the audio system 224) of the vehicle 102 or the UE 110, to the occupant of the vehicle 102. The orchestrator component 104 or agent component 106 can utilize the control content of the interactive content to control vehicle operation in relation to or in synchronization with the presentation of the video, visual, or audio portion of the interactive content, via the presentation component, to the occupant in the vehicle.

In certain embodiments, the orchestrator component 104 can detect or determine the context (e.g., cognitive load, mood, level of stimulation, . . . ) of an occupant of the vehicle 102 based at least in part on the sensor data received from the sensor component 116 of the vehicle 102. As more fully described herein, the orchestrator component 104 can match the context of the occupant to the activity level of the occupant to stimulate the occupant and/or keep the occupant awake without exhausting the occupant (e.g., without over-stimulating the occupant to the point of exhaustion).

In some embodiments, the orchestrator component 104 can correlate between certain roads on which the vehicle 102 can travel and entertainment presentations (e.g., interactive content) presented to an occupant in the vehicle 102. The orchestrator component 104 also can correlate (or inversely correlate) entertainment presentations based at least in part on the weather or other environmental conditions being experienced by the occupant while traveling in the vehicle 102. In accordance with various other embodiments, the orchestrator component 104 can provide interactive content that can provide education or health benefits to the occupant of the vehicle 102, or interactive content that can comprise advertising (e.g., contextual advertising or other advertising) or be associated with advertising along or in proximity to the route of travel of the vehicle 102. In some embodiments, the orchestrator component 104 can control one or more electronic advertising devices (e.g., electronic billboards or other electronic advertisements) along a travel route of the vehicle 102, and/or can negotiate with a device(s) associated with such electronic advertising device(s), to have the one or more electronic advertising devices present certain interactive content (e.g., AR or VR content and/or customized advertising) to the occupant of the vehicle 102 as the vehicle 102 is traveling in proximity to each of the one or more electronic advertising devices.

The orchestrator component 104 also can design or create entertainment or educational experiences around geographic locations, sports, historical sites, nostalgia, local activities, or even road materials, etc. For example, if the vehicle 102 is at or relatively near to a historical site or a site for which a desirable educational experience can be presented (and/or based at least in part on user preferences of the occupant that indicate the occupant may be interested in an entertainment or educational experience relating to the historical site or the site associated with the desirable educational experience), the orchestrator component 104 can recommend a desirable entertainment or educational experience to the occupant of the vehicle 102 via the agent component 106 and/or the presentation component (or UE 110 of the occupant), wherein such entertainment or educational experience can comprise interactive content relating to such historical site or other site associated with the desirable educational experience. In response to the occupant selecting such entertainment or educational experience, the orchestrator component 104 can design (e.g., determine) or create a desirable entertainment or educational experience, which can comprise interactive content relating to such historical site or other site associated with the desirable educational experience. In some embodiments, the orchestrator component 104 can already have pre-determined and pre-generated all or a portion of the interactive content regarding such entertainment or educational experience, and can retrieve all or the portion of the interactive content from a database, which can be stored in the data store 122. The orchestrator component 104 can provide such entertainment or educational experience, including such interactive content, or information relating thereto, to the agent component 106 for presentation to the occupant of the vehicle 102.

In certain embodiments, as desired, such entertainment or education experiences can be sold to a vehicle occupant (e.g., as part of a subscription or on an individual or on-demand basis). For example, an entertainment experience can be associated with a particular roadway, which has unique characteristics, and the orchestrator component 104 can determine and generate interactive content based at least in part on the unique characteristics of that roadway. Such entertainment experience can be sold to an occupant of the vehicle 102, wherein the vehicle occupant can purchase the entertainment experience and enjoy the entertainment experience as the vehicle 102 travels on the roadway.

As an example use of the system 100 by a user, a user (e.g., occupant) can be inside the vehicle 102 and can engage the system 100. The orchestrator component 104 can identify the user based at least in part on sensor data obtained from sensors of the sensor component 116 sensing the user or user input information (e.g., identification information and/or authentication information) received from the user. The orchestrator component 104 can retrieve a user profile of the user from a data store 122, wherein the user profile can comprise information relating to the user, such as preferences and/or interests of the user, and/or historical activity of the user, etc. The preferences and/or interests of the user can relate to, for example, the types of content (e.g., action content, drama content, comedy content, . . . ; movie content, television program content, . . . ; audio content; . . . ) the user desires, the format of the content (e.g., video content without AR or VR; content with AR and/or VR) desired by the user, and/or entities (e.g., particular actors or performers) preferred by the user. The historical activity can relate to, for example, past content the user has experienced (e.g., viewed and/or listened to) while traveling in the vehicle 102 (or another vehicle), locations the user has visited while traveling in the vehicle 102 (or another vehicle), and/or past interactions of the user with the system 100.

If the user has not selected particular content or a particular experience, the orchestrator component 104 can determine content (e.g., interactive content, video content, and/or audio content) that can be desirable to the user based at least in part on the result of analyzing the preferences and/or interests of the user, historical activity of the user, user input information received (e.g., via an interface of the agent component 106) from the user, and/or a context (e.g., mood, cognitive load, level of stimulation, . . . ) of the user as determined by the orchestrator component 104 based at least in part on sensor data. If the user has a particular destination in mind, the orchestrator component 104 or another component of or associated with the vehicle 102 can control operation of the vehicle 102 to have the vehicle travel to the desired destination. If the user does not have a particular destination in mind, but rather just desires to travel and be entertained in the vehicle 102, the orchestrator component 104 can determine a destination to which to take the user based at least in part on the result of analyzing the preferences and/or interests of the user, the historical activity of the user, user input information received (e.g., via an interface of the agent component 106) from the user, and/or the context of the user. The user input information can comprise, for instance, information regarding a general interest of the user with regard to where to travel. The orchestrator component 104 can analyze and utilize the information regarding the general interest of the user as a seed in determining a travel destination and/or a travel route to the destination for the user.

In some embodiments, the user (e.g., vehicle occupant) can provide input information that can comprise, for example, a picture or video depicting a location, a situation, or an activity (e.g., a vehicle action sequence). The orchestrator component 104 can analyze such input information (e.g., picture or video) and/or other relevant information, and can determine an entertainment experience, including interactive content, based at least in part on the results of analyzing the picture or video and/or the other relevant information (e.g., location data, environmental conditions, and/or vehicle conditions, . . . ).

In some embodiments, as the vehicle 102 is traveling and presenting content to the user, the orchestrator component 104 can identify and track location mentions or references in the content, which the orchestrator component 104 can store (e.g., in the data store 122) and serialize, for instance, until the user goes to a specific location. For example, if the content references a particular location (e.g., a city near where the vehicle 102 is traveling, a historical location near where the vehicle 102 is traveling, or a filming location where a scene of the content (e.g., movie content) was filmed, . . . ), the orchestrator component 104 can identify that particular location and store information relating to that particular location in the data store 122, and/or can present (e.g., via the agent component 106 and/or presentation component and/or UE 110) a recommendation (e.g. suggestion) to the user to recommend traveling to that particular location. If a particular entertainment experience (e.g., recreation of a vehicle action sequence from the movie that was filmed at the particular location) can be provided by the orchestrator component 104 and/or vehicle 102, the orchestrator component 104 also can present, to the user, information that can indicate the availability of such particular entertainment experience.

In accordance with various embodiments, to facilitate determining a travel destination and/or an entertainment experience for the user, the orchestrator component 104 can allow the user to provide input (e.g., user input information) as interactive guidance. For instance, the orchestrator component 104 can present, via the agent component 106, presentation component and/or UE 110, various topics to the user, wherein the user can select a desired topic using an interface of the agent component 106, presentation component, and/or UE 110. The topics can relate to, for example, genres (e.g., nostalgia, historical travel, . . . ), alignment with personal events (e.g., sports events or activities, life events or activities, local events or activities, . . . ), and/or seasonal topics or guidance (e.g., Fall-related, Spring-related, Summer-related, or Winter-related events or activities; Halloween-related, Thanksgiving-related, or Christmas-related events or activities; . . . ) for what can be done at different times of the year.

Additionally or alternatively, the orchestrator component 104 can present, via the agent component 106, presentation component, and/or UE 110, various examples (e.g., content examples, activity examples, event examples, . . . ) to the user, wherein the user can select a desired example using an interface of the agent component 106, presentation component, and/or UE 110. For instance, the orchestrator component 104 can present a specific content example (e.g., recorded content, pictures, etc.) to the user.

Additionally or alternatively, the orchestrator component 104 can present, via the agent component 106, presentation component, and/or UE 110, various items to the user to allow for discovery of different items by the user, wherein the user can select a desired item using an interface of the agent component 106, presentation component, and/or UE 110. For instance, the orchestrator component 104 can present, via the agent component 106, presentation component, and/or UE 110, certain areas, certain sites, or crowd-suggested areas in a locale nearby the vehicle 102. The orchestrator component 104 can receive (e.g., obtain or collect) information regarding locales where people can be gathered and/or that people have recommended, and can determine crowd-suggested areas based at least in part on the results of analyzing such received information. These can be areas, sites, or locales that the user may or may not typically consider. For example, the orchestrator component 104, employing the agent component 106, presentation component, and/or UE 110, can allow the user to select or modify the diversity of actions and locations (e.g., areas, sites, or locales) that can be presented to the user to break the user out of the user's "filter bubble" to present new or different locations and activities that the user may not have otherwise considered.

In other embodiments, additionally or alternatively, the orchestrator component 104 can present, via the agent component 106, presentation component, and/or UE 110, contextual recommendations that can be determined based at least in part on the user and/or other users (e.g., other occupants of the vehicle 102) and/or the respective contexts of the user and/or other users. For instance, the orchestrator component 104 can determine the contextual recommendations based at least in part on user input information received from one or more users (e.g., one or more occupants of the vehicle 102), user preferences of the one or more users, and/or sensor data indicating respective contexts (e.g., mood, level of stimulation, . . . ) of the one or more users. The contextual recommendations determined and presented by the orchestrator component 104 also can be based at least in part on interactive content currently being presented to the user(s) in the vehicle 102. As an example of contextual recommendations, if there is a child in the vehicle 102, a user (e.g., parent of the child) can desire that the contextual recommendations (e.g., recommendation for an entertainment experience, including the interactive content) take into account or accommodate the characteristics (e.g., age, sex, interests, . . . ) of the child, and can provide user input information or can have user preferences indicating that the characteristics of the child be taken into account. The orchestrator component 104 can determine contextual recommendations based at least in part on the characteristics of the child as well as the user input information and/or user preferences associated with the other user(s) (e.g., parent) and/or context(s) of the user(s).

As an alternative example, even if there is a child in the vehicle 102, a user (e.g., parent) can desire that the fact that a child is in the vehicle 102 can be disregarded when determining contextual recommendations for the users in the vehicle 102, and can provide user input information and/or have user preferences indicating that the child can be disregarded when determining contextual recommendations. The orchestrator component 104 can determine the contextual recommendations based at least in part on the user input information and/or user preferences associated with the other user(s) (e.g., parent) and/or context(s) of the user(s), while disregarding the fact that the child is in the vehicle 102.

In some embodiments, with regard to an entertainment experience selected by an occupant(s) of the vehicle 102, the orchestrator component 104 can determine and tailor (e.g., customize) interactive content of the entertainment experience for different occupants based at least in part on the respective characteristics and/or preferences of the different occupants, wherein a first portion of the interactive content can be determined for and presented to a first occupant of the vehicle 102 and a second portion of the interactive content (e.g., different interactive content) can be determined for and presented to a second occupant of the vehicle 102. For instance, the orchestrator component 104 can analyze the respective characteristics and/or preferences of the different occupants of the vehicle 102. Based at least in part on the results of analyzing the respective characteristics and/or preferences of the first and second occupants, with regard to the entertainment experience, the orchestrator component 104 can determine the first portion of the interactive content to be presented to the first occupant and the second portion of the interactive content to be presented to the second occupant. The differences in the first portion and second portion of the interactive content can comprise differences in the visual content (e.g., video content, AR content, and/or VR content), audio content, control content, and/or haptic content presented or provided to the first and second occupants or provided in connection with the first and second occupants.

For example, if the first occupant is an adult and/or an educated person, and the second occupant is a child and/or a less educated person, the orchestrator component 104 can determine the first portion of the interactive content and the second portion of the interactive content to have the first portion provide the first occupant an entertainment experience that can be customized to be desirable (e.g., suitable or optimal) to an adult and/or educated person (and in accordance with the first occupant's preferences and characteristics) and the second portion provide the second occupant an entertainment experience that can be customized to be desirable (e.g., suitable or optimal) to a child and/or less educated person (and in accordance with the second occupant's preferences and characteristics). For instance, if the entertainment experience relates to a historical site or event, the first portion of the interactive content can comprise more detailed visual content and/or audio content regarding the historical site or event than the second portion of the interactive content. As an additional or alternative example, the second portion of the interactive content can comprise visual content (and associated audio content) that can be in a cartoon form suitable for the age and/or education level (e.g., relatively lower age and/or education level) of the second occupant, whereas the first portion of the interactive content can comprise visual content (and associated audio content) that can include detailed and/or graphic video or visual images (and detailed and/or graphic information in audio form) relating to the historical site or event that can be more suitable for the age and/or education level of the first occupant.

The orchestrator component 104 can communicate the first and second portions of the interactive content to or via the agent component 106. The first portion of the interactive content (e.g., the first visual content and first audio content of the first portion) can be presented to the first occupant of the vehicle 102 via a first display screen(s) and/or first audio interface of the presentation component or via the first occupant's UE (e.g., UE 110), and the second portion of the interactive content (e.g., the second visual content and second audio content of the second portion) can be presented to the second occupant via a second display screen(s) and/or second audio interface of the presentation component or via the second occupant's UE.

The orchestrator component 104 also can perform a run-time variance of entertainment experiences, including interactive content, presented or provided to users based at least in part on a number of factors, including, for example, crowd issues associated with entertainment experiences (e.g., crowd control), biometric issues (e.g., biometric-based variance) associated with users, and/or needs or desires of users or associated vehicles (e.g., locations of charging stations for charging of the vehicle 102, accommodations for vehicle occupants, . . . ). For instance, the orchestrator component 104 can control entertainment experiences to achieve desired crowd control with respect to respective locations of respective entertainment experiences to avoid having too many people at one particular location. If the orchestrator component 104 determines that a particular location associated with a particular entertainment experience has a relatively large crowd (e.g., the number of people at such location exceeds a defined threshold number of people applicable to such location), the orchestrator component 104 can determine that the entertainment experience should not be provided to the user and associated vehicle 102, or can recommend a different entertainment experience to the user, or can offer the entertainment experience to the user with a surcharge (e.g., an additional cost (e.g., financial cost)). A surcharge can discourage the user from selecting the entertainment experience, but still allow the user to select the entertainment experience if it is important enough to the user.

As another example, the orchestrator component 104 can determine and entertainment experience, including interactive content, or a portion thereof, based at least in part on an opinion or response of a user(s) to the current activity, limitations of a user(s) (e.g., tolerance for certain possible movements of the vehicle 102, tolerance for a certain type of music or volume of music, tolerance for alcohol, or other limitations) in the vehicle 102 (e.g., as known by the orchestrator component 104). For instance, if an occupant of the vehicle 102 has a particular low tolerance to loud music or sounds, the orchestrator component 104 can learn of such tolerance through input information or preferences from or associated with the occupant and/or can identify such tolerance based at least in part on the results of evaluating sensor data relating to the response of the occupant to loud music or sounds or being advised that an entertainment experience can involve loud music or sounds. The orchestrator component 104 can tailor (e.g., customize), modify, or structure an entertainment experience, including interactive content, to present (e.g., via the agent component 106, presentation component, and/or UE 110) the entertainment experience, including interactive content, to the occupant at a volume level that is lower than a threshold volume level above which has been determined to be too loud for the occupant and/or can recommend or present an entertainment experience, including interactive content, that does not contain loud music or sounds.

If an occupant has a relatively low tolerance for sudden or jerking vehicle movements (e.g., if the occupant can easily get car sick or has another health condition that can make sudden or jerking vehicle movements undesirable, inadvisable, or potentially dangerous), the orchestrator component 104 learn or identify such low tolerance for sudden or jerking vehicle movements based at least in part on input information or preferences from or associated with the occupant and/or can identify such low tolerance based at least in part on the results of evaluating sensor data relating to the response of the occupant to sudden or jerking vehicle movements or being advised that an entertainment experience can involve sudden or jerking vehicle movements. The orchestrator component 104 can tailor, modify, or structure an entertainment experience, including interactive content, to present (e.g., via the agent component 106, presentation component, and/or UE 110) the entertainment experience, including interactive content and including control of operation of the vehicle 102, to the occupant such that particular movements (e.g., acceleration, stops, turns, . . . ) of the vehicle 102 can be lower than a threshold movement level above which has been determined to be too high of vehicle movement for the occupant and/or can recommend or present an entertainment experience, including interactive content and control of operation of the vehicle 102, that does not involve vehicle movements that would exceed the threshold movement level. For instance, the orchestrator component 104 can tailor or modify an entertainment experience, including interactive content and operation of the vehicle 102, to modify or exclude a portion(s) of the entertainment experience, including interactive content and operation of the vehicle 102, that would involve movement of the vehicle that would exceed the threshold movement level.

As still another example of run-time variance or structuring of entertainment experiences, the orchestrator component 104 can determine or tailor an entertainment experience, including interactive content and operation of the vehicle 102, to account for needs or desires of a vehicle occupant or the vehicle 102. For instance, the orchestrator component 104 can determine the charging specifications (e.g., charging requirements, traveling range on a charge) of the vehicle 102, a current charge level of the batteries of the vehicle 102, the amount of power to be used during an entertainment experience (e.g., for each entertainment experience under consideration, and for each portion (e.g., leg) of each entertainment experience), locations of charging stations, and/or respective charging costs at respective charging stations, based at least in part on an analysis of sensor data associated with the vehicle 102, information relating to locations of charging stations, and information relating to entertainment experiences. Based at least in part on such determinations, the orchestrator component 104 can determine, tailor, and/or recommend (e.g., to the occupant) an entertainment experience, including interactive content and operation of the vehicle 102, that can desirably entertain the vehicle occupant, and/or a travel route that is suitable for the entertainment experience, while also being able to satisfy the charging specifications (e.g., charging requirements or needs) of the vehicle 102 and/or other criteria (e.g., financial costs for charging the vehicle 102).

Additionally or alternatively, the orchestrator component 104 can determine locations of restaurants, restroom facilities, hotels or motels, and/or other types of accommodations, and/or respective costs or other factors or constraints (e.g., financial costs, time costs, . . . ) associated with such accommodations, based at least in part on information relating to accommodations, and can determine desires or preferences of the vehicle occupant with regard to the various types of accommodations based at least in part on input information and/or preferences associated with the occupant or sensor data relating to the response of the occupant to various types of accommodations. Based at least in part on such determinations, the orchestrator component 104 can determine, tailor, and/or recommend (e.g., to the occupant) an entertainment experience, including interactive content and operation of the vehicle 102, that can desirably entertain the vehicle occupant, and/or a travel route that is suitable for the entertainment experience, while also being able to satisfy the desires or preferences for accommodations of the occupant of the vehicle 102 (and/or satisfy other applicable constraints or factors).

In certain embodiments, the orchestrator component 104 can determine content (e.g., interactive content and associated entertainment experience) recommendations with regard to locations. For instance, the orchestrator component 104 can determine a location for context and/or exploration of the location with respect to an occupant of the vehicle 102, based at least in part on input information or preferences associated with the occupant (and/or other users), context associated with the occupant and/or vehicle 102, and/or sensor data relating to the occupant and/or vehicle 102, and the orchestrator can recommend (e.g., via the agent component 106, presentation component, and/or UE 110) the location to the occupant for future or current consumption (e.g., experiencing) by the occupant and/or other users. As desired, the orchestrator component 104, employing the agent component 106, sensor component 116, presentation component, and/or UE 110, can facilitate creating a streaming or live retelling of the content (e.g., interactive content) associated with the location to augment the location and/or entertainment experience associated with the location. The orchestrator component 104 can facilitate presenting the streaming or live retelling of the content on another device (e.g., a communication device, such as a television, computer, or mobile or smart phone) and/or storing the streaming or live retelling of the content in the data store 122.

In accordance with various embodiments, the orchestrator component 104 can determine and generate an entertainment experience, including interactive content, that can create or recreate a desired activity or event. The desired activity or event can comprise or relate to, for example, an amusement park ride (e.g., a rollercoaster, a Ferris or observation wheel, dodgem or bumper cars (without actually bumping or crashing into other vehicles), tunnel of love ride, or other ride), a drag race or car race (e.g., a generic drag or car race, or a recreation or reenactment of a race), a parade or holiday-themed activity (e.g., Thanksgiving Day parade, Christmas parade, St. Patrick's Day parade, haunted house, or other parade, activity, or event), a game (e.g., occupant can be immersed in and be a participant in the recreation of a desired game, which can be a board game, electronic game, or video game), a plane ride (e.g., jet plane ride or historical plane ride), a helicopter ride, a spaceship expedition, a historical scene (e.g., a historical reenactment of a historical event, such as a war event, a civil rights event, or other desired historical event), a military scene (e.g., a World War II, Vietnam War, or Civil War battle reenactment), an environmental or recreational activity (e.g., a scenic vehicle ride, such as a scenic train ride (e.g., a scenic trade ride through a scenic part of the western United States), or a white water rafting excursion in a scenic location), a vehicle driving stunt (e.g., fishtailing, donut maneuver, vehicle jump, driving on two wheels, or other desired stunt), or another desired activity or event.

The orchestrator component 104 can receive and analyze user input information, user preference information, sensor information from the sensor component 116 (or another source of sensor data), and/or other information, and can determine the desired activity or event based at least in part on the results of analyzing such information. Also, based at least in part on an analysis of such information and information retrieved from the data store 122 or other data sources (e.g., a database external to the data store 122), the orchestrator component 104 can determine interactive content that can desirably create, recreate, or reenact the desired activity or event. The interactive content can comprise visual content, which can include AR and/or VR content, wherein the AR content can augment a real-world scene (e.g., an AR 3-D scene) with visual, audio, and/or textual content generated by the orchestrator component 104, and wherein the VR content can comprise a virtual scene (e.g., a virtual 3-D scene) that can include visual (e.g., virtual objects), audio, and/or textual content generated by the orchestrator component 104. The interactive content also can comprise control content that can be utilized by the agent component 106 to facilitate controlling operation of the vehicle 102 (e.g., controlling movement and steering of the vehicle 102, controlling seat components of the seating system 218, controlling suspension components of the suspension system 208, . . . ) to facilitate desirably creating, recreating, or reenacting the desired activity or event in connection with (e.g., in synchronization with, or in relation to) the presentation of the visual content via the presentation component or UE 110.

In some embodiments, the orchestrator component 104 can utilize artificial intelligence (AI), including AI techniques and/or AI algorithms, to determine the interactive content, such as, for example, the control content. For example, the orchestrator component 104 can employ desired AI techniques and/or algorithms to have an AI component (not shown) interact with the suspension system 208 (e.g., hydraulics components or other suspension components) of the vehicle 102 to enhance the sensations the occupant experiences during the presentation of the entertainment experience, including the interactive content, and/or otherwise enhance the traveling experience of the occupant in the vehicle 102.

In accordance with various embodiments, the orchestrator component 104 or the agent component 106 can learn and/or determine location physics for an area (e.g., geographical region), wherein the orchestrator component 104 or the agent component 106 can learn and/or determine, for example, patterns for the area and can utilize those patterns for different content (e.g., bin packing and matching between different moves and content). For example, as the vehicle 102 (or another vehicle) is traveling through a given area, the orchestrator component 104 or the agent component 106 of the vehicle 102 (or another agent component of the other vehicle) can learn and/or determine patterns or characteristics for the given area, and the orchestrator component 104 can utilize those patterns or characteristics with respect to different content that can be presented or provided to occupants of vehicles that subsequently travel in that given area. For instance, the orchestrator component 104 can determine control content to that is to be utilized (e.g., executed) by a vehicle traveling in the given area based at least in part on those patterns or characteristics of the given area as well as other information (e.g., sensor data relating to vehicle conditions of such vehicle, environmental conditions associated with the area, . . . ).

The orchestrator component 104 can provide (e.g., communicate) the interactive content to the agent component 106, or the agent component 106 can otherwise access the interactive content (e.g., when the agent component 106 is part of the orchestrator component 104). The agent component 106 can utilize the interactive content to present the visual and audio portions (e.g., visual and audio content, which can comprise AR and/or VR content) of the interactive content via the presentation component of the vehicle 102, and the control content to control operation of the vehicle components 108 of the vehicle 102 in connection with (e.g., in synchronization with) the presentation of the visual and audio portions of the interactive content to desirably create, recreate, or reenact the desired activity or event.

Figure 5:
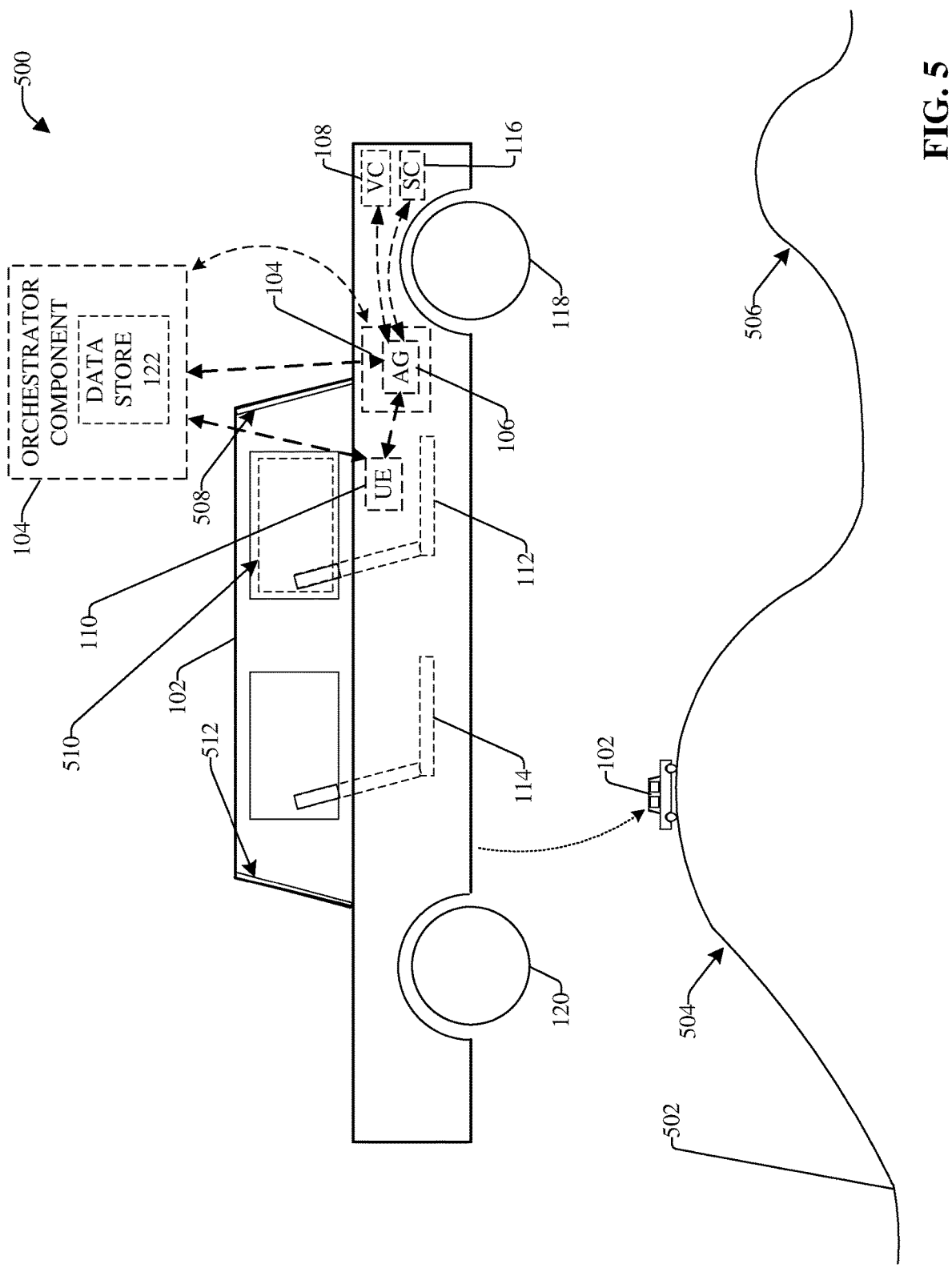
FIG. 5 presents a diagram of a non-limiting example interactive rollercoaster ride experience associated with a road, in accordance with various aspects and embodiments of the disclosed subject matter.

As an example non-limiting illustration, the orchestrator component 104 can provide an interactive entertainment experience that can recreate the experience of a person riding on a rollercoaster as the person is traveling in the vehicle 102. Referring to FIG. 5 (along with FIGS. 1-4), FIG. 5 presents a diagram of a non-limiting example interactive rollercoaster ride experience 500 associated with a road, in accordance with various aspects and embodiments of the disclosed subject matter. For instance, there can be a road 502 that can have a number of hills (e.g., hill 504, hill 506, . . . ), curves, twists, and/or other features that can bear some similarities to a rollercoaster ride. The road 502 can even be known to people as a road that is reminiscent of a rollercoaster ride. A road (e.g., road 502) or an area can be a general public road or area available for travel by vehicles, or can be a dedicated (or semi-dedicated) public or private road or area that can be available to users and associated vehicles for use in connection with an entertainment experience at a cost (e.g., rent, fee, toll, or surcharge) to such users.

In some embodiments, the orchestrator component 104 can receive information (e.g., environmental and/or road information) relating to the road 502 from one or more data sources, which can include sensor data from the vehicle 102 (e.g., from the sensor component 116 of the vehicle 102) or other vehicles that have traveled on that road, and/or land or road survey information from land or road surveys that have been performed on or with respect to the road.

The orchestrator component 104 can analyze the information relating to the road 502 and/or rollercoaster-related information relating to a rollercoaster and surrounding scenery that the orchestrator component 104 is intending to recreate. Based at least in part on the analysis results, the orchestrator component 104 can determine and generate interactive content that can recreate a rollercoaster ride experience for a vehicle occupant as a vehicle (e.g., vehicle 102) travels down that road. The interactive content can comprise AR and/or VR content that can recreate the 3-D scenery (e.g., 3-D imagery) and sounds of a rollercoaster and surrounding amusement park (e.g., other amusement park rides, foods stands, park patrons, etc., of an amusement park) that a rider may see and hear while riding the rollercoaster. The scenery of the AR and/or VR content can correspond to (e.g., can parallel or be compatible with) or substantially correspond to the hills (e.g., hill 504, hill 506, . . . ), curves, twists, and/or other features of the road 502. The orchestrator component 104 can provide (e.g., communicate) the interactive content to the agent component 106 or otherwise enable the agent component 106 to access the interactive content.

As the vehicle 102 travels on the road 502, the agent component 106 can present the visual content and audio content of the interactive content to the occupant, via the presentation component or UE 110, in synchronization with movement of the vehicle 102 on the road 502, wherein the movement of the vehicle 102 can be controlled based at least in part on the control content of the interactive content, such as described herein. In some embodiments, a front display screen 508 (e.g., of or associated with the front windshield of the vehicle 102) of the display system 222 can present a first portion of the AR and/or VR content that can recreate a first portion of the amusement park scene from a first viewing perspective that can represent what a person can see while looking forward during the rollercoaster ride; a side display screen 510 (e.g., of or associated with a door or side window of the vehicle 102) of the display system 222 can present a second portion of the AR and/or VR content that can recreate a second portion of the amusement park scene from a second viewing perspective that can represent what the person can see while looking to the side during the rollercoaster ride; and/or a rear display screen 512 (e.g., of or associated with the rear window of the vehicle 102) of the display system 222 can present a third portion of the AR and/or VR content that can recreate a third portion of the amusement park scene from a third viewing perspective that can represent what the person can see while looking behind himself or herself during the rollercoaster ride. In other embodiments, the visual content and audio content can be presented to the occupant via the UE 110. The orchestrator component 104 can determine and generate one or more different sets of interactive content that can represent or recreate one or more different rollercoaster rides (e.g., a generic rollercoaster ride, a rollercoaster side specific to the features of the road, or a popular or known rollercoaster ride from an amusement park).

The orchestrator component 104 also can determine and generate control content of the interactive content based at least in part on the results of analyzing the sensor data, the information (e.g., environmental and/or road information) relating to the road 502, wherein the sensor data can comprise environmental information relating to the environment and/or vehicle information relating to conditions associated with the vehicle 102. The agent component 106 can utilize the control content to control operation of the vehicle 102, including, for example, operation (e.g., movements) of the seating system 218, including the seats 112 and/or 114, operation of the suspension system 208, engine system 202, steering system 210, accelerator system 212, and/or brake system 214, etc., to recreate the experience (e.g., physical sensation) of riding a rollercoaster. For instance, the agent component 106 can utilize (e.g., execute) the control content to control the speed of the vehicle to slow down the speed of the vehicle 102 as the vehicle 102 moving up the highest hill on the road 502 to recreate the experience of the rollercoaster cars climbing the lift hill to the peak of the lift hill of the rollercoaster, and, after the vehicle 102 reaches the peak, increase the speed of the vehicle 102 as the vehicle 102 proceeds down the hill. The agent component 106 also can utilize the control content to control operation of the seat (e.g., 112 or 114) of the occupant and/or the suspension parts of the suspension system 208 to enhance the effects of the hills, curves, twists, and/or other features of the road 502 to enhance the physical sensation the occupant experiences during the interactive rollercoaster ride experience 500.

Figure 6:
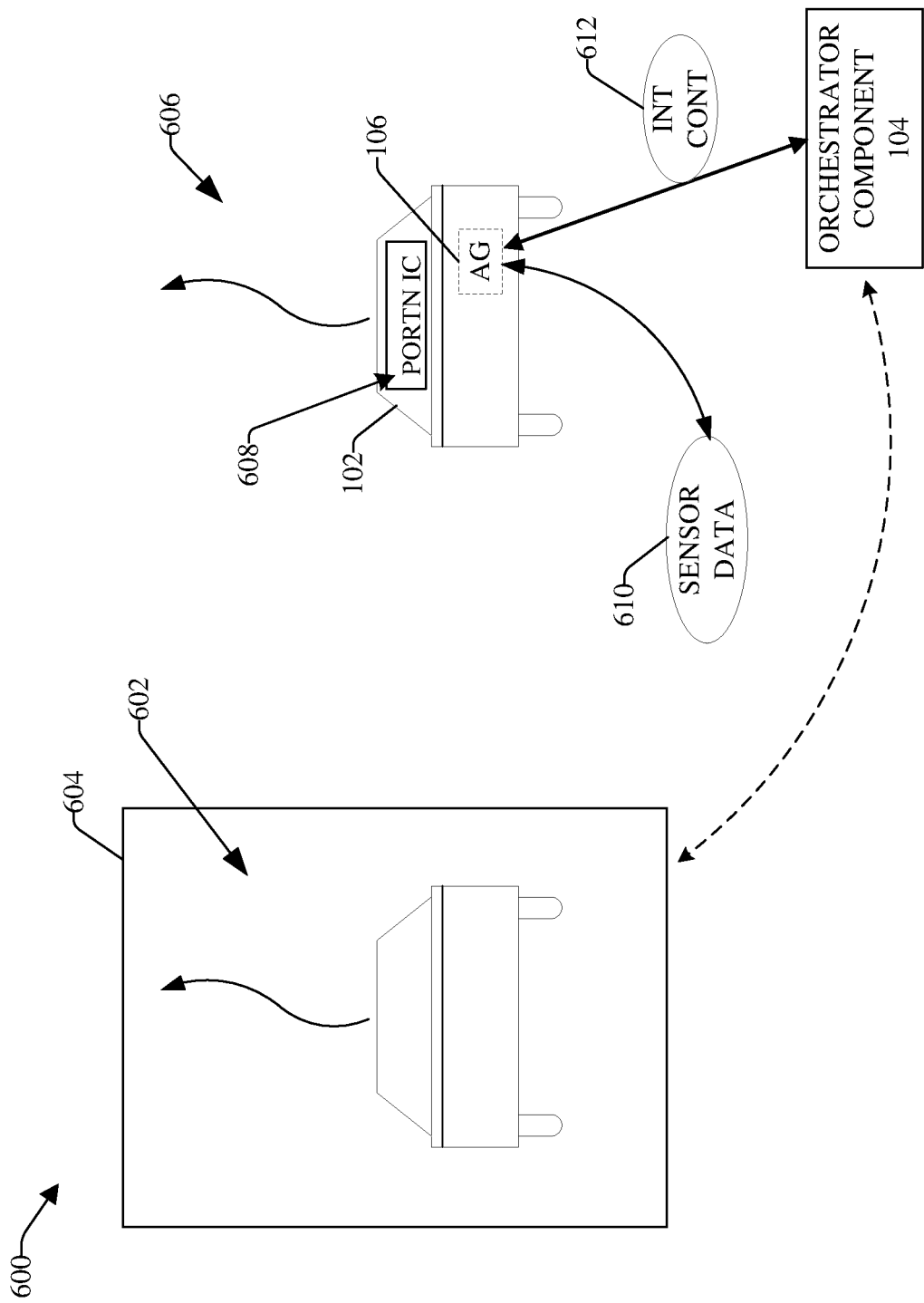
FIG. 6 presents a diagram of an example vehicle-action-sequence recreation process associated with a video program, in accordance with various aspects and embodiments of the disclosed subject matter.

In another example non-limiting illustration of aspects of the disclosed subject matter, the orchestrator component 104 can provide an interactive entertainment experience that can facilitate the vehicle 102 recreating a vehicle action sequence (e.g., vehicle stunts) of a vehicle depicted in a video program. Referring to FIG. 6 (along with FIGS. 1-4), FIG. 6 presents a diagram of an example vehicle-action-sequence recreation process 600 associated with a video program, in accordance with various aspects and embodiments of the disclosed subject matter. In some embodiments, the orchestrator component 104, e.g., employing the agent component 106, can control vehicle operation to have the vehicle 102 recreate a vehicle action sequence 602 (e.g., car stunts or car action scenes in a movie) in a video program 604 (e.g., movie, television program, or other video program) being presented to the occupant in the vehicle 102, wherein, for example, the vehicle 102 can perform the vehicle action sequence (as depicted at reference numeral 606) in synchronization with the presentation of the portion of interactive content 608 (PORTN IC) (e.g., movie video content, or AR or VR content generated based at least in part on the movie video content) that contains the vehicle action sequence 602. The orchestrator component 104 can analyze the video program 604, and can identify the vehicle action sequence 602 in the video program 604 based at least in part on the analysis results. Also, based at least in part on the analysis results, the orchestrator component 104 can determine the individual vehicle movements of the vehicle (e.g., individual vehicle stunts and other movements) in the vehicle action sequence 602.

The orchestrator component 104 also can receive sensor data 610 from the sensor component 116, wherein one or more sensors of the sensor component 116 can sense environmental conditions (e.g., road conditions, weather conditions, . . . ) associated with the vehicle 102 and vehicle conditions of the vehicle 102 (e.g., conditions, including functionality and capabilities, of vehicle components). The orchestrator component 104 can analyze the sensor data 610, and can determine the environmental conditions and vehicle conditions associated with the vehicle 102 based at least in part on the results of analyzing the sensor data 610.

The orchestrator component 104 can determine and generate interactive content 612 (INT CONT), comprising visual or video content, AR content, VR content, audio content, haptic content, and/or control content based at least in part on the identified vehicle action sequence 602, the environmental conditions, and the vehicle conditions. The control content can be utilized to control operation of the vehicle 102 to have the vehicle 102 recreate the vehicle action sequence (as depicted at reference numeral 606) identified in the video program 604. The visual or video content, AR content, and/or VR content can be determined based at least in part on the video content of the video program 604. For instance, the AR content or VR content can recreate 3-D visual aspects of the vehicle action sequence 602 identified in the video program 604 such that, when the AR content or VR content is presented to the vehicle occupant on the display screens in the vehicle 102 or via the UE 110, the occupant can be immersed in the scene (e.g., 3-D object scene of the vehicle action sequence) in synchronization with the control content controlling the operation of the vehicle 102 to have the vehicle 102 recreate the vehicle action sequence (as depicted at reference numeral 606) as if the occupant was in the video program (e.g., in the movie, TV program, or other video content).

Figure 7:
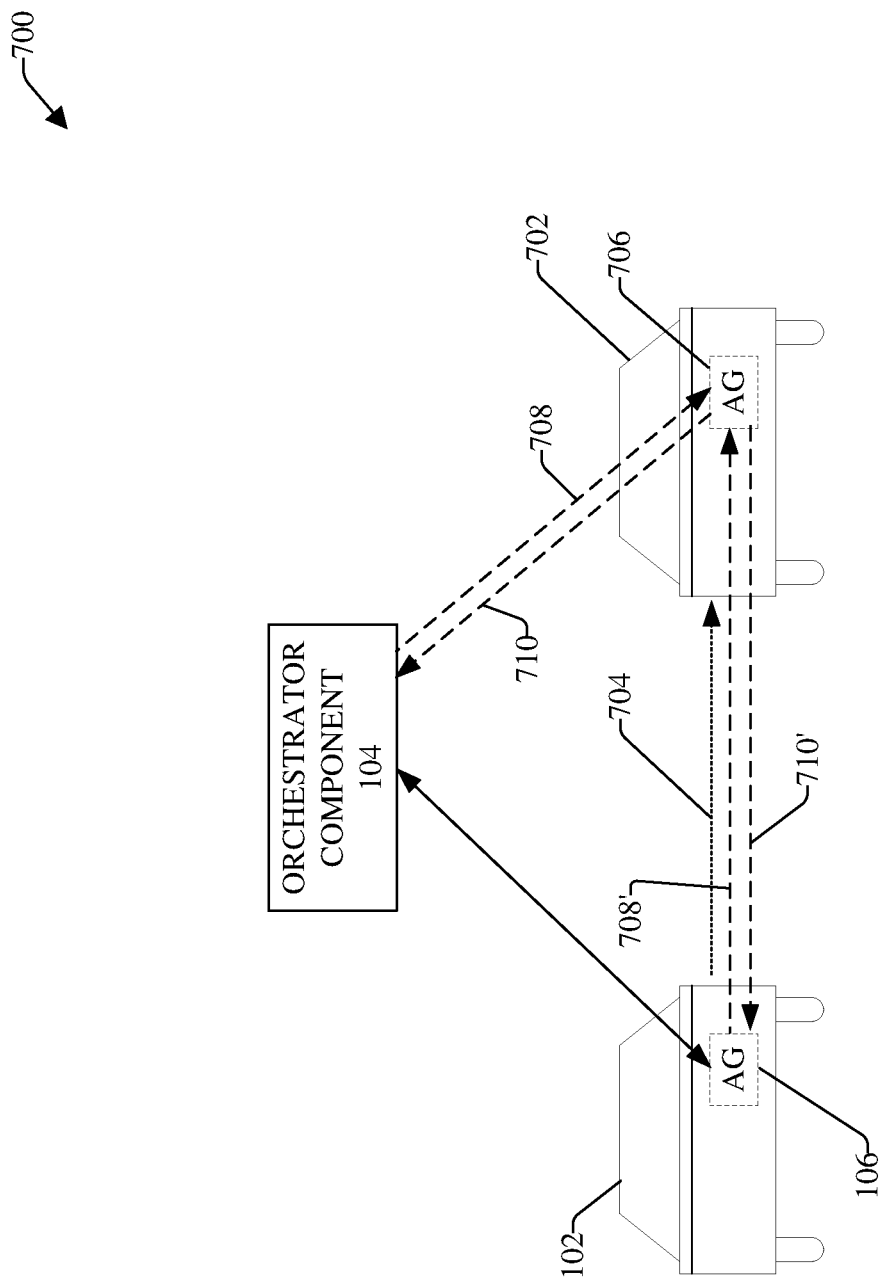
FIG. 7 presents a diagram of an example notification process associated with recreation of a vehicle action sequence by the vehicle, in accordance with various aspects and embodiments of the disclosed subject matter.

In some embodiments, the orchestrator component 104 (e.g., the orchestrator component 104 itself, or employing the associated agent component 106) can notify nearby vehicles when the vehicle is going to be recreating the vehicle action sequence (as depicted at reference numeral 606), so that those nearby vehicles are aware that the vehicle is going to be recreating the vehicle action sequence and can thereby operate accordingly (e.g., operate to avoid colliding with the vehicle), or alternatively, if desired (e.g., by the occupant of the vehicle 102), the orchestrator component 104 can invite an occupant of another vehicle to have that other vehicle participate with the vehicle 102 in recreating the vehicle action sequence (e.g., when the vehicle action sequence can involve two or more vehicles). Turning briefly to FIG. 7 (along with FIGS. 1-4 and 6), FIG. 7 presents a diagram of an example notification process 700 associated with recreation of a vehicle action sequence by the vehicle 102, in accordance with various aspects and embodiments of the disclosed subject matter. Prior to, and in connection with, the vehicle 102 recreating the vehicle action sequence, the sensor component 116 of the vehicle 102 can detect a second vehicle 702 that is in proximity to the vehicle 102 or will be in sufficiently close proximity to the vehicle 102 (as depicted at reference numeral 704) such that the other vehicle can be impacted, or at least potentially can be impacted, by the vehicle 102 recreating the vehicle action sequence (as depicted at reference numeral 606). For instance, based at least in part on analysis of the sensor data and the time period in the interactive content where the vehicle action sequence occurs, the orchestrator component 104 or agent component 106 can determine or predict that, at the time the vehicle 102 will be recreating the vehicle action sequence (as depicted at reference numeral 606), the second vehicle 702 will be in sufficiently close proximity to the vehicle 102 such that the second vehicle 702 can be impacted by the vehicle 102 recreating the vehicle action sequence.

In accordance with various embodiments, the orchestrator component 104 can generate a notification message and can communicate the notification message to the second agent component 706 of the second vehicle 702 (as depicted at reference numeral 708) to notify the second agent component 706 and/or the second occupant of the second vehicle 702 that the vehicle 102 intends to recreate the vehicle action sequence. Alternatively, the agent component 106 can generate the notification message and can communicate the notification message to the second agent component 706 of the second vehicle 702 (as depicted at reference numeral 708') to notify the second agent component 706 and/or the second occupant of the second vehicle 702 that the vehicle 102 intends to recreate the vehicle action sequence.

If the notification message only comprises a notification regarding the vehicle action sequence, without an invitation to have the second vehicle 702 participate in the vehicle action sequence, the orchestrator component 104 and/or agent component 106 can wait for an acknowledgement message from the second agent component 706 indicating that the second vehicle 702 and associated second occupant are aware that the vehicle 102 will be recreating the vehicle action sequence and also indicating whether the second vehicle 702 and associated second occupant agree to take appropriate action to avoid any undesirable interaction with the vehicle 102 (e.g., agree to take action to avoid colliding or potentially colliding with the vehicle 102). If the notification message comprises the notification regarding the vehicle action sequence and an invitation to have the second vehicle 702 participate in the vehicle action sequence, the orchestrator component 104 and/or agent component 106 can wait for an acknowledgement message from the second agent component 706 indicating that the second vehicle 702 and associated second occupant are aware that the vehicle 102 will be recreating the vehicle action sequence and indicating whether the second vehicle 702 and associated second occupant agree to participate in recreating the vehicle action sequence, and, if not participating, indicating whether the second vehicle 702 and associated second occupant at least agree to take appropriate action to avoid any undesirable interaction with the vehicle 102.

The orchestrator component 104 can receive an acknowledgement message from the second agent component 706 (as depicted at reference numeral 710), or alternatively, the agent component 106 can receive the acknowledgement message from the second agent component 706 (as depicted at reference numeral 710'). With regard to an acknowledgement message in response to a notification (only) message (e.g., notification with no invitation), if the acknowledgement message indicates or acknowledges that the second vehicle 702 and/or the second occupant received the notification message, are aware that the vehicle 102 will be recreating the vehicle action sequence, and agree to take appropriate action to avoid any undesirable interaction with the vehicle 102, the orchestrator component 104 and/or agent component 106 can operate to allow the vehicle 102 to perform the vehicle action sequence, wherein the agent component 106 can employ (e.g., execute) the control content to control operation of the vehicle to perform the vehicle action sequence (as depicted at reference numeral 606) in connection with presentation of the portion (e.g., visual and audio portion) of the interactive content to the occupant via the presentation component or UE 110, as described herein.

If, instead, no acknowledgement message was received by the orchestrator component 104 or agent component 106, either because the second agent component 706 of the second vehicle 702 did not respond to the notification message, the second agent component 706 of the second vehicle 702 communicated a message indicating that the second vehicle 702 or second occupant do not agree to take appropriate action (e.g., appropriate avoidance action), or the acknowledgement message was sent by the second agent component 706, but not received (e.g., not received at all or not received in time) by the orchestrator component 104 or agent component 106, the orchestrator component 104 or agent component 106 can determine that the vehicle 102 is not permitted to recreate the vehicle action sequence (at least at that location), and can control operation of the vehicle 102 to not have the vehicle 102 recreate the vehicle action sequence (at least at that location). As desired, the occupant can request, and the orchestrator component 104 can determine whether, the vehicle action sequence can be performed by the vehicle 102 at a different time or different location.

With regard to a notification message that includes an invitation to have the second vehicle 702 participate in recreating the vehicle action sequence, the orchestrator component 104 can determine whether the vehicle action sequence (as depicted at reference numeral 602) can involve two or more vehicles based at least in part on the result of analyzing the video content of the video program 604 comprising the vehicle action sequence. For instance, based at least in part on the result of analyzing the video content of the video program 604, including the vehicle action sequence (as depicted at reference numeral 602), the orchestrator component 104 can determine whether the vehicle action sequence can involve two or more vehicles such that two or more vehicles, including the vehicle 102 and the second vehicle 702, can recreate the respective actions of two or more vehicles presented in the vehicle action sequence 602 of the video program 604.

If the orchestrator component 104 determines that the vehicle action sequence 602 does not involve two or more vehicles or otherwise determines that it is not appropriate for the second vehicle 702 to participate in the vehicle action sequence 602 (e.g., because of the location, position, and/or direction of travel of the second vehicle 702, because of the type or functionality of the second vehicle 702, or due to another reason), the orchestrator component 104 can determine that participation by the second vehicle 702 in the vehicle action sequence is not to occur, and the notification message will not include an invitation to participate. If the orchestrator component 104 determines that the vehicle action sequence 602 can involve two or more vehicles, and the second vehicle 702 can be one of those vehicles along with the vehicle 102, the orchestrator component 104 can advise the occupant and agent component 106 that participation by the second vehicle 702 in recreating the vehicle action sequence is an option. If the occupant desires or is amenable to the second vehicle 702 participating in recreating the vehicle action sequence, the notification message (sent as indicated at reference numeral 708 or 708') can include an invitation for the second vehicle 702 and associated second occupant to participate in recreating the vehicle action sequence.

If an acknowledgement message is received by the orchestrator component 104 (as indicated at reference numeral 710) or agent component 106 (as indicated at reference numeral 710') that indicates that the second vehicle 702 and/or second occupant received the notification message, are aware that the vehicle 102 will be recreating the vehicle action sequence (as indicated at reference numeral 606), and agree to take appropriate action to avoid any undesirable interaction with the vehicle 102 (e.g., agree to take action to avoid colliding or potentially colliding with the vehicle 102), but do not desire to participate in recreating the vehicle action sequence, the orchestrator component 104 or agent component 106 can control operation of the vehicle 102, based at least in part on the control content, to have the vehicle 102 recreate (e.g., perform or execute) the vehicle action sequence (as indicated at reference numeral 606) in conjunction with the presentation of the first portion of the interactive content 608 via the presentation component or UE 110. Also, the orchestrator component 104 or the second agent component 706 of the second vehicle 702 can control operation of the second vehicle 702, based at least in part on second control content generated by the orchestrator component 104 or the second agent component 706, to have the second vehicle 702 take appropriate action (e.g., appropriate avoidance action) to avoid undesirably interacting (e.g., colliding) with the vehicle 102 during the recreation of the vehicle action sequence.

If an acknowledgement message is received from the second agent component 706 of the second vehicle 702 (as indicated at reference numeral 710 or 710'), and the acknowledgement message indicates or acknowledges that the second vehicle 702 and/or second occupant received the notification message, are aware that the vehicle 102 will be recreating the vehicle action sequence, and agree to participate in recreating the vehicle action sequence, the orchestrator component 104 or agent component 106 can determine that the second vehicle 702 is going to participate along with vehicle 102 in recreating the vehicle action sequence. In response to receiving such acknowledgement message, the orchestrator component 104 can receive second sensor data from a second sensor component of or associated with the second vehicle 702, wherein the second sensor component can comprise sensors that can sense the second environmental conditions (e.g., road conditions, weather conditions, . . . ) associated with the second vehicle 702 and second vehicle conditions of the second vehicle 702

(e.g., conditions, including functionality and capabilities, of vehicle components of the second vehicle 702). The orchestrator component 104 can analyze the second sensor data, and can determine the second environmental conditions and second vehicle conditions associated with the second vehicle 702 based at least in part on the results of analyzing the second sensor data.

The orchestrator component 104 can generate second interactive content, comprising video content of the video program 604, second VR content, second AR content, and/or second control content, based at least in part on the vehicle action sequence 602, and the second environmental conditions and the second vehicle conditions associated with the second vehicle 702. The second interactive content can facilitate enabling the second vehicle 702 to recreate a second portion of the vehicle action sequence depicted in the video program 604. The second portion of the vehicle action sequence can relate to actions of a corresponding second vehicle depicted in the video of the vehicle action sequence 602 in the video program 604. The second control content that can be utilized to control operation of the second vehicle 702 to have the second vehicle 702 recreate the second portion of the vehicle action sequence identified in the video program 604 and relating to the corresponding second vehicle depicted in the video of the vehicle action sequence.

A first portion of the second interactive content can comprise video content of the video program 604, and/or the second AR content and/or second VR content that can be determined based at least in part on such video content. For instance, the first portion of the second interactive content can visually recreate a second version of the vehicle action sequence (e.g., a visual recreation of the vehicle action sequence from the perspective of the second vehicle 702). The second AR content or second VR content can recreate 3-D visual aspects of the vehicle action sequence identified in the video program 604 such that, when the second AR content or second VR content is presented to the second occupant on display screens in the second vehicle 702 or the second occupant's UE, the second occupant can be immersed in the scene (e.g., 3-D object scene of the vehicle action sequence) in synchronization with the second control content controlling the operation of the second vehicle 702 to have the second vehicle 702 recreate the second portion of the vehicle action sequence relating to the corresponding second vehicle depicted in the video of the vehicle action sequence as if the second occupant was in (e.g., part of) the video program 604 (e.g., in the movie, TV program, or other video content).

The orchestrator component 104 can communicate the second interactive content to the second agent component 706. The second agent component 706 can utilize (e.g., execute) the second control content to control operation of the second vehicle 702 to have the second vehicle 702 recreate the second portion of the vehicle action sequence (and present the first portion of the second interactive content in synchronization with such operation of the second vehicle 702) in coordination and/or synchronization with the agent component 106 utilizing the control content to control operation of the vehicle 102 to have the vehicle 102 recreate its portion of the vehicle action sequence (and present the portion of the interactive content in synchronization with such operation of the vehicle 102).

In some embodiments, the orchestrator component 104 or agent component 106 can train the vehicle for future activities and/or entertainment experiences. For instance, the orchestrator component 104 or agent component 106 can track and analyze respective conditions or characteristics of the various vehicle components 108 of the vehicle 102 over time. The orchestrator component 104 or agent component 106 can determine or learn various characteristics of the various vehicle components 108 of the vehicle 102 based at least in part on the analysis the respective conditions or characteristics of the various vehicle components 108. For example, the orchestrator component 104 or agent component 106 can determine or learn the drag coefficient of the vehicle 102 and/or the impact on occupants of the vehicle 102, the respective steering characteristics of the vehicle 102 under respective conditions, the respective acceleration characteristics of the vehicle 102 under respective conditions, respective traction characteristics of the vehicle 102 (e.g., tires of the vehicle 102) under respective conditions, and/or the respective braking characteristics of the vehicle 102 under respective conditions, etc. Based at least in part on the determining or learning the various characteristics of the various vehicle components 108 of the vehicle 102, the orchestrator component 104 or agent component 106 can train the vehicle 102 and/or control operation of the vehicle to more desirably operate during future activities and/or entertainment experiences.

Figure 8:
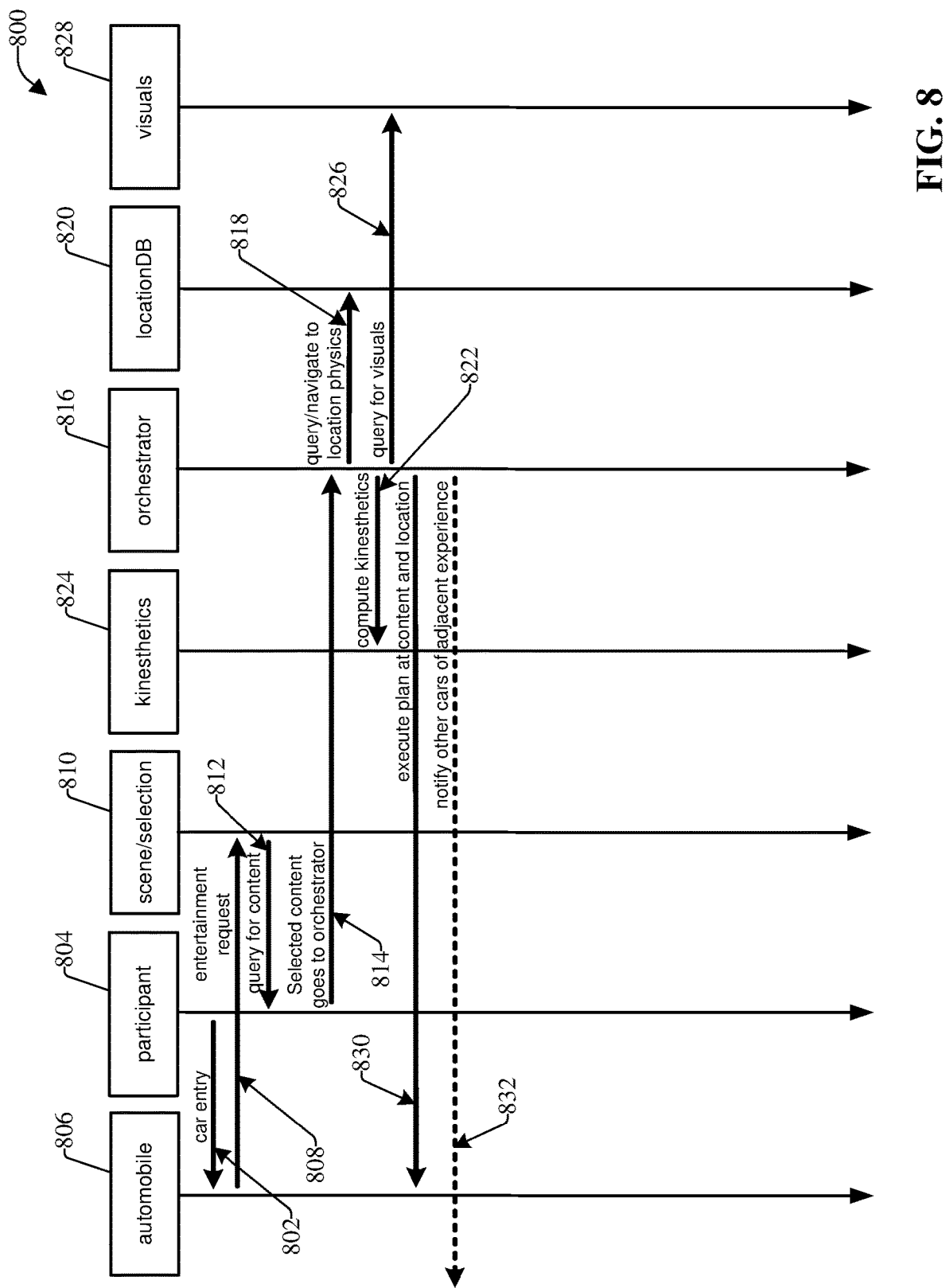
FIG. 8 depicts a diagram of an example entertainment experience flow process, in accordance with various aspects and embodiments of the disclosed subject matter.

FIG. 8 depicts a diagram of an example entertainment experience flow process 800, in accordance with various aspects and embodiments of the disclosed subject matter. As part of the example entertainment experience flow process 800, at reference numeral 802, a participant 804 (e.g., user or vehicle occupant) can enter an automobile 806 (e.g., vehicle, such as an autonomous or semi-autonomous vehicle). At reference numeral 808, an entertainment request can be presented (e.g., communicated) to request or select a scene (e.g., an entertainment experience) from scene/selection 810 of or associated with the orchestrator component. For instance, the participant 804 can input information via an interface of the agent component of the automobile 806 or a device (e.g., smart phone, AR/VR headset, or computer, . . . ) of the participant 804, wherein the input information can comprise the entertainment request.

At reference numeral 812, the scene/selection 810 (e.g., scene/selection component) of or associated with the orchestrator component can query the participant 804 for content. For instance, the scene/selection 810 can generate a query requesting the participant 804 to select the desired content (e.g., desired content of a desired entertainment experience), and can communicate the query to the participant 804 via the interface of the agent component or the device of the user. In some embodiments, the scene/selection 810 can present a number of choices or recommendations of content and associated entertainment experiences. The orchestrator component can determine the choices or recommendations of content and associated entertainment experiences based at least in part on the results of analyzing input information received from the participant 804, preferences from a profile of the participant 804, and/or other information (e.g., location information regarding the location of the automobile 806, travel information regarding where the participant 804 desires or is willing to travel to and/or the amount of time available to the participant 804 for travel and the entertainment experience, and/or sensor data relating to environmental conditions and/or vehicle conditions associated with the automobile 806).

As indicated at reference numeral 814, the participant 804 can select the desired content and the content selection can be communicated to the orchestrator component 816 (orchestrator). For instance, via the interface of or associated with the agent component or via the device of the participant

804, the content selection (e.g., selected program) can be communicated to the orchestrator component 816.

As indicated at reference numeral 818, the orchestrator component 816 can initiate a query to a location database 820 (locationDB) of or associated with the orchestrator component 816, wherein the query can relate to or request information regarding the location associated with the content selection and associated entertainment experience, navigation (e.g., travel route) to the location, and the physics and/or physical characteristics associated with the location and/or navigation. For instance, the orchestrator component 816 can determine and generate the query based at least in part on the content selection received from the participant 804. The orchestrator component 816 can communicate the query to the location database 820. Based at least in part on the query (e.g., in response to the query), the location database 820 can determine information regarding the location associated with the content selection and associated entertainment experience, navigation to the location, and the physics and/or physical characteristics associated with the location and/or navigation. The orchestrator component 816 can receive such information responsive to the query from the location database 820.

As indicated at reference numeral 822, the orchestrator component 816 can determine (e.g., compute or calculate) kinesthetics 824 based at least in part on the location associated with the content selection and associated entertainment experience, the navigation to the location, the physics and/or physical characteristics associated with the location and/or navigation, and/or other pertinent information. As indicated at reference numeral 826, the orchestrator component 816 also can initiate a query for visuals 828 (e.g., visual content) relating to the selected content and associated entertainment experience. For instance, the orchestrator component 816 can determine and generate such a query to request or obtain the visuals 828 that can relate to the entertainment experience, including the selected content, the location(s) where the entertainment experience is to be provided to the participant 804, the navigation to the location, the physics and/or physical characteristics associated with the location and/or navigation, and/or the other pertinent information. The orchestrator component 816 can obtain the visuals 828 from a database (e.g., database of visual information and/or other information (e.g., audio content, haptic content, . . . ) relating to entertainment experiences) of a data store of or associated with the orchestrator component 816. As an example, if the entertainment experience relates to a historical reenactment of a historical event, the visuals 828 can comprise visual content (e.g., video content, AR content, and/or VR content) that can facilitate recreating or reenacting the historical event at the location or as the automobile 806 travels to the location, through the location, and/or from the location. The orchestrator component 816 also can determine, generate, and/or query for audio content and/or haptic content relating to the selected content and associated entertainment experience.

As indicated at reference numeral 830, the orchestrator component 816 (e.g., employing the agent component of the vehicle) can execute or facilitate executing the entertainment experience (e.g., execute the plan), including the content (e.g., interactive content, comprising the visual content, control content, audio content, and/or haptic content) relating to the entertainment experience, at the location (or en route to or from the location, as appropriate).

As indicated at reference numeral 832, if the entertainment experience is determined or predicted (e.g., by the orchestrator component 816, or the agent component of the automobile 806) to involve an adjacent experience of the automobile 806 such that the actions or movement of the automobile 806 during the entertainment experience will impact (e.g., interrupt performance of, collide with) or potentially can impact another vehicle(s) (e.g., car(s)) in proximity to the automobile 806 (e.g., if such other vehicle(s) continues along its current or expected course of action), the orchestrator component 816 (or the agent component of the automobile 806) can notify the other vehicle(s) of such adjacent experience of the automobile 806 to enable the other vehicle(s) to take appropriate action to avoid the impact or potential impact (or to send a response message indicating that the other vehicle(s) does not agree to modify its operation to allow the automobile 806 to engage in the adjacent experience).

Figure 9:
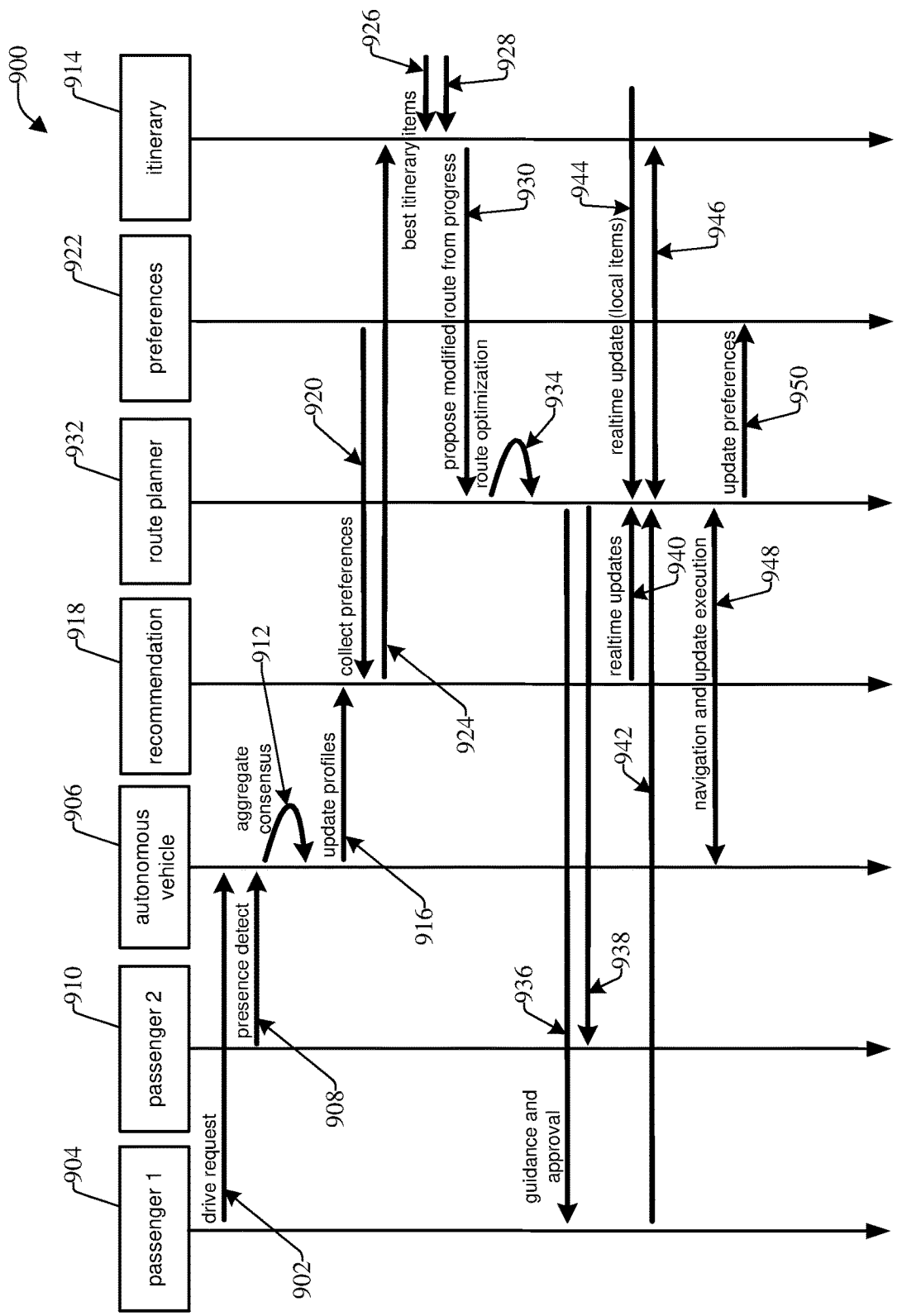
FIG. 9 presents a diagram of another example entertainment experience flow process, in accordance with various aspects and embodiments of the disclosed subject matter.

FIG. 9 presents a diagram of another example entertainment experience flow process 900, in accordance with various aspects and embodiments of the disclosed subject matter. As part of the example entertainment experience flow process 900, as indicated at reference numeral 902, a first passenger 904 (e.g., passenger 1, such as a first user or first vehicle occupant) can enter an autonomous vehicle 906 and can initiate or request a drive (e.g., transportation) by the autonomous vehicle 906. As indicated at reference numeral 908, the presence of a second passenger 910 (e.g., passenger 2, such as a second user or second vehicle occupant) can be detected (e.g., by the agent component of the vehicle 906 or the orchestrator component associated with the agent component).

As indicated at reference numeral 912, the agent component, the orchestrator component, or the passengers (e.g., 904, 910) can determine an aggregate consensus regarding the desired entertainment experience, including the itinerary 914 for the excursion and/or content to be presented during the excursion. For instance, the passengers (e.g., 904, 910) can reach a consensus regarding the entertainment experience, including the itinerary and the content, or the agent component or orchestrator component can determine or decide the aggregate consensus based at least in part on information received from the passengers (e.g., 904, 910) and/or subscriptions associated with the passengers (e.g., 904, 910).

As indicated at reference numeral 916, the respective profiles (e.g., user profiles) of the respective passengers (e.g., 904, 910) can be updated, based at least in part on information relating to the aggregate consensus of or associated with the passengers (e.g., 904, 910), in connection with a determination regarding a recommendation 918 of an entertainment experience for the passengers (e.g., 904, 910). For instance, the orchestrator component or the agent component can update the respective profiles of the respective passengers (e.g., 904, 910) to include information relating to the aggregate consensus of or associated with the passengers (e.g., 904, 910) in connection with making a determination regarding the recommendation 918 of an entertainment experience that can be provided to the passengers (e.g., 904, 910) while traveling in the autonomous vehicle 906.

As indicated at reference numeral 920, in connection with determining (e.g., to facilitate determining) the recommendation 918, the orchestrator component can collect (e.g., receive or obtain) preferences 922 of the passengers (e.g., 904, 910) from respective profiles (e.g., user profiles) of the passengers (e.g., 904, 910), wherein the respective profiles can be stored in a data store of or associated with the orchestrator component. The respective profiles can comprise respective preference information regarding the respective preferences 922 of the respective passengers (e.g., 904, 910).

As indicated at reference numeral 924, in connection with determining (e.g., to facilitate determining) the recommendation 918, the orchestrator component can determine or initiate a query for one or more itineraries 914 that can be desirable, or potentially can be desirable, to the passengers (e.g., 904, 910) based at least in part on the aggregate consensus of or associated with the passengers (e.g., 904, 910), the respective preferences of the respective passengers (e.g., 904, 910), and/or other information (e.g., location of the vehicle 906, accommodations in proximity to the vehicle 906, and/or other information or factors). Information regarding the itineraries 914 can be stored in a database, which can be stored in a data store of or associated with the orchestrator component.

As indicated at reference numerals 926 and 928, the orchestrator component can determine a set of itineraries, which can include the best itineraries, based at least in part on the aggregate consensus of or associated with the passengers (e.g., 904, 910), the respective preferences of the respective passengers (e.g., 904, 910), and/or the other information. As indicated at reference numeral 930, in response to the determination of the set of itineraries, and based at least in part on the set of itineraries, the orchestrator component can employ a route planner 932 (e.g., route planner component) to determine a proposed modified route for the vehicle 906 to travel to facilitate presenting the entertainment experience to the passengers (e.g., 904, 910), wherein the route can be optimized or enhanced by the route planner 932 as indicated at reference numeral 934. The orchestrator component can determine the proposed modified route for the vehicle 906 based at least in part on the orchestrator component performing progress route optimization or enhancement to determine a desirable (e.g., optimal, enhanced, or acceptable, . . . ) route for the vehicle 906 to travel in connection with the entertainment experience.

As indicated at reference numerals 936 and 938, the orchestrator component, employing the route planner 932, can communicate the proposed route for the vehicle 906 (e.g., proposed modified, optimized, and/or enhanced route for the vehicle) to the passenger 904 and passenger 910, respectively, for guidance and approval by passengers 904 and 910. In some embodiments, as indicated at reference numerals 940 and 942, in connection with the recommendation 918 for an entertainment experience, the orchestrator component and/or the passenger 904 (and/or passenger 910) can provide updates (e.g., real time updates) to the route planner 932, which can result in updates to the itinerary and associated route. As indicated at reference numerals 944 and 946, the orchestrator component can determine whether the itinerary and associated travel route for the vehicle 906 is to be updated (e.g., modified) and can perform desired updates (e.g., perform real time updates), if any, to the itinerary, based at least in part on the real time updates received from the passenger(s) (e.g., 904 and/or 910) and/or determined by the orchestrator component, for example, based at least in part on other update information received and analyzed by the orchestrator component. For instance, the orchestrator component can receive such other update information from the sensor component (e.g., sensor data from the sensors of the sensor component) of the vehicle 906 and/or from other data sources associated with the orchestrator component. Such update can comprise, for example, local items, such as local items that can be of interest to or desired by the passenger(s) (e.g., 904 and/or 910) (e.g., local items or things that the passenger(s) can or may become aware of during the entertainment experience as the vehicle 906 travels along the route to the desired destination of the itinerary).

As indicated at reference numeral 948, the orchestrator component, employing the route planner 932, can provide (e.g., communicate) an updated route and/or itinerary to the vehicle 906 to facilitate navigation of the vehicle 906, in accordance with the updated route and/or itinerary, and the vehicle 906 (e.g., employing the agent component) can update (e.g., modify) the route and/or itinerary and execute the updated route and/or itinerary, in accordance with the updated route and/or itinerary received from the orchestrator component (e.g., the route planner 932 of the orchestrator component).

As indicated at reference numeral 950, the orchestrator component, for example, employing the route planner 932, can update the preferences 922 of the passenger(s) (e.g., 904 and/or 910) based at least in part on the updated preferences associated with the update to the route and/or itinerary associated with the vehicle 906. The orchestrator component can store the updated preferences (e.g., updated preference information) in the profile(s) of the passenger(s) (e.g., 904 and/or 910).

Figure 10:
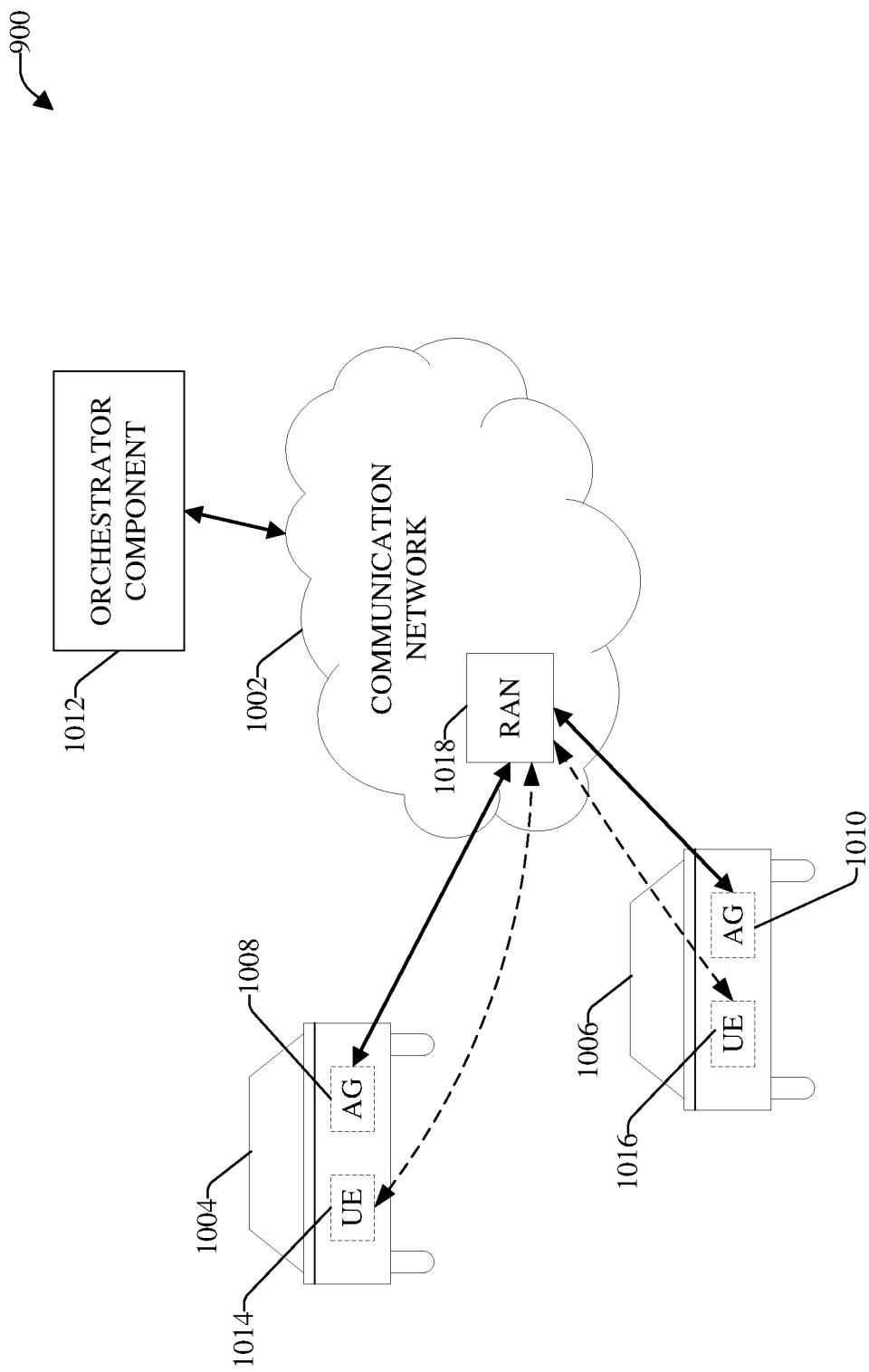
FIG. 10 illustrates a block diagram of an example system that provide a communication network to facilitate controlling presentation of interactive content, which can include AR content and/or VR content, in vehicles and/or correspondingly controlling operation of the vehicles, in accordance with various aspects and embodiments of the disclosed subject matter.

FIG. 10 illustrates a block diagram of an example system 1000 that provide a communication network to facilitate controlling presentation of interactive content, which can include AR content and/or VR content, in vehicles and/or correspondingly controlling operation of the vehicles, in accordance with various aspects and embodiments of the disclosed subject matter. The system 1000 can comprise a communication network 1002 that can provide and manage wireless or wireline communication connections that can enable wireless or wireline communication of information, including interactive content, between a device (e.g., communication device, agent component, orchestrator component, . . . ) and the communication network 1002 and/or between devices associated with (e.g., communicatively connected to) the communication network 1002.

A number of vehicles, such as, for example, vehicle 1004 and vehicle 1006, can be traveling in an area covered by the communication network 1002. The vehicle (e.g., 1004, 1006) can comprise agent components, such as, for example, agent component 1008 of vehicle 1004 and agent component 1010 of vehicle 1006. The agent components (e.g., 1008, 1010) each can be associated with (e.g., communicatively connected to) the communication network 1002 at desired times. The system 1000 also can comprise an orchestrator component 1012 that can be associated with (e.g., communicatively connected to) the communication network 1002.

In some embodiments, occupants of the vehicles (e.g., 1004, 1006) also can have communication devices, such as, for example, UE 1014 of an occupant of vehicle 1004 and UE 1016 of an occupant of vehicle 1006. A communication device (e.g., UE 1014, UE 1016, . . . ) can be, for example, a mobile and/or wireless communication device, such as a mobile or smart phone, an electronic pad or tablet, an electronic notebook, an electronic gaming device, electronic bodywear (e.g., AR/VR headset, electronic or smart glasses, electronic or smart watch), a computer, a personal digital assistant (PDA), a set-top box, or other type of communication device that can operate and communicate in a communication network environment (e.g., communication network 1002).

The orchestrator component 1012, agent components (e.g., 1008, 1010), vehicles (e.g., 1004, 1006), UEs (e.g., 1014, 1016) each can operate in a same or similar manner, and can comprise the same or similar functionality as, respective components (e.g., respectively named components) as more fully described herein. The orchestrator component 1012 can receive information (e.g., user input information, user preferences, sensor data, . . . ) from an agent component (e.g., 1008 or 1010) or UE (e.g., 1014 or 1016) via the communication network 1002. The orchestrator component 1012 can communicate interactive content, entertainment experience recommendations, or other information to the agent component (e.g., 1008 or 1010) or UE (e.g., 1014 or 1016) via the communication network 1002.

The communication network 1002 can comprise a radio access network (RAN) 1018 that can comprise or be associated with a set of base stations (e.g., access points (APs)) (not shown) that can serve devices (e.g., orchestrator component 1012, agent components (e.g., 1008, 1010), and/or UEs (e.g., 1014, 1016), . . . ) located in respective coverage areas served by respective base stations in the communication network 1002. In some embodiments, the RAN 1018 can be a cloud-RAN (C-RAN) that can be located in or associated with a cloud computing environment, comprising various cloud network components of the communication network 1002.

The respective base stations can be associated with one or more sectors (not shown), wherein respective sectors can comprise respective cells. The cells can have respective coverage areas that can form the coverage area covered by the one or more sectors. The respective devices (e.g., orchestrator component 1012, agent components (e.g., 1008, 1010), UEs (e.g., 1014, 1016), . . . ) can be communicatively connected to the communication network 1002 via respective wireless or wireline communication connections with one or more of the respective cells.

The RAN 1018 can be associated with (e.g., connected to) or can comprise a core network (e.g., mobile core network) that can facilitate communications by devices (e.g., orchestrator component 1012, agent components (e.g., 1008, 1010), and/or UEs (e.g., 1014, 1016), . . . ) wirelessly connected to the communication network 1002. A device (e.g., orchestrator component 1012, agent components (e.g., 1008, 1010), and/or UEs (e.g., 1014, 1016), . . . ) can be communicatively connected to the core network via a base station. The core network can facilitate wireless communication of voice and data associated with devices associated with the communication network 1002. The core network can facilitate routing voice and data communications between devices and/or other devices associated with an IP-based network (e.g., the Internet, an intranet, . . . ) of or associated with the communication network 1002.

In accordance with various embodiments, the communication network 1002 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective devices (e.g., orchestrator component 1012, agent components (e.g., 1008, 1010), and/or UEs (e.g., 1014, 1016), . . . ) can be associated with (e.g., communicatively connected to) the communication network 1002 via a wireless communication connection or a wireline (e.g., wired) communication connection (e.g., via a cell and associated base station). The respective devices can operate and communicate in a communication network environment. At various times, a device (e.g., orchestrator component 1012, agent components (e.g., 1008, 1010), and/or UEs (e.g., 1014, 1016), . . . ) can be communicatively connected via a wireless communication connection(s) to one or more RANs (e.g., 1018), which can comprise one or more base stations to communicatively connect the communication device to the communication network 1002 to enable the device to communicate other devices associated with (e.g., communicatively connected to) the communication network 1002 in the communication network environment. The one or more RANs (e.g., 1018) can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 1002 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 1002 (e.g., a core network, cellular network, or a network comprising a core network, cellular network, and/or an IP-based network) can facilitate routing voice and data communications between a device(s) (e.g., orchestrator component 1012, agent components (e.g., 1008, 1010), and/or UEs (e.g., 1014, 1016), . . . ) and another device (e.g., another of the orchestrator component 1012, agent components (e.g., 1008, 1010), and/or UEs (e.g., 1014, 1016), . . . ) associated with the communication network 1002 in the communication network environment. The communication network 1002 and/or the core network also can allocate resources to the devices in the communication network 1002, convert or enforce protocols, establish and enforce quality of service (QoS) for the communication devices, provide applications or services in the communication network 1002, translate signals, and/or perform other desired functions to facilitate system interoperability and communication in the communication network 1002 (e.g., wireless portion of the communication network 1002 or wireline portion of the communication network 1002). The communication network 1002 and/or the core network further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a device(s) (e.g., orchestrator component 1012, agent components (e.g., 1008, 1010), and/or UEs (e.g., 1014, 1016), . . . ) is moved through a wireless communication network environment, at various times, the device(s) can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; a device (e.g., a device functioning as a mobile hotspot)) that can operate in the wireless communication network environment. An AP (e.g., base station) can serve a specified coverage area to facilitate communication by the device(s) or other devices in the wireless communication network environment. An AP can serve a respective coverage cell (e.g., macrocell, femtocell, picocell, . . . ) that can cover a respective specified area, and the AP can service mobile wireless devices, such as the device(s) located in the respective area covered by the respective cell, where such coverage can be achieved via a wireless link (e.g., uplink (UL), downlink (DL)). When an attachment attempt is successful, the device(s) can be served by the AP and incoming voice and data traffic can be paged and routed to the device(s) through the AP, and outgoing voice and data traffic from the device(s) can be paged and routed through the AP to other devices in the communication network environment. In an aspect, the device(s) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

Figure 11:
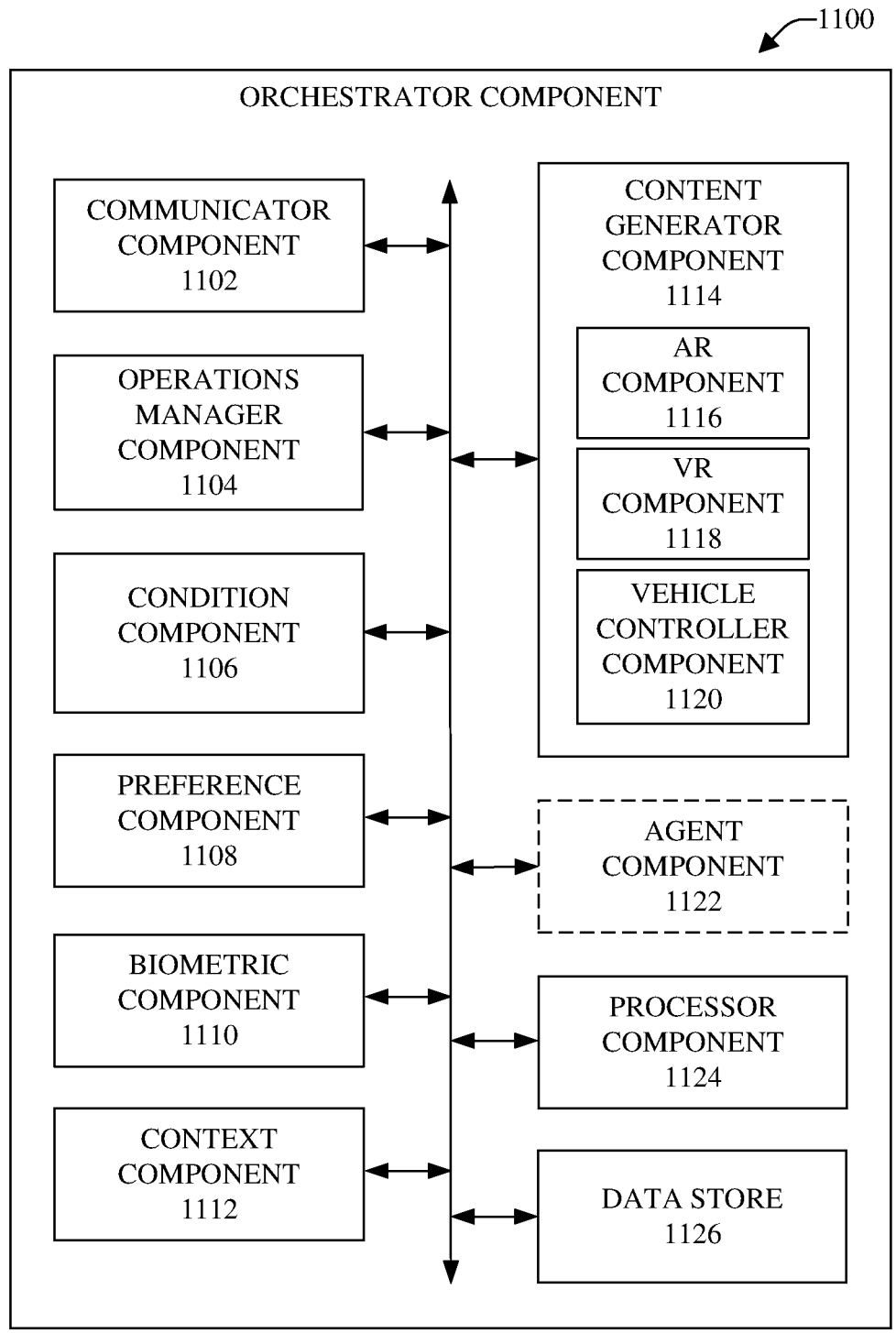
FIG. 11 depicts a block diagram of an example orchestrator component, in accordance with various aspects and embodiments of the disclosed subject matter.

FIG. 11 depicts a block diagram of an example orchestrator component 1100, in accordance with various aspects and embodiments of the disclosed subject matter. The orchestrator component 1100 can comprise, for example, a communicator component 1102, an operations manager component 1104, a condition component 1106, a preference component 1108, a biometric component 1110, a context component 1112, and a content generator component 1114, which can include an AR component 1116, a VR component 1118, and a vehicle controller component 1120. In some embodiments, the orchestrator component 1100 also can include (e.g., optionally can include) an agent component 1122. The orchestrator component 1100 also can comprise a processor component 1124 and data store 1126.

The communicator component 1102 can transmit information from the orchestrator component 1100 to an agent component of a vehicle (e.g., when the agent component is separate from the orchestrator component 1100, or another component or device (e.g., a communication device, a network component or device, . . . ) and/or can receive information from the agent component, other component, or device. For instance, the communicator component 1102 can receive (e.g., from the agent component) information, such as sensor data relating to environmental conditions associated with a vehicle, sensor data relating to conditions of the vehicle, sensor data relating to an occupant of the vehicle, user input information or preferences of the occupant, and/or other desired information, in connection with determining and providing a desired entertainment experience to the occupant. The communicator component 1102 also can transmit interactive content (e.g., visual content, audio content, AR content, VR content, and/or control content), entertainment experience recommendations, and/or other desired information to the agent component, other component, or other device to facilitate presenting interactive content to the occupant.

The operations manager component 1104 can control (e.g., manage) operations associated with the orchestrator component 1100. For example, the operations manager component 1104 can facilitate generating instructions to have components of the orchestrator component 1100 perform operations, and can communicate respective instructions to respective components (e.g., communicator component 1102, condition component 1106, preference component 1108, biometric component 1110, context component 1112, content generator component 1114, vehicle controller component 1120, and/or agent component 1122, . . . ) of the orchestrator component 1100 to facilitate performance of operations by the respective components of the orchestrator component 1100 based at least in part on the instructions, in accordance with the defined content management criteria and a content management algorithm(s) (e.g., content management algorithms as disclosed, defined, recited, or indicated herein by the methods, systems, and techniques described herein). The operations manager component 1104 also can facilitate controlling data flow between the respective components of the orchestrator component 1100 and controlling data flow between the orchestrator component 1100 and another component(s) or device(s) (e.g., an agent component, a communication device, a base station or other network node component or device of the communication network) associated with (e.g., connected to) the orchestrator component 1100.

The condition component 1106 can determine the environmental conditions associated with the vehicle (e.g., environmental conditions outside of the vehicle and/or environmental conditions inside of the vehicle) based at least in part on the results of analyzing sensor data relating to the environment. The condition component 1106 also can determine vehicle conditions (e.g., vehicle operating conditions, conditions of vehicle parts or systems, capabilities or functionalities of the vehicle, . . . ) of the vehicle based at least in part on the results of analyzing sensor data relating to the vehicle. The condition component 1106 also can determine conditions (e.g., awake, alert, asleep, drowsy, or agitated, . . . ) of an occupant of the vehicle based at least in part on the results of analyzing sensor data relating to the occupant.

The preference component 1108 can receive preference information from the user (e.g., vehicle occupant) and/or a user profile associated with the user. The preference component 1108 can determine one or more preferences of the user based at least in part on the results of analyzing the preference information associated with the user.

The biometric component 1110 can receive sensor data, such as biometric data, from sensors that can sense biometric features of an occupant of the vehicle. The biometric component 1110 can determine biometric features (e.g., facial features, eye features, and/or finger or hand features, . . . ) of the occupant, conditions of the occupant (e.g., in conjunction with the condition component 1106), and/or context of the occupant (e.g., in conjunction with the context component 1112), based at least in part on the results of analyzing the sensor data (e.g., biometric data) associated with the vehicle occupant. For instance, the biometric component can determine whether the occupant is awake, asleep, alert, smiling, frowning, happy, sad, agitated, etc., based at least in part on the results of analyzing the sensor data associated with the occupant. The biometric component 1110 also can identify and/or authenticate the occupant based at least in part on the biometric features of the occupant. The biometric component 1110 can employ desired biometric analysis and recognition techniques (e.g., facial scanning and recognition, eye or iris scanning and recognition, fingerprint or handprint scanning and recognition) to facilitate determining the biometric features, conditions, and/or context of the occupant.

The context component 1112 can determine respective contexts of the vehicle, a vehicle occupant(s), and/or overall context based at least in part on the environmental conditions associated with the vehicle or occupant(s), environmental conditions associated with respective locations of respective entertainment experiences, conditions associated with the vehicle, conditions associated with the occupant(s), preferences of the occupant(s), input information received from the occupant(s), location of the vehicle, proximity of the vehicle to another vehicle, locations of entertainment experiences relative to the location of the vehicle, time of day, amount of time available to the occupant(s) to devote to seeking out and experiencing an entertainment experience, respective congestion (e.g., vehicle or people congestion) at respective locations of entertainment experiences, availability and locations of desired accommodations (e.g., charging stations, hotels, restaurants, or restroom facilities, . . . ), and/or other factors or information, including as described herein.

The content generator component 1114 can determine and generate content, including interactive content, that can be presented or provided to a vehicle, based at least in part on a variety of factors (e.g., user preferences or input information (e.g., content or entertainment experience selection information), context, environmental conditions, and/or vehicle conditions, . . . ), such as more fully described herein. The visual and/or audio portions of the content can be presented to an occupant of the vehicle, as more fully described herein. The control content of the interactive content can be utilized to control operation of the vehicle, as more fully described herein.

The AR component 1116 can determine and generate AR content that can be presented to a vehicle occupant in connection with an entertainment experience. For instance, the AR component 1116 can determine desirable AR content that can augment the real environment (e.g., 3-D real object scene) associated with (e.g., surrounding) the occupant and vehicle (e.g., as presented via the presentation component or a device (e.g., AR/VR headgear) of the occupant), wherein such AR content can relate to the entertainment experience being provided to the occupant. As an example, if the entertainment experience relates to recreating a rollercoaster ride, the AR component 1116 can determine and generate AR content that can augment the real environment to present synthesized objects (e.g., AR or virtual objects) that can recreate part of an amusement park that can surround the rollercoaster ride. The AR component 1116 can employ desired AR techniques and algorithms to facilitate determining and generating the desired AR content.

The VR component 1118 can determine and generate VR content that can be presented to a vehicle occupant in connection with an entertainment experience. For instance, the VR component 1118 can determine desirable VR content that can create a virtual environment (e.g., 3-D virtual object scene) that can recreate a real environment or create a fictional or fantasy environment that can be associated with (e.g., surrounding) the occupant and vehicle (e.g., as presented via the presentation component or a device (e.g., AR/VR headgear) of the occupant), wherein such VR content can relate to the entertainment experience being provided to the occupant. For example, if the entertainment experience relates to recreating a rollercoaster ride, the VR component 1118 can determine and generate VR content that can create a virtual environment (e.g., 3-D virtual environment), comprising virtual or synthesized objects, that can recreate part of an amusement park that can surround the rollercoaster ride (e.g., recreate a known or famous rollercoaster ride and amusement park) or a fantasy rollercoaster ride (e.g., a rollercoaster ride in outer space). The VR component 1118 can employ desired VR techniques and algorithms to facilitate determining and generating the desired VR content.

The vehicle controller component 1120 can determine and generate control content that can be utilized to control operation of the vehicle, for example, in connection with (e.g., in synchronization with) presentation of visual and/or audio portions of the interactive content, as more fully described herein. The vehicle controller component 1120 can determine respective control content to control respective vehicle systems and components (e.g., engine system, steering system, accelerator system, brake system, transmission system, seating system, suspension system, climate control system, display system, and/or audio system, . . . ) to facilitate operation of the vehicle (e.g., in accordance with the entertainment experience) and enhancement of the presentation of the visual and audio portions of the interactive content to the occupant. For example, further to the rollercoaster example, as the visual and audio content is being presented to the occupant to recreate the experience of the occupant being transported up the lift hill of the rollercoaster, the control content can be utilized (e.g., executed) by the agent component 1122 and associated vehicle systems and components (e.g., seating system) to tilt the seat of the occupant back to give the occupant the sensation (e.g., to recreate the sensation) of being in a rollercoaster car that is being pulled up the lift hill, and can present haptic content, via the occupant's seat, to give the occupant the sensation of the slight jerking of the rollercoaster car as the rollercoaster car is being pulled up the lift hill by a chain (e.g., being pulled up link by link of the chain).

The orchestrator component 1100 can include (e.g., optionally can include) the agent component 1122 (e.g., when the orchestrator component 1100 is integrated with the vehicle) or can be associated with (e.g., communicatively connected to) the agent component 1122. The agent component 1122 can collect information (e.g., sensor data, user preferences, and/or user input information, . . . ) from various entities (e.g., vehicle occupant, and/or sensors of the sensor component, . . . ) associated with the vehicle, analyze such information to generate analysis results (e.g., detailed analysis results, summary information, and/or alert information, . . . ), and/or present the information and/or analysis results, or a desired portion thereof, to the orchestrator component 1100 or desired (e.g., appropriate or applicable) components of the orchestrator component 1100. The agent component 1122 also can execute and manage content, such as interactive content, for presentation of content (e.g., visual, audio, and/or haptic content) to the vehicle occupant and/or utilization of control content to control respective operation of the various systems and components of the vehicle. As part of managing the content, the agent component 1122 also can monitor the presentation of content to the occupant (e.g., via the presentation component or device (e.g., AR/VR headgear)) and/or the operation of the various systems and components of the vehicle (e.g., in response to execution of the control content).

The processor component 1124 that can work in conjunction with the other components (e.g., communicator component 1102, operations manager component 1104, condition component 1106, preference component 1108, biometric component 1110, context component 1112, content generator component 1114, vehicle controller component 1120, agent component 1122, and/or data store 1126) to facilitate performing the various functions of the orchestrator component 1100. The processor component 1124 can employ one or more processors, microprocessors, or controllers that can process data, such as information relating to users, vehicles, entertainment experiences, interactive content (e.g., visual content, audio content, AR content, VR content, control content, and/or haptic content), contexts associated with users or vehicles, status or progress of entertainment experiences (e.g., presentation or execution of content), environmental conditions associated with users or vehicles, locations of potential items or entertainment experiences of interest, accommodations, subscriptions (e.g., subscriptions for entertainment experiences and/or content), identifiers or authentication credentials associated with users, entities, devices, or components, parameters, traffic flows, policies (e.g., content management policies), defined content management criteria, algorithms (e.g., content management algorithm(s)), protocols, interfaces, tools, and/or other information, to facilitate operation of the orchestrator component 1100, as more fully disclosed herein, and control data flow between the orchestrator component 1100 and other components (e.g., agent component (e.g., when not part of the orchestrator component 1100), communication devices, base stations, network devices of the communication network, data sources, applications, . . . ) associated with the orchestrator component 1100.

The data store 1126 can store data structures (e.g., user data, metadata), code structure(s) (e.g., modules, objects, hashes, classes, procedures) or instructions, information relating to users, vehicles, entertainment experiences, interactive content (e.g., visual content, audio content, AR content, VR content, control content, and/or haptic content), contexts associated with users or vehicles, status or progress of entertainment experiences (e.g., presentation or execution of content), environmental conditions associated with users or vehicles, locations of potential items or entertainment experiences of interest, accommodations, subscriptions (e.g., subscriptions for entertainment experiences and/or content), identifiers or authentication credentials associated with users, entities, devices, or components, parameters, traffic flows, policies (e.g., content management policies), defined content management criteria, algorithms (e.g., content management algorithm(s)), protocols, interfaces, tools, and/or other information, to facilitate controlling operations associated with the orchestrator component 1100. In an aspect, the processor component 1124 can be functionally coupled (e.g., through a memory bus) to the data store 1126 in order to store and retrieve information desired to operate and/or confer functionality, at least in part, to the communicator component 1102, operations manager component 1104, condition component 1106, preference component 1108, biometric component 1110, context component 1112, content generator component 1114, vehicle controller component 1120, agent component 1122, and/or data store 1126, etc., and/or substantially any other operational aspects of the orchestrator component 1100.

Figure 12:
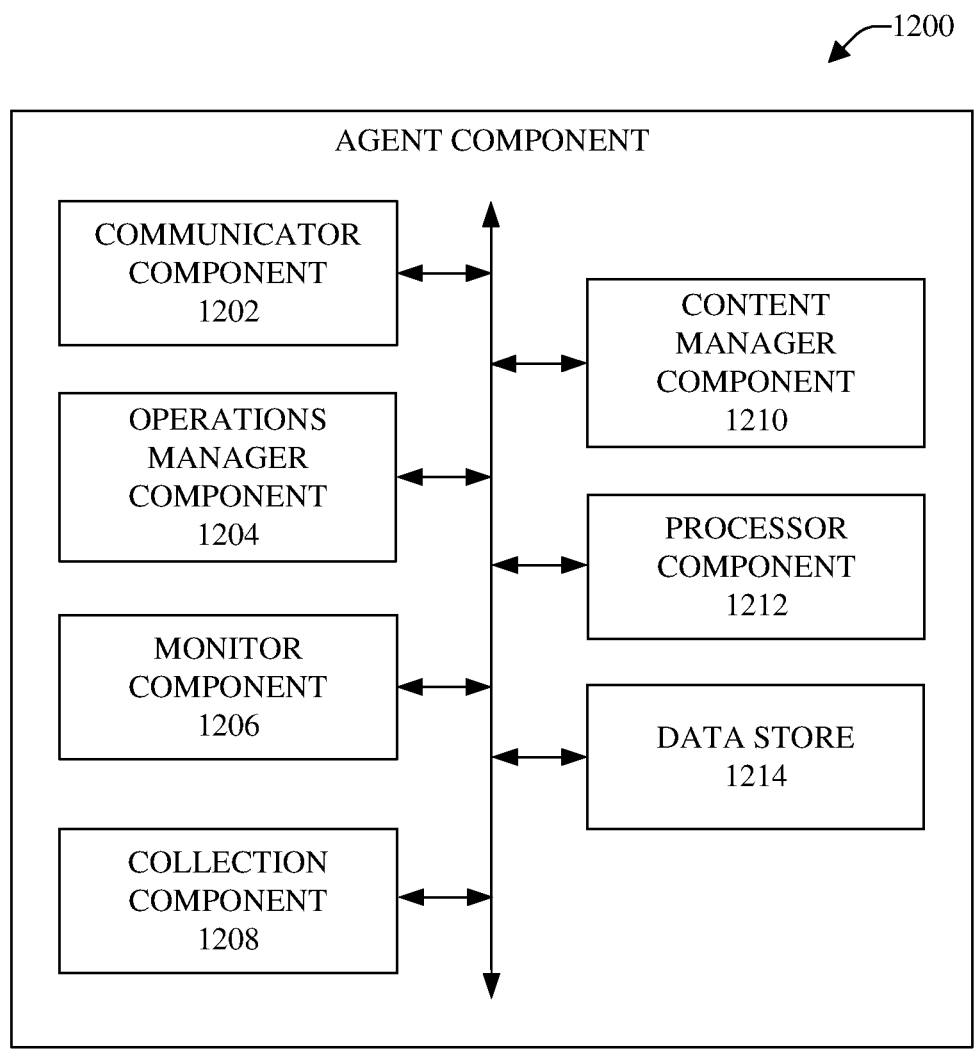
FIG. 12 illustrates a block diagram of an example agent component, in accordance with various aspects and embodiments of the disclosed subject matter.

FIG. 12 illustrates a block diagram of an example agent component 1200, in accordance with various aspects and embodiments of the disclosed subject matter. The agent component 1200 can comprise, for example, a communicator component 1202, an operations manager component 1204, a monitor component 1206, a collection component 1208, and content manager component 1210. The agent component 1200 also can include a processor component 1212 and a data store 1214. The agent component 1200 can be the same as or similar to that, and/or can comprise the same or similar functionality, as more fully described herein.

The communicator component 1202 can transmit information from the agent component 1200 to another component(s) or device(s) (e.g., an orchestrator component (e.g., in embodiments where the agent component 1200 is not part of the orchestrator component), a sensor component, a communication device, or a network component or device, . . . ) and/or can receive information from the other component(s) or device(s). For instance, the communicator component 1202 can receive (e.g., from an interface of or associated with the agent component 1200, a communication device, or a sensor component of the vehicle) information relating to user input (e.g., input information to select an item or content) of a user (e.g., vehicle occupant), user preferences of the user, identifier or authentication information (e.g., device ID, user ID, authentication credentials, biometric information, and/or communication network address, . . . ) associated with the user, another entity, component, or device, sensor data, and/or other desired information. The communicator component 1202 also can receive, from the orchestrator component, information relating to entertainment experiences, which can include content, such as interactive content, subscription-related information regarding a subscription of a user, cost or purchase related information relating to a cost or purchase of an entertainment experience, and/or other information.

The communicator component 1202 can, for example, transmit, to information (e.g., sensor data, analysis data, user input information or user preference information, and/or content status information, . . . ) to the orchestrator component. The communicator component 1202 also can transmit respective control content to respective systems or components of the vehicle (e.g., engine system, steering system, accelerator system, brake system, transmission system, seating system, suspension system, climate control system, display system, and/or audio system, . . . ) to facilitate controlling operations of the respective systems or components of the vehicle based at least in part on utilization (e.g., execution) of such respective control content. The communicator component 1202 further can transmit visual and/or audio portions of the interactive content to the presentation system (e.g., display system and/or audio system) and/or device (e.g., AR/VR headgear, smart phone, computer, or electronic pad or table) to facilitate presentation of the visual and/or audio portions of the interactive content to the user (e.g., occupant) via the presentation system and/or the device. In some embodiments, the communicator component 1202 can communicate information (e.g., receive information from or transmit information to) another agent component of another vehicle, for example, to facilitate notifying the other agent component and associated other vehicle or other occupant regarding certain actions (e.g., actions of a vehicle action sequence) that the vehicle is intending to perform and/or inquiring as to whether the other vehicle or other occupant desires to participate with regard to a vehicle action sequence, and/or can receive an acknowledgement message (e.g., in response to a notification message) from the other agent component.

The operations manager component 1204 that can control (e.g., manage) operations associated with the agent component 1200. For example, the operations manager component 1204 can facilitate generating instructions to have components of the agent component 1200 perform operations, and can communicate respective instructions to respective components (e.g., communicator component 1202, monitor component 1206, collection component 1208, and/or content manager component 1210, . . . ) of the agent component 1200 to facilitate performance of operations by the respective components of the agent component 1200 based at least in part on the instructions, in accordance with the defined content management criteria and content management algorithm(s) (e.g., content management algorithms as disclosed, defined, recited, or indicated herein by the methods, systems, and techniques described herein). The operations manager component 1204 also can facilitate controlling data flow between the respective components of the agent component 1200 and controlling data flow between the agent component 1200 and another component(s) or device(s) (e.g., orchestrator component, sensor component, vehicle system or component, communication device, another agent component of another vehicle, base station or other network node component or device of the communication network) associated with (e.g., connected to) the agent component 1200.

The monitor component 1206 can monitor the sensors of the sensor component for sensor data regarding conditions (e.g., environmental conditions, vehicle conditions, or occupant conditions) of or associated with the vehicle or occupant, respective vehicle systems or components for information regarding operation of the vehicle, communication channels for information that can be received from another component or device (e.g., orchestrator component, communication device, another agent component, or base station or other network node or device, . . . ) associated with the agent component 1200.

The collection component 1208 can collect and/or aggregate information (e.g., sensor data, user preferences, and/or user input information, . . . ) from various entities (e.g., vehicle occupant, communication device of the occupant, and/or sensors of the sensor component, . . . ) associated with the vehicle. The collection component 1208 also can collect and/or aggregate information received from the orchestrator component or from another agent component of another vehicle. The collection component 1208 can store the respective items of collected and/or aggregated information in the data store 1214 or can make such information available for processing and/or analysis (e.g., by the processor component 1212 and/or content manager component 1210).

The content manager component 1210 can control presentation of content, including visual and/or audio portions of content (e.g., visual and/or audio portions of interactive content) to a vehicle occupant via the presentation system, and can control the utilization, distribution, and/or implementation (e.g., execution) of control content or other content (e.g., haptic content) of the interactive content (e.g., in synchronization with the presentation of the visual and/or audio portions of the content, with regard to an entertainment experience). As part of managing the content, the content manager component 1210 also can monitor (e.g., via the monitor component 1206) the presentation of content to the occupant (e.g., via the presentation component or device (e.g., AR/VR headgear)) and/or the operation of the various systems and components of the vehicle (e.g., in response to execution of the control content), for example, to facilitate ensuring that the content is being presented or implemented in a desirable manner (e.g., the visual, audio, and/or haptic content is being presented to the vehicle occupant in synchronization with the operation of the vehicle and/or the location or environmental surroundings of or associated with the vehicle, in accordance with the entertainment experience being provided to the occupant). The content manager component 1210 also can analyze information (e.g., sensor data, user preferences, and/or user input information, . . . ) to generate analysis results (e.g., detailed analysis results, summary information, and/or alert information, . . . ), and/or can facilitate presenting (e.g., via the communicator component 1202) the information and/or the analysis results, or a desired portion thereof, to the orchestrator component or desired (e.g., appropriate or applicable) components of the orchestrator component.

The processor component 1212 that can work in conjunction with the other components (e.g., communicator component 1202, operations manager component 1204, monitor component 1206, collection component 1208, content manager component 1210, and/or data store 1214) to facilitate performing the various functions of the agent component 1200. The processor component 1212 can employ one or more processors, microprocessors, or controllers that can process data, such as information relating to users, vehicles, entertainment experiences, interactive content (e.g., visual content, audio content, AR content, VR content, control content, and/or haptic content), contexts associated with users or vehicles, status or progress of entertainment experiences (e.g., presentation or execution of content), environmental conditions associated with users or vehicles, locations of potential items or entertainment experiences of interest, accommodations, subscriptions (e.g., subscriptions for entertainment experiences and/or content), identifiers or authentication credentials associated with users, entities, devices, or components, parameters, traffic flows, policies (e.g., content management policies), defined content management criteria, algorithms (e.g., content management algorithm(s)), protocols, interfaces, tools, and/or other information, to facilitate operation of the agent component 1200, as more fully disclosed herein, and control data flow between the agent component 1200 and other components (e.g., orchestrator component (e.g., when the agent component is not part of the orchestrator component), communication devices, base stations, network devices of the communication network, data sources, applications, . . . ) associated with the agent component 1200.

The data store 1214 that can store data structures (e.g., user data, metadata), code structure(s) (e.g., modules, objects, hashes, classes, procedures) or instructions, information relating to users, vehicles, entertainment experiences, interactive content (e.g., visual content, audio content, AR content, VR content, control content, and/or haptic content), contexts associated with users or vehicles, status or progress of entertainment experiences (e.g., presentation or execution of content), environmental conditions associated with users or vehicles, locations of potential items or entertainment experiences of interest, accommodations, subscriptions (e.g., subscriptions for entertainment experiences and/or content), identifiers or authentication credentials associated with users, entities, devices, or components, parameters, traffic flows, policies (e.g., content management policies), defined content management criteria, algorithms (e.g., content management algorithm(s)), protocols, interfaces, tools, and/or other information, to facilitate controlling operations associated with the agent component 1200. In an aspect, the processor component 1212 can be functionally coupled (e.g., through a memory bus) to the data store 1214 in order to store and retrieve information desired to operate and/or confer functionality, at least in part, to the communicator component 1202, operations manager component 1204, monitor component 1206, collection component 1208, content manager component 1210, and/or data store 1214, etc., and/or substantially any other operational aspects of the agent component 1200.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 13-17. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 13:
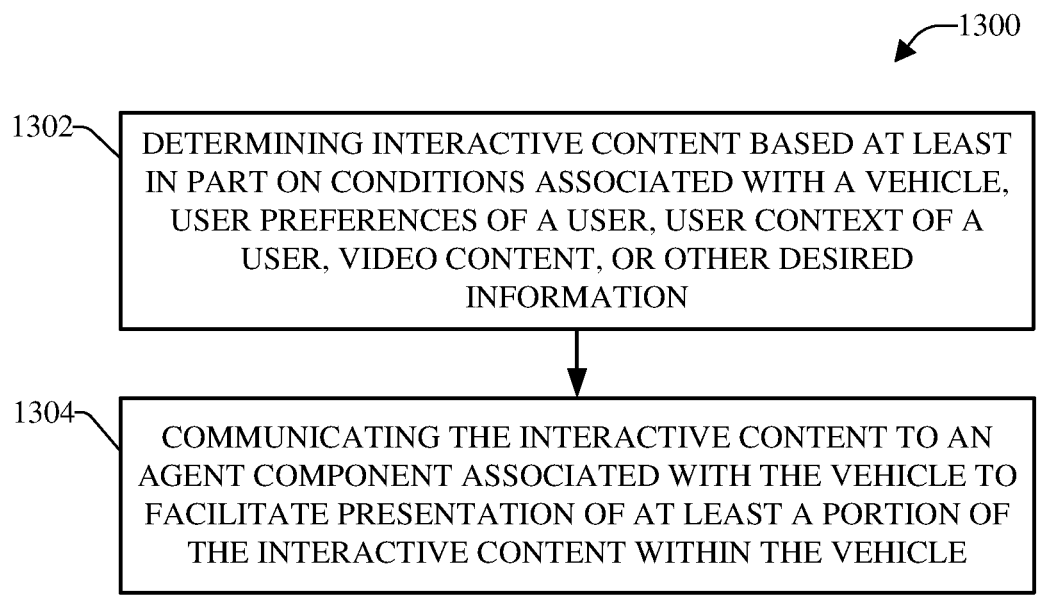
FIG. 13 illustrates a flow chart of an example method that can determine interactive content, including AR content and/or VR content, that can be presented to an occupant of a vehicle, in accordance with various aspects and embodiments of the disclosed subject matter.

FIG. 13 illustrates a flow chart of an example method 1300 that can determine interactive content, including AR content and/or VR content, that can be presented to an occupant of a vehicle, in accordance with various aspects and embodiments of the disclosed subject matter. The method 1300 can be employed by, for example, a system comprising the orchestrator component, agent component, a processor component (e.g., of or associated with the orchestrator component and/or agent component), and/or a data store (e.g., of or associated with the orchestrator component and/or agent component).

At 1302, interactive content can be determined based at least in part on conditions associated with a vehicle, user preferences of a user (e.g., vehicle occupant), user context of a user, video content (e.g., video content, such as a movie, TV program, or video presented or to be presented in the vehicle), or other desired information. The orchestrator component can determine the interactive content based at least in part on the conditions associated with the vehicle (e.g., environmental conditions associated with the vehicle and/or conditions of the vehicle), user preferences, user context (e.g., mood or level of stimulation of the user), video content, or other desired (e.g., pertinent) information. The interactive content can comprise video content, AR content, VR content, control content (e.g., to control operation of the vehicle), audio content, and/or haptic content.

At 1304, the interactive content can be communicated to an agent component associated with the vehicle to facilitate presentation of at least a portion of the interactive content within the vehicle. The orchestrator component can communicate the interactive content to the agent component or can otherwise have the agent component receive the interactive content (e.g., when the agent component is part of the orchestrator component, another component of the orchestrator component can communicate the interactive content to the agent component). The agent component can present at least the portion of the interactive content (e.g., video content, AR content, VR content, and/or audio content), via the presentation component (e.g., one or more display screens and/or an audio system) of the vehicle or a UE, to the occupant of the vehicle. In some embodiments, the agent component can present the portion of the interactive content via the presentation component in connection with (e.g., in conjunction with or in synchronization with) controlling the operation of the vehicle based at least in part on the control content of or associated with the interactive content. The agent component also can facilitate presenting or implementing haptic content via an appropriate vehicle component (e.g., seat and/or head rest of the seating system, arm rest, and/or floor of the vehicle, . . . ).

Figure 14:
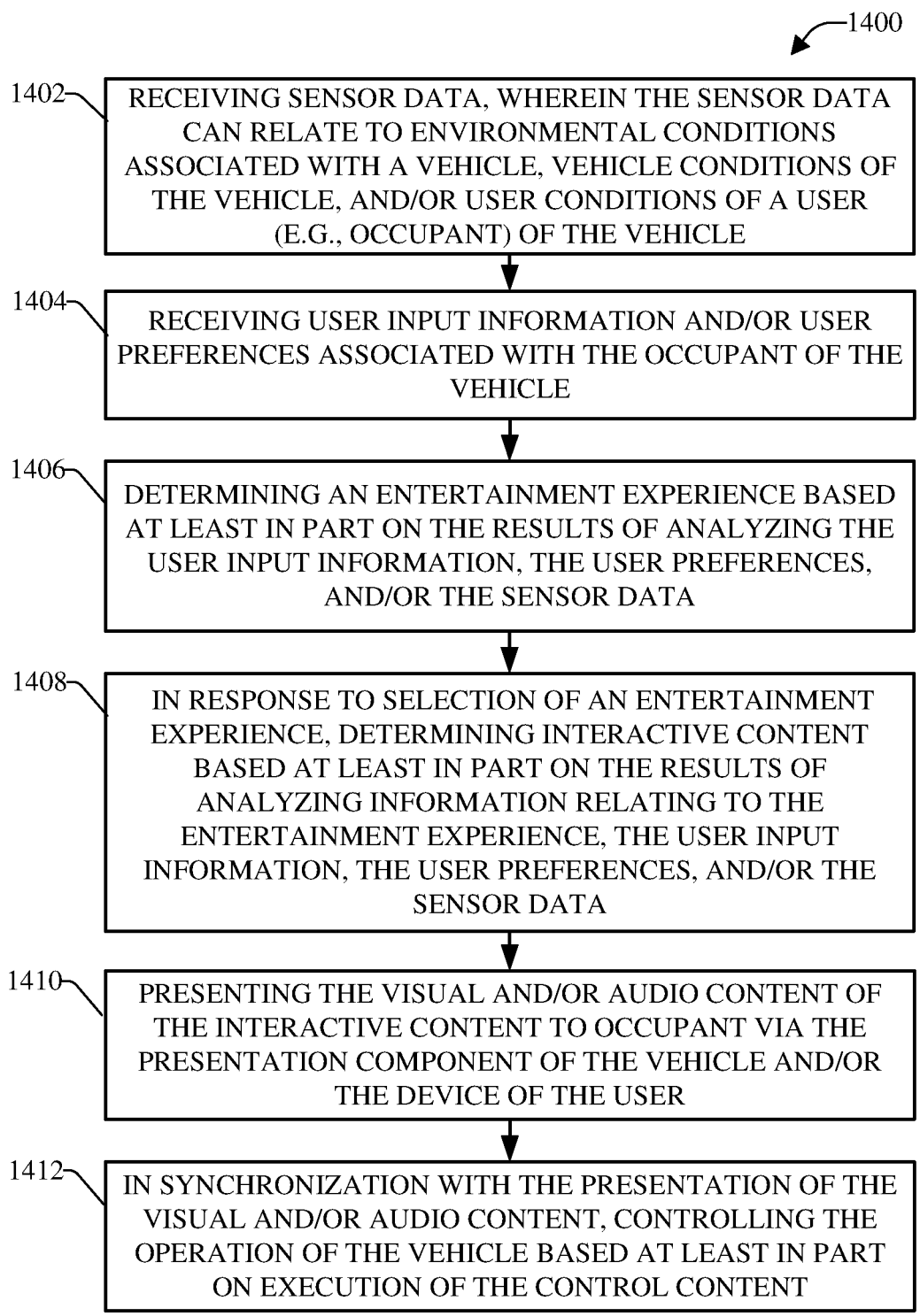
FIG. 14 presents a flow chart of another example method that that can control presentation of interactive content, including AR content and VR content, in a vehicle and/or correspondingly control operation of the vehicle, in accordance with various aspects and embodiments of the disclosed subject matter.

FIG. 14 presents a flow chart of another example method 1400 that that can control presentation of interactive content, including AR content and VR content, in a vehicle and/or correspondingly control operation of the vehicle, in accordance with various aspects and embodiments of the disclosed subject matter. The method 1400 can be employed by, for example, a system comprising the orchestrator component, agent component, a processor component (e.g., of or associated with the orchestrator component and/or agent component), and/or a data store (e.g., of or associated with the orchestrator component and/or agent component).

At 1402, sensor data can be received, wherein the sensor data can relate to environmental conditions associated with a vehicle, vehicle conditions of the vehicle, and/or user conditions of a user (e.g., occupant) of the vehicle. The orchestrator component can receive the sensor data from one or more sensors of a sensor component of the vehicle and/or from another source(s) (e.g., device or component) that can provide a portion of the sensor data.

At 1404, user input information and/or user preferences associated with the occupant of the vehicle can be received. The orchestrator component can receive the user input information from the user via an interface associated with the agent component or via a device (e.g., smart phone, AR/VR headset, or computer, . . . ) of the user. The orchestrator component can receive the user preferences associated with an occupant from a user profile of the occupant or via the interface associated with the agent component or the device of the user. The user input information can specify a particular entertainment experience desired by the occupant, can indicate generally a type of entertainment experience that may be desired by the occupant, or can provide no general or specific information regarding an entertainment experience. The user preferences can comprise information relating to, for example, interests, specific or general, of the occupant.

At 1406, an entertainment experience can be determined based at least in part on the results of analyzing the user input information, the user preferences, and/or the sensor data. The orchestrator component can determine one or more entertainment experiences that can be desired by the occupant based at least in part on the results of analyzing the user input information, the user preferences, and/or the sensor data. The orchestrator component can send a recommendation message recommending the one or more entertainment experiences to the occupant via the agent component or the device of the user, wherein the agent component can present the one or more recommended entertainment experiences to the user via the presentation component or another desired interface associated with the agent component. The occupant can select the desired entertainment experience from the one or more recommended entertainment experiences, or can provide further user input information to facilitate determining a desired entertainment experience that can be selected by the occupant.

At 1408, in response to selection of an entertainment experience, interactive content can be determined based at least in part on the results of analyzing information relating to the entertainment experience, the user input information, the user preferences, and/or the sensor data. The orchestrator component can determine and generate the interactive content based at least in part on the results of analyzing information relating to the entertainment experience, the user input information, the user preferences, and/or the sensor data. For instance, the orchestrator component can determine and generate visual and/or audio content of the interactive content based at least in part on the results of such analysis, wherein the visual and/or audio content can comprise AR content and/or VR content. The orchestrator component also can determine and generate control content of the interactive content based at least in part on the results of such analysis, wherein the control content can include haptic content, and wherein the control content can be employed to control operation of the vehicle in coordination with presentation of the visual and/or audio content.

At 1410, the visual and/or audio content of the interactive content can be presented to occupant via the presentation component of the vehicle and/or the device of the user. At 1412, in synchronization with the presentation of the visual and/or audio content, the operation of the vehicle can be controlled based at least in part on execution of the control content. The orchestrator component can provide (e.g., communicate) the interactive content to the agent component (e.g., when the agent component is separate from the orchestrator component) and/or can control the agent component to have the agent component implement the interactive content to provide (e.g., present) the entertainment experience to the user. The agent component can present the visual and/or audio content to occupant via the presentation component (e.g., display screen(s) of the display system and/or audio system) and/or the device of the user. The agent component also can execute the control content to control the operation of the vehicle in synchronization with the presentation of the visual and/or audio content to the occupant.

Figure 15:
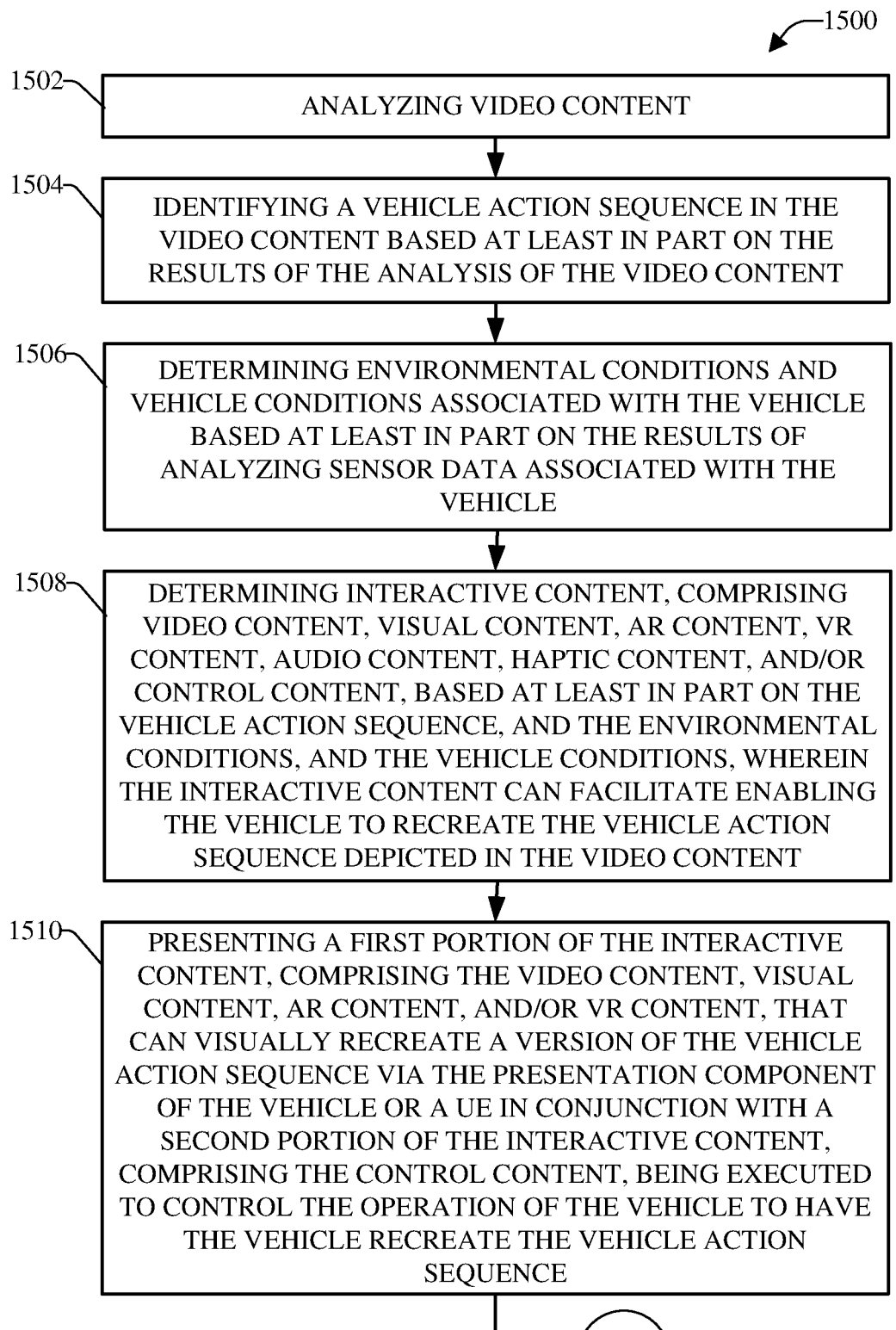
FIG. 15 depicts a flow chart of another example method that can determine and generate interactive content that can facilitate recreating a vehicle action sequence identified in video content, in accordance with various aspects and embodiments of the disclosed subject matter.

FIG. 15 depicts a flow chart of another example method 1500 that can determine and generate interactive content that can facilitate recreating a vehicle action sequence identified in video content (e.g., video content in a movie, TV program, or other type of program), in accordance with various aspects and embodiments of the disclosed subject matter. The method 1500 can be employed by, for example, a system comprising the orchestrator component, agent component, a processor component (e.g., of or associated with the orchestrator component and/or agent component), and/or a data store (e.g., of or associated with the orchestrator component and/or agent component).

At 1502, video content can be analyzed. At 1504, a vehicle action sequence can be identified in the video content based at least in part on the results of the analysis of the video content. The video content can be a movie, TV program, or other program that can include a vehicle action sequence performed by one or more vehicles. The orchestrator component can analyze the video content, and can identify the vehicle action sequence in the video content based at least in part on the analysis results.

At 1506, environmental conditions and vehicle conditions associated with the vehicle can be determined based at least in part on the results of analyzing sensor data associated with the vehicle. The orchestrator component can receive sensor data from a sensor component that can comprise one or more sensors that can sense environmental conditions (e.g., road conditions, weather conditions, . . . ) associated with the vehicle and vehicle conditions of the vehicle (e.g., conditions, including functionality and capabilities, of vehicle components). The orchestrator component can analyze the sensor data, and can determine the environmental conditions and vehicle conditions associated with the vehicle based at least in part on the results of analyzing the sensor data.

At 1508, interactive content, comprising video content, visual content, AR content, VR content, audio content, haptic content, and/or control content, can be determined based at least in part on the identified vehicle action sequence, and the environmental conditions and vehicle conditions associated with the vehicle, wherein the interactive content can facilitate enabling the vehicle to recreate the vehicle action sequence depicted in the video content. At 1510, a first portion of the interactive content, comprising the video content, visual content, AR content, and/or VR content, that can visually recreate a version of the vehicle action sequence can be presented via the presentation component of the vehicle or a UE in conjunction with a second portion of the interactive content, comprising the control content, being executed to control the operation of the vehicle to have the vehicle recreate the vehicle action sequence.

The orchestrator component can determine and generate the interactive content based at least in part on the identified vehicle action sequence, the environmental conditions and the vehicle conditions. The interactive content can comprise control content that can be utilized to control operation of the vehicle to have the vehicle recreate the vehicle action sequence identified in the video content. The interactive content also can comprise the video content, and/or visual content, AR content, and/or VR content that can be determined based at least in part on the video content. For instance, the AR content or VR content can recreate 3-D visual aspects of the vehicle action sequence identified in the video content such that, when the AR content or VR content is presented to the vehicle occupant on the display screens in the vehicle or the occupant's UE, the occupant can be immersed in the scene (e.g., 3-D object scene of the vehicle action sequence) in synchronization with the control content controlling the operation of the vehicle to have the vehicle recreate the vehicle action sequence as if the occupant was in the video content (e.g., in the movie, TV program, or other video content). In some embodiments, the agent component of the vehicle can present and/or execute the respective types of interactive content (e.g., video content, visual content, AR content, VR content, audio content, haptic content, and/or control content) in synchronization with each other.

In some embodiments, the method 1500 can proceed to reference point A, wherein, for example, method 1600 or method 1700 can proceed from reference point A.

Figure 16:
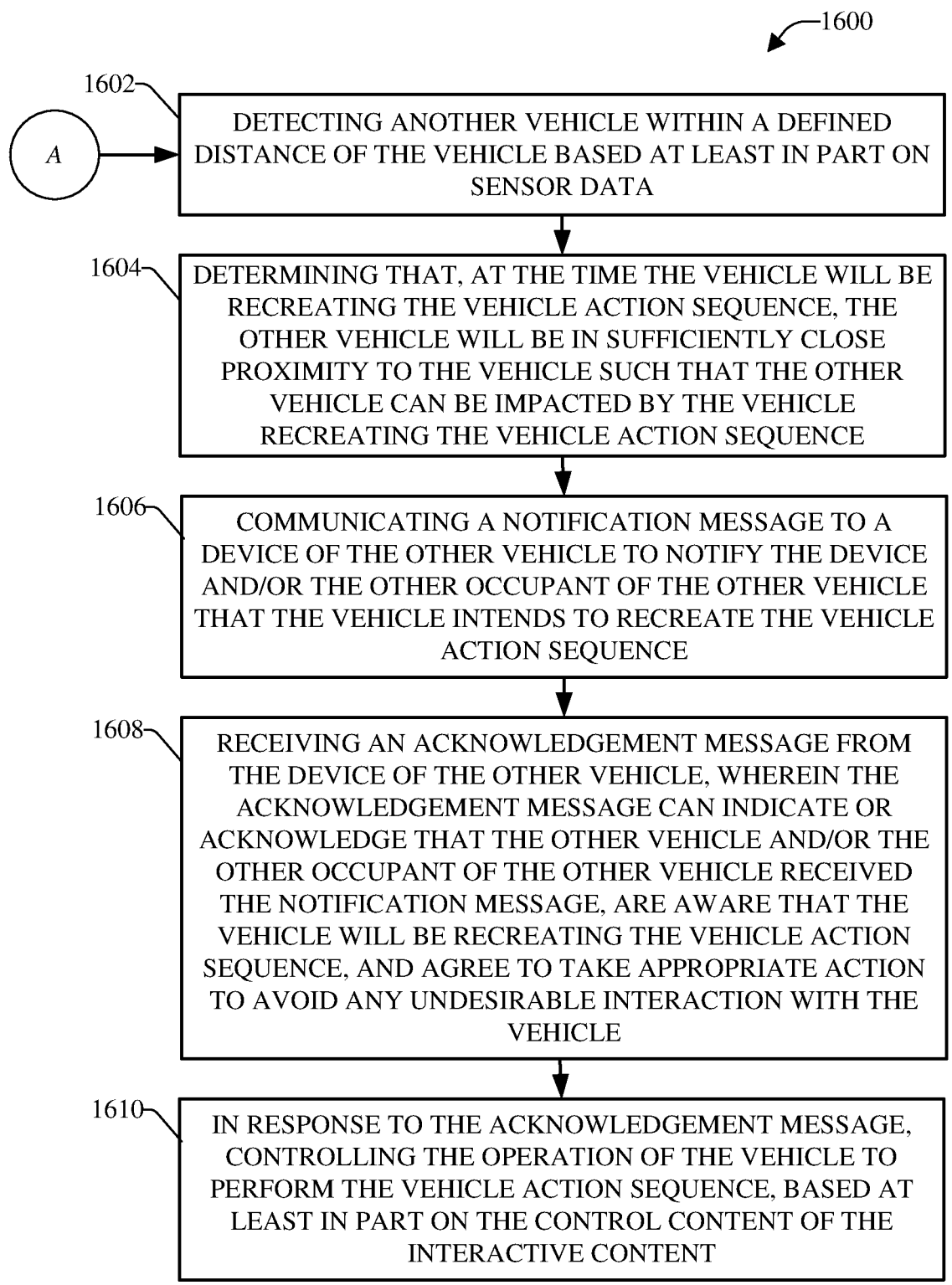
FIG. 16 illustrates a flow chart of an example method that, in connection with a vehicle intending to perform a vehicle action sequence, can notify a nearby vehicle that the vehicle is intending to perform the vehicle action sequence, in accordance with various aspects and embodiments of the disclosed subject matter.

FIG. 16 illustrates a flow chart of an example method 1600 that, in connection with a vehicle intending to perform a vehicle action sequence, can notify a nearby vehicle that the vehicle is intending to perform the vehicle action sequence, in accordance with various aspects and embodiments of the disclosed subject matter. The method 1600 can be employed by, for example, a system comprising the orchestrator component, agent component, a processor component (e.g., of or associated with the orchestrator component and/or agent component), and/or a data store (e.g., of or associated with the orchestrator component and/or agent component). In some embodiments, the method 1600 can proceed from reference point A of method 1500.

At 1602, another vehicle can be detected within a defined distance of the vehicle based at least in part on sensor data. The orchestrator component or agent component can detect or determine that one or more other vehicles, including the other vehicle, are within a defined distance of the vehicle, based at least in part on the sensor data received from one or more sensors that can detect objects (e.g., the other vehicle) and/or locations of the objects.

At 1604, a determination can be made that, at the time the vehicle will be recreating the vehicle action sequence, the other vehicle will be in sufficiently close proximity to the vehicle such that the other vehicle can be impacted by the vehicle recreating the vehicle action sequence. Based at least in part on the sensor data and the time period in the interactive content where the vehicle action sequence occurs, the orchestrator component or agent component can determine or predict that, at the time the vehicle will be recreating the vehicle action sequence, the other vehicle will be in sufficiently close proximity to the vehicle such that the other vehicle can be impacted by the vehicle recreating the vehicle action sequence.

At 1606, a notification message can be communicated to a device of the other vehicle to notify the device and/or the other occupant of the other vehicle that the vehicle intends to recreate the vehicle action sequence. The orchestrator component or agent component can generate the notification message and can communicate the notification message to the device (e.g., communication device or another agent component) to notify the device and/or the other occupant of the other vehicle that the vehicle intends to recreate the vehicle action sequence.

At 1608, an acknowledgement message can be received from the device of the other vehicle, wherein the acknowledgement message can indicate or acknowledge that the other vehicle and/or the other occupant of the other vehicle received the notification message, are aware that the vehicle will be recreating the vehicle action sequence, and agree to take appropriate action to avoid any undesirable interaction with the vehicle (e.g., agree to take action to avoid colliding or potentially colliding with the vehicle). The device of the other vehicle can communicate the acknowledgement message to the orchestrator component or agent component. The orchestrator component or agent component can receive the acknowledgement message.

At 1610, in response to the acknowledgement message, the operation of the vehicle can be controlled to perform the vehicle action sequence, based at least in part on the control content of the interactive content. The orchestrator component or agent component can control the operation of the vehicle, based at least in part on the control content, to have the vehicle perform (e.g., recreate or execute) the vehicle action sequence (e.g., in conjunction with or synchronization with) the presentation of a portion of the interactive content (e.g., video content, AR content, VR content, and/or audio content), via the presentation component or UE, to the occupant of the vehicle, and/or the haptic content via a component(s) (e.g., seat, floor, and/or arm rest, . . . ) of the vehicle. The orchestrator component or the device (e.g., another agent component) of the other vehicle can control operation of the other vehicle, based at least in part on other control content generated by the orchestrator component or the device, to have the other vehicle take appropriate action (e.g., appropriate avoidance action) to avoid undesirably interacting (e.g., colliding) with the vehicle during the vehicle action sequence.

In some embodiments, if, instead, no acknowledgement message was received by the orchestrator component or agent component, either because the device of the other vehicle did not respond to the notification message, the device of the other vehicle communicated a message indicating that the other vehicle or occupant did not agree to take appropriate action (e.g., appropriate avoidance action), or the acknowledgement message was sent by the device, but not received (e.g., not received at all or not received in time) by the orchestrator component or agent component, the orchestrator component or agent component can determine that the vehicle is not permitted to recreate the vehicle action sequence, and can control operation of the vehicle to not have the vehicle recreate the vehicle action sequence.

It is to be appreciated and understood that, while the methods 1500 and 1600 can involve determining and generating interactive content prior to the notification message being sent and the acknowledgement message being received, the disclosed subject matter is not so limited, as, in accordance with some embodiments, the determining and generating of the interactive content can occur after a notification message has been sent to the other vehicle (e.g., agent component of the other vehicle) and the acknowledgement message, which indicates that other vehicle agrees to take appropriate action in response to the vehicle performing the vehicle action sequence, has been received by the orchestrator component or agent component of or associated with the vehicle.

Figure 17:
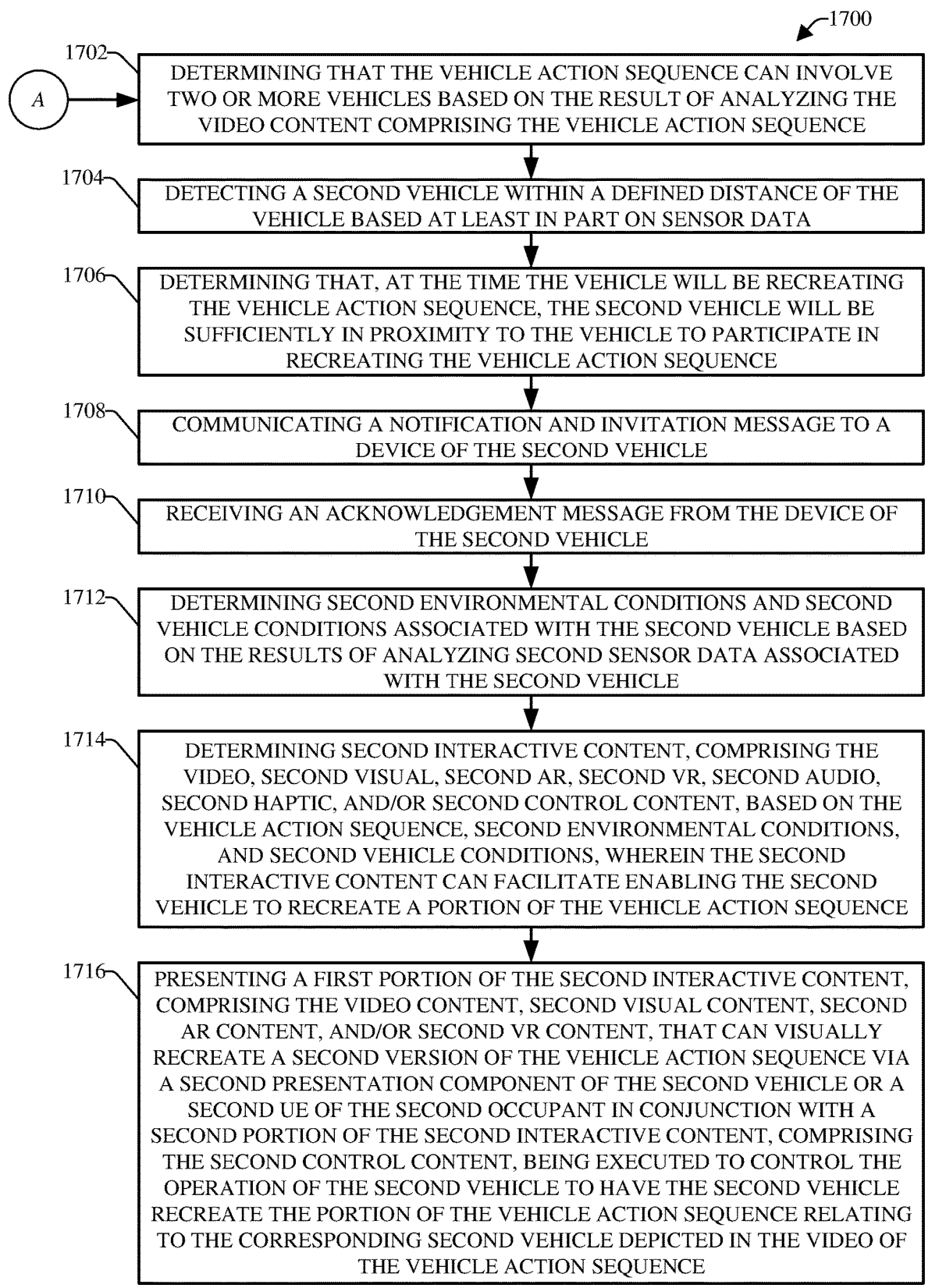
FIG. 17 presents a flow chart of an example method that, in connection with a vehicle intending to perform a vehicle action sequence, can notify a nearby vehicle that the vehicle is intending to perform the vehicle action sequence and can invite the other vehicle to participate in the vehicle action sequence, in accordance with various aspects and embodiments of the disclosed subject matter.

FIG. 17 presents a flow chart of an example method 1700 that, in connection with a vehicle intending to perform a vehicle action sequence, can notify a nearby vehicle that the vehicle is intending to perform the vehicle action sequence and can invite the other vehicle to participate in the vehicle action sequence, in accordance with various aspects and embodiments of the disclosed subject matter. The method 1700 can be employed by, for example, a system comprising the orchestrator component, agent component, a processor component (e.g., of or associated with the orchestrator component and/or agent component), and/or a data store (e.g., of or associated with the orchestrator component and/or agent component). In some embodiments, the method 1700 can proceed from reference point A of method 1500.

At 1702, a determination can be made that the vehicle action sequence can involve two or more vehicles, based at least in part on the result of analyzing the video content comprising the vehicle action sequence. Based at least in part on the result of analyzing the video content, including the vehicle action sequence, the orchestrator component or agent component can determine that the vehicle action sequence can involve two or more vehicles such that two or more vehicles, including the vehicle, can recreate the respective actions of two or more vehicles presented in the vehicle action sequence of the video content.

At 1704, a second vehicle can be detected within a defined distance of the vehicle based at least in part on sensor data. The orchestrator component or agent component can detect or determine that one or more other vehicles, including the second vehicle, are within a defined distance of the vehicle, based at least in part on the sensor data received from one or more sensors that can detect objects (e.g., the other vehicle) and/or locations of the objects.

At 1706, a determination can be made that, at the time the vehicle will be recreating the vehicle action sequence, the second vehicle will be sufficiently in proximity to the vehicle such that the second vehicle can participate in recreating the vehicle action sequence. Based at least in part on the sensor data and the time period in the interactive content where the vehicle action sequence occurs, the orchestrator component or agent component can determine that, at the time the vehicle will be recreating the vehicle action sequence, the second vehicle will be sufficiently in proximity to the vehicle such that the second vehicle can participate in recreating the vehicle action sequence.

At 1708, a notification and invitation message can be communicated to a device of the second vehicle to notify the device and/or a second occupant of the second vehicle that the vehicle intends to recreate the vehicle action sequence and invite the second vehicle and associated second occupant to participate in recreating the vehicle action sequence. The orchestrator component or agent component can generate the notification and invitation message and can communicate the notification and invitation message to the device (e.g., communication device or another agent component) to notify the device and/or second occupant of the second vehicle that the vehicle intends to recreate the vehicle action sequence and invite the second vehicle and second occupant to participate in recreating the vehicle action sequence.

At 1710, an acknowledgement message can be received from the device of the second vehicle, wherein the acknowledgement message can indicate or acknowledge that the second vehicle and/or second occupant of the second vehicle received the notification message, are aware that the vehicle will be recreating the vehicle action sequence, and agree to participate in recreating the vehicle action sequence. The device of the second vehicle can communicate the acknowledgement message to the orchestrator component or agent component. The orchestrator component or agent component can receive the acknowledgement message.

At 1712, in response to receiving the acknowledgement message, second environmental conditions and second vehicle conditions associated with the second vehicle can be determined based at least in part on the results of analyzing second sensor data associated with the second vehicle. The orchestrator component can receive the second sensor data from a second sensor component of or associated with the second vehicle, wherein the second sensor component can comprise sensors that can sense the second environmental conditions (e.g., road conditions, weather conditions, . . . ) associated with the second vehicle and second vehicle conditions of the second vehicle (e.g., conditions, including functionality and capabilities, of vehicle components). The orchestrator component can analyze the second sensor data, and can determine the second environmental conditions and second vehicle conditions associated with the second vehicle based at least in part on the results of analyzing the second sensor data.

At 1714, second interactive content, comprising the video content, second visual content, second AR content, second VR content, second audio content, second haptic content, and/or second control content, can be generated based at least in part on the identified vehicle action sequence, and the second environmental conditions and second vehicle conditions associated with the second vehicle, wherein the second interactive content can facilitate enabling the second vehicle to recreate a portion of the vehicle action sequence depicted in the video content. The portion of the vehicle action sequence can relate to actions of a corresponding second vehicle depicted in the video of the vehicle action sequence.

At 1716, a first portion of the second interactive content, comprising the video content, second visual content, second AR content, and/or second VR content, that can visually recreate a second version of the vehicle action sequence (e.g., a visual recreation of the vehicle action sequence from the perspective of the second vehicle) can be presented via a second presentation component of the second vehicle or a second UE of the second occupant in conjunction with a second portion of the second interactive content, comprising the second control content, being executed to control the operation of the second vehicle to have the second vehicle recreate the portion of the vehicle action sequence relating to the corresponding second vehicle depicted in the video of the vehicle action sequence.

The orchestrator component can generate the second interactive content based at least in part on the identified vehicle action sequence, and the second environmental conditions and the second vehicle conditions associated with the second vehicle. The second interactive content can comprise the second control content that can be utilized to control operation of the second vehicle to have the second vehicle recreate the portion of the vehicle action sequence identified in the video content and relating to the corresponding second vehicle depicted in the video of the vehicle action sequence. The second interactive content also can comprise the video content, and/or second visual content, second AR content, and/or second VR content that can be determined based at least in part on the video content. For instance, the second AR content or second VR content can recreate 3-D visual aspects of the vehicle action sequence identified in the video content such that, when the second AR content or second VR content is presented to the second vehicle occupant on display screens in the second vehicle or the UE, the second occupant can be immersed in the scene (e.g., 3-D object scene of the vehicle action sequence) in synchronization with the second control content controlling the operation of the second vehicle to have the second vehicle recreate the portion of the vehicle action sequence relating to the corresponding second vehicle depicted in the video of the vehicle action sequence as if the second occupant was in (e.g., part of) the video content (e.g., in the movie, TV program, or another program). In certain embodiments, the second agent component of the second vehicle can present and/or execute the respective types of second interactive content (e.g., video content, second visual content, second AR content, second VR content, second audio content, second haptic content, and/or second control content) in synchronization with each other.

In some embodiments, if, instead, an acknowledgement message was received by the orchestrator component or agent component that indicates that the second vehicle and/or second occupant of the second vehicle received the notification message, are aware that the vehicle will be recreating the vehicle action sequence, and agree to take appropriate action to avoid any undesirable interaction with the vehicle (e.g., agree to take action to avoid colliding or potentially colliding with the vehicle), but do not desire to participate in recreating the vehicle action sequence, the orchestrator component or agent component can control operation of the vehicle, based at least in part on the control content, to have the vehicle recreate (e.g., perform or execute) the vehicle action sequence in conjunction with the presentation of the first portion of the interactive content, comprising the video content, AR content, and/or VR content, via the presentation component of the vehicle or the UE to the user. Also, the orchestrator component or the device (e.g., a second agent component) of the second vehicle can control operation of the second vehicle, based at least in part on other control content generated by the orchestrator component or the device, to have the second vehicle take appropriate action (e.g., appropriate avoidance action) to avoid undesirably interacting (e.g., colliding) with the vehicle during the recreation of the vehicle action sequence.

In other embodiments, if, instead, no acknowledgement message was received by the orchestrator component or agent component from the device of the second vehicle, either because the device of the second vehicle did not respond to the notification message, the device of the second vehicle communicated a message indicating that the second vehicle or second occupant did not agree to take appropriate action (e.g., appropriate avoidance action), or the acknowledgement message was sent by the device, but not received (e.g., not received at all or not received in time) by the orchestrator component or agent component, the orchestrator component or agent component can determine that the vehicle is not permitted to recreate the vehicle action sequence, and can control operation of the vehicle to not have the vehicle recreate the vehicle action sequence.

It is to be appreciated and understood that, while the methods 1500 and 1700 can involve determining and generating interactive content prior to the notification message being sent and the acknowledgement message being received, the disclosed subject matter is not so limited, as, in accordance with some embodiments, the determining and generating of the interactive content (e.g., interactive content and/or second interactive content) can occur after a notification message has been sent to the second vehicle (e.g., second agent component of the second vehicle) and the acknowledgement message, which indicates that second vehicle agrees to take appropriate action in response to the vehicle performing the vehicle action sequence and/or agrees to participate in the vehicle action sequence, has been received by the orchestrator component or agent component of or associated with the vehicle.

Figure 18:
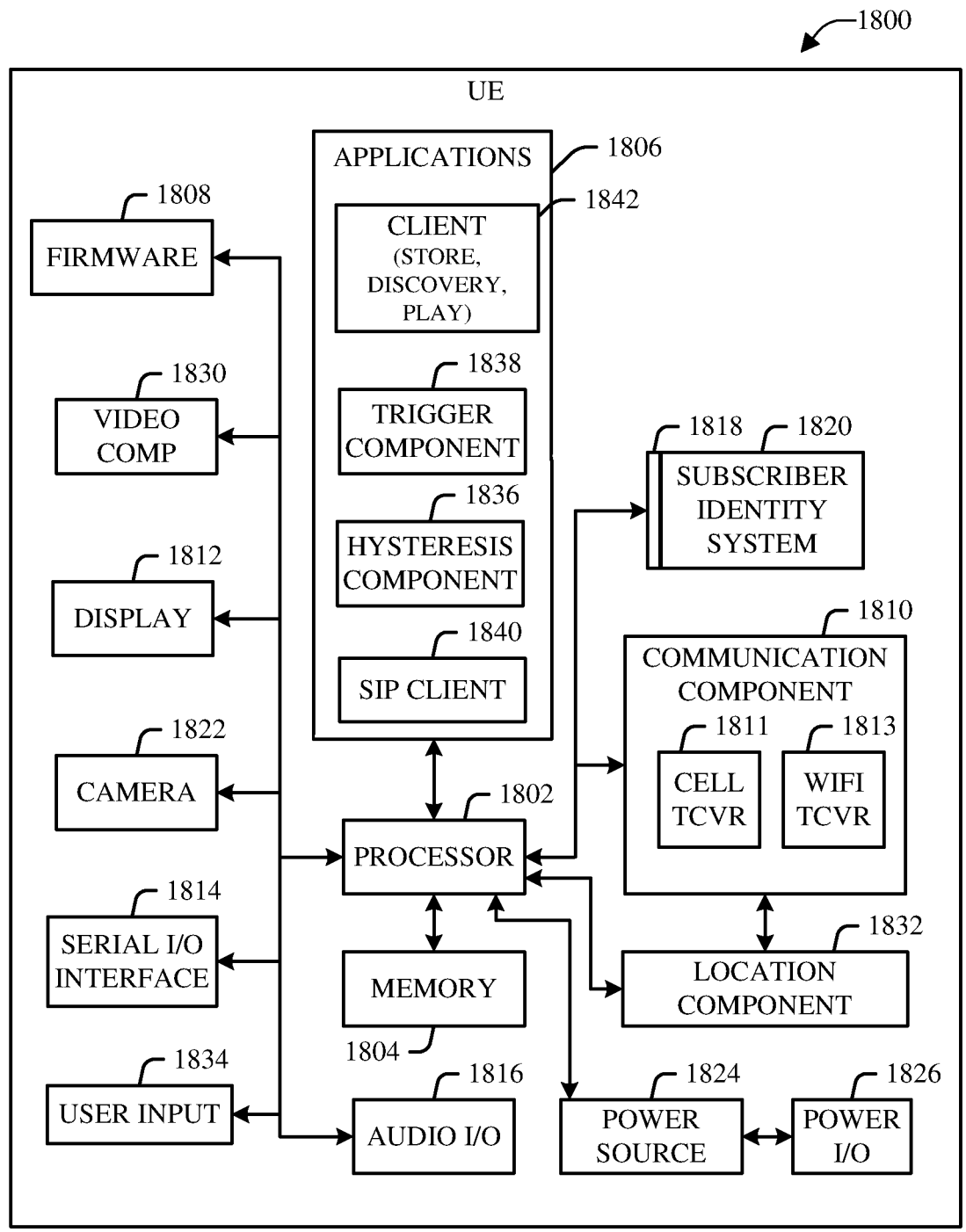
FIG. 18 depicts a block diagram of example user equipment, in accordance with various aspects and embodiments of the disclosed subject matter.

Referring now to FIG. 18, depicted is an example block diagram of an example UE 1800 (e.g., wireless, mobile, or smart phone, AR/VR headset, computer, electronic pad or tablet, or IoT device, . . . ) operable to engage in a system architecture that facilitates wireless communications according to one or more embodiments described herein. Although a UE is illustrated herein, it will be understood that other devices can be a communication device, and that the UE is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The UE 1800 can include a processor 1802 for controlling and processing all onboard operations and functions. A memory 1804 interfaces to the processor 1802 for storage of data and one or more applications 1806 (e.g., a video player software, user feedback component software, etc.). Other applications can include voice recognition of predetermined voice commands that facilitate initiation of the user feedback signals. The applications 1806 can be stored in the memory 1804 and/or in a firmware 1808, and executed by the processor 1802 from either or both the memory 1804 or/and the firmware 1808. The firmware 1808 can also store startup code for execution in initializing the UE 1800. A communication component 1810 interfaces to the processor 1802 to facilitate wired/wireless communication with external systems, e.g., cellular networks, VoIP networks, and so on. Here, the communication component 1810 can also include a suitable cellular transceiver 1811 (e.g., a GSM transceiver) and/or an unlicensed transceiver 1813 (e.g., Wi-Fi, WiMax) for corresponding signal communications. The UE 1800 can be a device such as a cellular telephone, a PDA with mobile communications capabilities, and messaging-centric devices. The communication component 1810 also facilitates communications reception from terrestrial radio networks (e.g., broadcast), digital satellite radio networks, and Internet-based radio services networks.

The UE 1800 includes a display 1812 for displaying text, images, video, telephony functions (e.g., a Caller ID function), setup functions, and for user input. For example, the display 1812 can also be referred to as a "screen" that can accommodate the presentation of multimedia content (e.g., music metadata, messages, wallpaper, graphics, etc.). The display 1812 can also display videos and can facilitate the generation, editing and sharing of video quotes. A serial I/O interface 1814 is provided in communication with the processor 1802 to facilitate wired and/or wireless serial communications (e.g., USB, and/or IEEE 1394) through a hardwire connection, and other serial input devices (e.g., a keyboard, keypad, and mouse). This supports updating and troubleshooting the UE 1800, for example. Audio capabilities are provided with an audio I/O component 1816, which can include a speaker for the output of audio signals related to, for example, indication that the user pressed the proper key or key combination to initiate the user feedback signal. The audio I/O component 1816 also facilitates the input of audio signals through a microphone to record data and/or telephony voice data, and for inputting voice signals for telephone conversations.

The UE 1800 can include a slot interface 1818 for accommodating a SIC (Subscriber Identity Component) in the form factor of a card Subscriber Identity Module (SIM) or universal SIM 1820, and interfacing the SIM card 1820 with the processor 1802. However, it is to be appreciated that the SIM card 1820 can be manufactured into the UE 1800, and updated by downloading data and software.

The UE 1800 can process IP data traffic through the communication component 1810 to accommodate IP traffic from an IP network such as, for example, the Internet, a corporate intranet, a home network, a person area network, etc., through an ISP or broadband cable provider. Thus, VoIP traffic can be utilized by the UE 1800 and IP-based multimedia content can be received in either an encoded or a decoded format.

A video processing component 1822 (e.g., a camera) can be provided for decoding encoded multimedia content. The video processing component 1822 can aid in facilitating the generation, editing, and sharing of video quotes. The UE 1800 also includes a power source 1824 in the form of batteries and/or an AC power subsystem, which power source 1824 can interface to an external power system or charging equipment (not shown) by a power I/O component 1826.

The UE 1800 can also include a video component 1830 for processing video content received and, for recording and transmitting video content. For example, the video component 1830 can facilitate the generation, editing and sharing of video quotes. A location tracking component 1832 facilitates geographically locating the UE 1800. As described hereinabove, this can occur when the user initiates the feedback signal automatically or manually. A user input component 1834 facilitates the user initiating the quality feedback signal. The user input component 1834 can also facilitate the generation, editing and sharing of video quotes. The user input component 1834 can include such conventional input device technologies such as a keypad, keyboard, mouse, stylus pen, and/or touch screen, for example.

Referring again to the applications 1806, a hysteresis component 1836 facilitates the analysis and processing of hysteresis data, which is utilized to determine when to associate with the access point. A software trigger component 1838 can be provided that facilitates triggering of the hysteresis component 1836 when the Wi-Fi transceiver 1813 detects the beacon of the access point. A SIP client 1840 enables the UE 1800 to support SIP protocols and register the subscriber with the SIP registrar server. The applications 1806 can also include a client 1842 that provides at least the capability of discovery, play and store of multimedia content, for example, music.

The UE 1800, as indicated above related to the communication component 1810, includes an indoor network radio transceiver 1813 (e.g., Wi-Fi transceiver). This function supports the indoor radio link, such as IEEE 802.11, for the dual-mode GSM device (e.g., UE 1800). The UE 1800 can accommodate at least satellite radio services through a device (e.g., handset device) that can combine wireless voice and digital radio chipsets into a single device (e.g., single handheld device).

Figure 19:
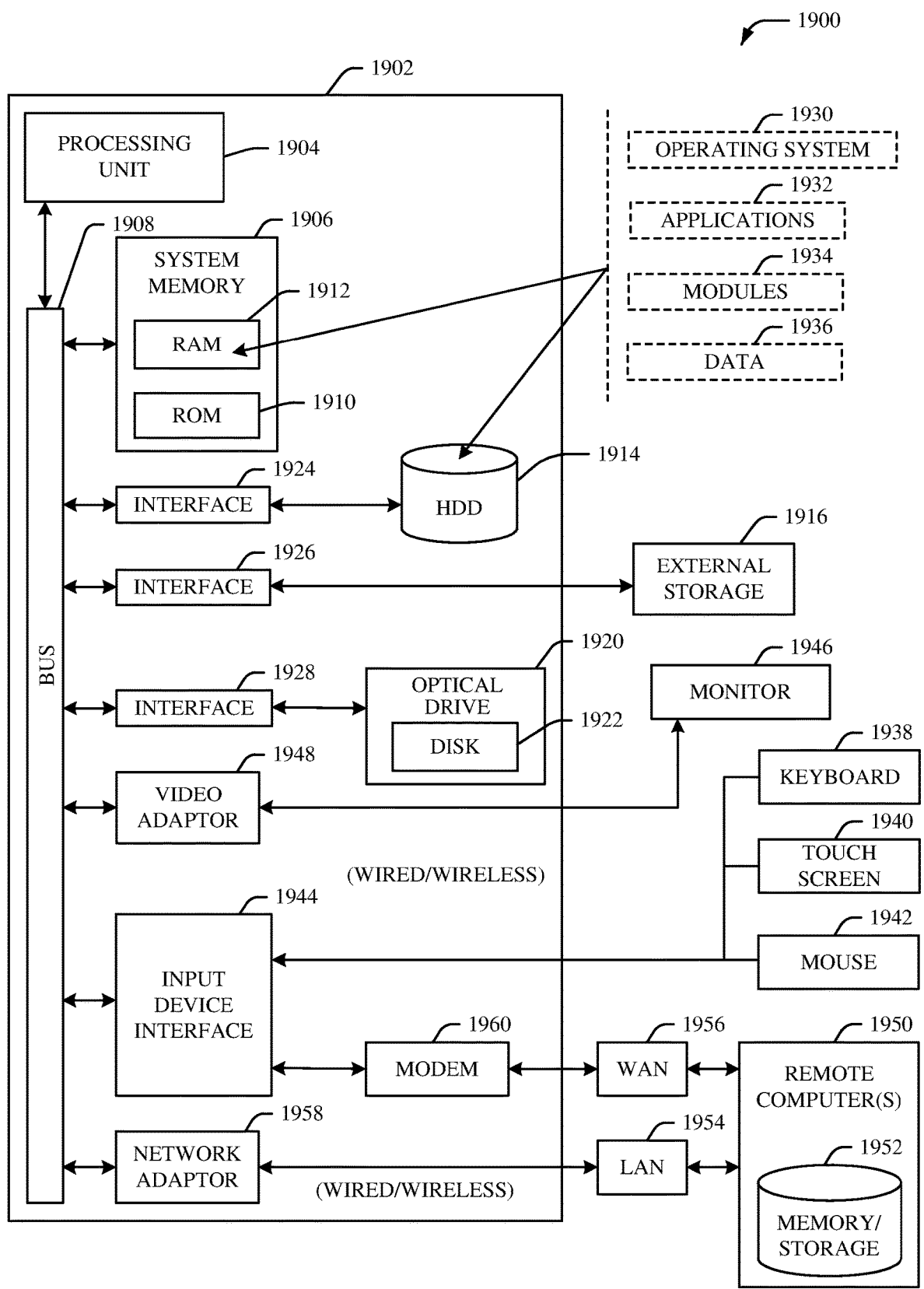
FIG. 19 illustrates an example block diagram of an example computing environment in which the various embodiments of the embodiments described herein can be implemented.

In order to provide additional context for various embodiments described herein, FIG. 19 and the following discussion are intended to provide a brief, general description of a suitable computing environment 1900 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956, e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "communication device," "wireless device," "wireless communication device," "access terminal," "terminal," "handset," "headset," and similar terminology can be used herein to refer to a wireless device utilized by a subscriber or user of a wireless communication service to receive or convey data, control, voice, video, sound, gaming, or substantially any data-stream or signaling-stream. The foregoing terms can be utilized interchangeably in the subject specification and related drawings. Likewise, the terms "access point" (AP), "base station," "node B," "evolved node B" (eNode B or eNB), "home node B" (HNB), "home access point" (HAP), and the like can be utilized interchangeably in the subject application, and can refer to a wireless network component or appliance that serves and receives data, control, voice, video, sound, gaming, or substantially any data-stream or signaling-stream from a set of subscriber stations. Data and signaling streams can be packetized or frame-based flows.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise determining and generating interactive content, controlling presentation of a portion of the interactive content, controlling implementation (e.g., execution) of control content of interactive content, controlling implementation of haptic content of interactive content, determining an entertainment experience (e.g., experience comprising or related to interactive content) that potentially can be desired or appropriate for a user(s) (e.g., an occupant(s) of a vehicle), recommending an entertainment experience to a user(s), determining whether a vehicle action sequence can be performed by a vehicle, notifying a second vehicle that is or is projected to be in proximity to a vehicle that the vehicle is intending to perform a vehicle action sequence, inviting the second vehicle to participate in the vehicle action sequence, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, the orchestrator component, agent component, sensor component, vehicle systems or components, communication devices, processors, sensors, antennae, audio and/or visual output devices, and/or other devices, etc.

It is to be appreciated and understood that components (e.g., orchestrator component, agent component, sensor component, vehicle systems or components, communication devices, communication network, processor component, data store, . . . ), as described with regard to a particular system or method, can include the same or similar functionality as respective components (e.g., respectively named components or similarly named components) as described with regard to other systems or methods disclosed herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

determining, by a system comprising a processor, interactive content, comprising multimedia content and control content, based on a condition associated with a vehicle;

communicating, by the system, the interactive content to a device associated with the vehicle to facilitate presentation of a first portion of the interactive content, comprising the multimedia content, within the vehicle in correspondence with control of operation of the vehicle based on the control content, wherein the control content comprises seat control content that controls movement of a seat of the vehicle in synchronization with the presentation of the multimedia content, comprising visual content, on a display screen within the vehicle, wherein the multimedia content represents a recreation of an activity, and wherein the movement of the seat is synchronized with the recreation of the activity;

based on a first artificial intelligence analysis of condition information relating to respective conditions, comprising the condition, associated with the vehicle and vehicle-related information relating to the operation of the vehicle, learning, by the system, an operational characteristic associated with the operation of the vehicle while under the respective conditions associated with the vehicle;

based on the learning of the operational characteristic, training, by the system, the vehicle to perform an operational activity relating to the operation of the vehicle and corresponding to the multimedia content, wherein a part of the operational activity involves a mechanical vehicle component of the vehicle, and wherein the operational activity is performed during the recreation of the activity;

with regard to a user located in the seat of the vehicle, learning, by the system, a tolerance associated with the user with regard to turning of the vehicle during the operation of the vehicle based on a second artificial intelligence analysis of sensor data relating to the user and the operation of the vehicle; and with regard to the turning of the vehicle that is expected to exceed a defined threshold turning movement tolerance amount that corresponds to the tolerance associated with the user with regard to the turning of the vehicle, based on the tolerance associated with the user, customizing, by the system, a second portion of the seat control content to adjust the movement of the seat to reduce a turning movement effect of the turning of the vehicle on the user in the seat during the turning of the vehicle to prevent an amount of turning movement experienced by the user in the seat in connection with the turning of the vehicle from exceeding the defined threshold turning movement tolerance amount.

2. The method of claim 1, wherein the visual content of the interactive content comprises augmented reality content and virtual reality content, wherein the augmented reality content comprises virtual information integrated with a real three-dimensional object scene associated with the vehicle, and wherein the virtual reality content comprises a virtual object of a virtual three-dimensional object scene.

3. The method of claim 1, wherein a group of vehicle components of the vehicle is controlled, based on the control content, in synchronization with the presentation of the portion of the interactive content within the vehicle, and wherein the group of vehicle components comprises the seat.

4. The method of claim 3, wherein the group of vehicle components comprises at least one of a steering component, an accelerator component, brake component, a vehicle suspension component, a seat component, a seat adjustment component, a climate control component, a transmission component, a gear component, a window component, a door component, a sunroof component, a moonroof component, a convertible roof component, an engine component, or an exhaust component, wherein the seat component comprises the seat, and wherein the seat adjustment component facilitates the movement of the seat based on the seat control content.

5. The method of claim 1, wherein the condition relates to environmental conditions associated with the vehicle, and wherein the method further comprises:

receiving, by the system, environmental information relating to the environmental conditions associated with the vehicle, wherein the condition information comprises the environmental information;

analyzing, by the system, the environmental information;

determining, by the system, the control content based on a result of the analyzing of the environmental information; and in correspondence with the presentation of the first portion of the interactive content within the vehicle, controlling, by the system, the operation of the vehicle based on executing of the control content.

6. The method of claim 5, further comprising:

determining, by the system, the first portion of the interactive content, comprising the visual content and audio content, based on the environmental conditions and a preference associated with a user identity, wherein the communicating of the interactive content comprises communicating the interactive content, comprising the visual content, the audio content, and the control content, to the device, and wherein the visual content is presented on a group of display screens, comprising the display screen, associated with a group of windows of the vehicle or via a device display screen of a communication device associated with the user identity.

7. The method of claim 1, wherein the condition relates to the operation of the vehicle, and wherein the method further comprises:

receiving, by the system, the vehicle-related information relating to the operation of the vehicle;

analyzing, by the system, the vehicle-related information relating to the operation of the vehicle;

determining, by the system, operational characteristics of the vehicle based on a result of the analyzing of the vehicle-related information, wherein the operational characteristics comprise the operational characteristic; and determining, by the system, the control content based on the operational characteristics of the vehicle.

8. The method of claim 1, wherein the vehicle is a first vehicle, wherein the first portion of the interactive content comprises the visual content that is determined based on video content, and wherein the method further comprises:

determining, by the system, a vehicle action sequence of a second vehicle depicted in a third portion of the video content based on a first analysis of the video content;

determining, by the system, environmental conditions associated with the first vehicle based on a second analysis of environmental information relating to environmental conditions, wherein the condition information comprises the environmental information;

determining, by the system, operational characteristics of the first vehicle based on a third analysis of the vehicle-related information relating to the operation of the first vehicle, wherein the operational characteristics comprise the operational characteristic; and determining, by the system, the control content that enables a recreation of the vehicle action sequence by the first vehicle based on the vehicle action sequence, the environmental conditions associated with the first vehicle, and the operational characteristics of the first vehicle, wherein the vehicle action sequence relates to the activity.

9. The method of claim 8, wherein the operation of the first vehicle is controlled, based on the control content, to have the first vehicle recreate the vehicle action sequence in conjunction with a temporal location of the vehicle action sequence within the interactive content as the first portion of the interactive content is presented within the first vehicle.

10. The method of claim 9, further comprising:
determining, by the system, visual objects depicted in the vehicle action sequence of the third portion of the video content based on the first analysis of the video content;
based on the visual objects, determining, by the system, virtual visual objects that emulate the visual objects depicted in the vehicle action sequence presented in the third portion of the video content;
generating, by the system, the interactive content comprising the first portion of the interactive content, wherein the first portion of the interactive content comprises the visual content comprising the virtual visual objects; and
in conjunction with the controlling of the operation of the first vehicle to have the first vehicle recreate the vehicle action sequence, facilitating, by the system, presenting the first portion of the interactive content, comprising the visual content comprising the virtual visual objects, on a group of display screens, comprising the display screen, of the first vehicle or via a device display screen of a communication device, wherein the group of display screens are associated with a group of windows of the first vehicle.

11. The method of claim 8, wherein the device is a first device, and wherein the method further comprises:
identifying, by the system, a third vehicle in proximity to the first vehicle; and
communicating, by the system, a message to a second device of the third vehicle, wherein the message notifies the second device or an occupant of the third vehicle that the first vehicle will be recreating the vehicle action sequence.

12. The method of claim 1, wherein the vehicle is a first vehicle, wherein the device is a first device, wherein the operation is a first operation of the first vehicle, wherein the interactive content is first interactive content that is determined based on video content from a first perspective, wherein the control content is first control content, and wherein the method further comprises:
determining, by the system, that the first vehicle and a second vehicle in proximity to the first vehicle are to participate in performing a vehicle action sequence depicted in the video content, based on information communicated between the first device of the first vehicle and a second device of the second vehicle, wherein the vehicle action sequence relates to the activity;

determining, by the system, the first interactive content comprising the first control content, based on an analysis of the video content, wherein the first control content facilitates the controlling of the first operation of the first vehicle;
determining, by the system, second interactive content comprising second control content, wherein the second control content facilitates controlling a second operation of the second vehicle, and wherein the second interactive content is determined based on the video content from a second perspective; and
communicating, by the system, the first control content to the first device and the second control content to the second device to enable the controlling of the first operation of the first vehicle, based on the first control content, and the second operation of the second vehicle, based on the second control content, to coordinate respective movements of the first vehicle and the second vehicle to perform the vehicle action sequence.

13. A system, comprising:
a processor; and
a memory that stores executable instructions that, when executed by the processor, facilitate performance of operations, comprising:
determining interactive content, comprising visual content and control data, based on a condition associated with a vehicle;
transmitting the interactive content to a device associated with the vehicle to facilitate presentation of a first portion of the interactive content, comprising the visual content, within the vehicle in connection with control of operation of the vehicle based on the control data, wherein the control data comprises seat control data that controls movement of a seat of the vehicle to correspond with the presentation of the visual content on a display screen within the vehicle, wherein the visual content comprises a recreation of an event, and wherein the movement of the seat corresponds to the recreation of the event;
learning an operational attribute associated with the operation of the vehicle while subjected to respective conditions, comprising the condition, associated with the vehicle based on a first artificial intelligence analysis of condition data relating to the respective conditions and vehicle-related data relating to the operation of the vehicle;
in response to the learning of the operational attribute, training the vehicle to execute an operational activity relating to the operation of the vehicle and corresponding to the visual content, wherein a part of the operational activity involves a mechanical vehicle component of the vehicle, and wherein the operational activity is executed during the recreation of the event;
with regard to a user determined to be situated in the seat, learning a tolerance of the user with regard to turning of the vehicle during the operation of the vehicle based on a second artificial intelligence analysis of sensor data relating to the user and the operation of the vehicle; and
with regard to the turning of the vehicle that is predicted to exceed a defined threshold turning movement tolerance value that corresponds to the tolerance of the user with regard to the turning of the vehicle, based on the tolerance of the user, tailoring a second portion of the seat control data to cause the movement of the seat to reduce a turning movement effect of the turning of the vehicle on the user in the seat during the turning of the vehicle to prevent a tolerance value corresponding to an amount of turning movement experienced by the user in the seat in connection with the turning of the vehicle from exceeding the defined threshold turning movement tolerance value.

14. The system of claim 13, wherein the turning of the vehicle is a first turning of the vehicle, and wherein the operations further comprise:
based on the tolerance associated with the user, tailoring a third portion of the control data to modify a second turning of the vehicle during the second turning of the vehicle to allow the second turning of the vehicle to occur while preventing a turning movement value corresponding to the second turning of the vehicle from exceeding the defined threshold turning movement tolerance value that corresponds to the tolerance associated with the user with regard to the second turning of the vehicle.

15. The system of claim 13, wherein the visual content of the interactive content comprises augmented reality content, and wherein the augmented reality content comprises virtual information associated with a real three-dimensional object scene associated with the vehicle.

16. The system of claim 13, wherein the condition relates to an environmental condition associated with the vehicle or a vehicle condition associated with the operation of the vehicle, and wherein the operations further comprise:
receiving environmental data relating to the environmental condition or operation data relating to the vehicle condition, wherein the condition data comprises the environmental data or the operation data;
analyzing the environmental data or the operation data; and
determining the control data based on the analyzing of the environmental data or the operation data, wherein a group of vehicle components of the vehicle is controlled, based on the control data, in connection with the presentation of the first portion of the interactive content within the vehicle, and wherein the group of vehicle components comprises the seat.

17. The system of claim 16, wherein the vehicle is an autonomous vehicle or a semi-autonomous vehicle, wherein the group of vehicle components comprises at least two of a steering component, an accelerator component, brake component, a vehicle suspension component, a seat component, a seat adjustment component, a climate control component, a transmission component, a gear component, a window component, a door component, a sunroof component, a moonroof component, a convertible roof component, an engine component, or an exhaust component, wherein the seat component comprises the seat, and wherein the seat adjustment component facilitates the movement of the seat based on the seat control data.

18. The system of claim 16, wherein the vehicle is a first vehicle, wherein the first portion of the interactive content is determined based on video content, and wherein the operations further comprise:
identifying a vehicle action sequence of a second vehicle depicted in the video content, wherein the determining of the control data comprises determining the control data based on data relating to the vehicle action sequence, the environmental data, or the operation data, wherein the vehicle action sequence relates to the event; and
transmitting the interactive content, comprising the control data, to the device, wherein the operation of the first vehicle is controlled, based on the control data, to have the first vehicle recreate the vehicle action sequence in conjunction with the presentation of the first portion of the interactive content within the vehicle.

19. A non-transitory machine-readable medium, comprising executable instructions that, when executed by a processor, facilitate performance of operations, comprising:
determining interactive content, comprising video content and control content, based on a condition associated with a vehicle;
communicating the interactive content to a device associated with the vehicle to enable presentation of the video content within the vehicle in conjunction with control of operation of the vehicle based on the control content, wherein the control content comprises seat control content that enables controlling movement of a seat of the vehicle in synchronization with the presentation of the video content on a display screen within the vehicle, wherein the video content comprises a visual scene depicting an activity, and wherein the movement of the seat is synchronized with the activity depicted in the visual scene;
learning an operational characteristic associated with the operation of the vehicle while subjected to a group of conditions, comprising the condition, associated with the vehicle based on a first artificial intelligence analysis of condition data relating to the group of conditions and vehicle-related data relating to the operation of the vehicle;
based on the learning of the operational characteristic, training the vehicle to perform an operational activity relating to the operation of the vehicle and relating to the video content, wherein the operational activity involves a mechanical component of the vehicle, and wherein the operational activity is performed during the depicting of the activity;
with regard to a user determined to be located in the seat of the vehicle, learning a tolerance of the user with regard to turning of the vehicle during the operation of the vehicle based on a second artificial intelligence analysis of sensor data associated with the user and the operation of the vehicle; and
with regard to the turning of the vehicle that is projected to be greater than a defined threshold turning movement tolerance level that relates to the tolerance of the user with regard to the turning of the vehicle, based on the tolerance of the user, modifying a portion of the seat control content to adjust the movement of the seat to reduce a turning movement effect of the turning of the vehicle on the user in the seat during the turning of the vehicle to prevent a level of turning movement associated with the user in the seat in connection with the turning of the vehicle from being greater than the defined threshold turning movement tolerance level.

20. The non-transitory machine-readable medium of claim 19, wherein the interactive content comprises virtual reality content, and wherein the virtual reality content comprises a virtual object of a virtual three-dimensional object scene.

* * * * *